(12) United States Patent
Buskirk et al.

(10) Patent No.: US 11,479,041 B2
(45) Date of Patent: Oct. 25, 2022

(54) SYSTEMS AND METHODS FOR SEALING MICRO-VALVES FOR USE IN JETTING ASSEMBLIES

(71) Applicant: Matthews International Corporation, Pittsburgh, PA (US)

(72) Inventors: William A. Buskirk, Albany, OR (US); Steven E. Flego, Portland, OR (US); Charles C. Haluzak, Philomath, OR (US); John Whitlock, Pittsburgh, PA (US); Eric R. Miller, Seattle, WA (US); Glenn J. T. Leighton, South Yorkshire (GB)

(73) Assignee: Matthews International Corporation, Pittsburgh, PA (US)

( * ) Notice: Subject to any disclaimer, the term of this patent is extended or adjusted under 35 U.S.C. 154(b) by 59 days.

(21) Appl. No.: 16/407,695

(22) Filed: May 9, 2019

(65) Prior Publication Data
US 2019/0346051 A1 Nov. 14, 2019

Related U.S. Application Data

(60) Provisional application No. 62/670,280, filed on May 11, 2018.

(51) Int. Cl.
*B41J 2/14* (2006.01)
*F16K 31/00* (2006.01)
(Continued)

(52) U.S. Cl.
CPC ....... *B41J 2/14282* (2013.01); *B41J 2/17596* (2013.01); *F16K 31/004* (2013.01);
(Continued)

(58) Field of Classification Search
CPC . B41J 2/14282; B41J 2/17596; F16K 31/004; F16K 99/0048; F16K 2099/0092; F16K 99/0007; F16K 11/022
See application file for complete search history.

(56) References Cited

U.S. PATENT DOCUMENTS

| | | | |
|---|---|---|---|
| 4,072,959 | A | 2/1978 | Elmqvist |
| 4,340,083 | A | 7/1982 | Cummins |

(Continued)

FOREIGN PATENT DOCUMENTS

| | | |
|---|---|---|
| CN | 201022022 Y | 2/2008 |
| CN | 101386236 A | 3/2009 |

(Continued)

OTHER PUBLICATIONS

Xiaoting et al. "Vibration Energy Harvesting Using Piezoelectric Unimorph Cantilevers With Unequal Piezoelectric and Nonpiezoelectric Lengths" Dec. 2010, Applied Physics Letters 97:233503 (PubMed, DOI: 10.1063/1.3521389, retrieved from the internet Aug. 30, 2020).

(Continued)

*Primary Examiner* — Henok D Legesse
(74) *Attorney, Agent, or Firm* — DLA Piper LLP

(57) ABSTRACT

A micro-valve includes an orifice plate having a first surface, a second surface and an orifice extending from the first surface to the second surface. An actuating beam is disposed in spaced relation to the orifice plate. The actuating beam includes a base portion and a cantilevered portion. The base portion is separated from the orifice plate by a predetermined distance. The cantilevered portion extends from the base portion such that an overlapping portion thereof overlaps the orifice. The actuating beam is movable between a closed position and an open position. The micro-valve also includes a sealing structure including a sealing member disposed at the overlapping portion of the cantilevered (Continued)

portion. When the actuating beam is in the closed position, the cantilevered portion is positioned such that the sealing structure seals the orifice so as to close the micro-valve.

13 Claims, 19 Drawing Sheets

(51) Int. Cl.
*F16K 99/00* (2006.01)
*B41J 2/175* (2006.01)
*F16K 11/02* (2006.01)

(52) U.S. Cl.
CPC ........ *F16K 99/0048* (2013.01); *F16K 11/022* (2013.01); *F16K 99/0007* (2013.01); *F16K 2099/0092* (2013.01)

(56) References Cited

U.S. PATENT DOCUMENTS

| | | | |
|---|---|---|---|
| 4,409,601 A | 10/1983 | Nilsson et al. | |
| 4,450,375 A | 5/1984 | Siegal | |
| 4,564,846 A | 1/1986 | Siegal | |
| 4,629,926 A | 12/1986 | Siegal | |
| 4,758,226 A | 7/1988 | Carre | |
| 4,809,017 A | 2/1989 | Fost | |
| 4,962,391 A | 10/1990 | Kitahara et al. | |
| 5,072,959 A | 12/1991 | Marullo | |
| 5,079,472 A | 1/1992 | Uhl et al. | |
| 5,126,755 A | 6/1992 | Sharpe et al. | |
| 5,441,597 A | 8/1995 | Bonne et al. | |
| 5,452,878 A | 9/1995 | Gravesen et al. | |
| 5,619,177 A | 4/1997 | Johnson et al. | |
| 5,784,083 A | 7/1998 | Schumann et al. | |
| 5,810,325 A | 9/1998 | Carr | |
| 5,857,491 A | 1/1999 | Cooke | |
| 5,901,939 A | 5/1999 | Cabuz et al. | |
| 6,024,340 A | 2/2000 | Lazarus et al. | |
| 6,116,517 A | 9/2000 | Heinzl et al. | |
| 6,142,444 A | 11/2000 | Kluge | |
| 6,164,621 A | 12/2000 | Bouchard et al. | |
| 6,352,337 B1 | 3/2002 | Sharma | |
| 6,367,767 B2 | 4/2002 | Weinmann et al. | |
| 6,412,913 B1 | 7/2002 | Moon et al. | |
| 6,450,204 B2 | 9/2002 | Itzhaky | |
| 6,460,979 B1 | 10/2002 | Heinzl et al. | |
| 6,464,341 B1 | 10/2002 | Furlani et al. | |
| 6,581,638 B2 | 6/2003 | Frisch et al. | |
| 6,590,267 B1 | 7/2003 | Goodwin-Johansson et al. | |
| 6,676,249 B2 | 1/2004 | Lebens | |
| 6,811,136 B2 | 11/2004 | Eberhardt et al. | |
| 6,959,911 B2 | 11/2005 | Strasser et al. | |
| 6,988,706 B2 | 1/2006 | Seeley et al. | |
| 6,991,214 B2 | 1/2006 | Richter | |
| 7,159,841 B2 | 1/2007 | Gemmen et al. | |
| 7,299,818 B2 | 11/2007 | Pinter et al. | |
| 7,322,376 B2 | 1/2008 | Frisch | |
| 7,448,412 B2 | 11/2008 | Teach et al. | |
| 7,540,592 B2 | 6/2009 | Silverbrook | |
| 9,975,347 B2 | 5/2018 | Tozuka et al. | |
| 10,155,385 B2 | 12/2018 | Hiramoto et al. | |
| 2003/0030705 A1 | 2/2003 | Koike et al. | |
| 2003/0076649 A1 | 4/2003 | Speakman | |
| 2003/0222236 A1* | 12/2003 | Eberhardt ............ F16K 31/006 251/129.06 | |
| 2003/0234835 A1 | 12/2003 | Torii et al. | |
| 2004/0137300 A1 | 7/2004 | Gemmen et al. | |
| 2005/0133751 A1 | 6/2005 | Seeley et al. | |
| 2005/0002591 A1 | 11/2005 | Wong et al. | |
| 2006/0092237 A1 | 5/2006 | Kwon et al. | |
| 2006/0209137 A1 | 9/2006 | Kojima et al. | |
| 2006/0255064 A1 | 11/2006 | Donaldson | |
| 2010/0141709 A1* | 6/2010 | DeBrabander ........ B41J 2/1646 29/890.1 |
| 2010/0321448 A1 | 12/2010 | Buestgens et al. | |
| 2011/0073188 A1 | 3/2011 | Marcus et al. | |
| 2011/0073788 A1 | 3/2011 | Marcus et al. | |
| 2012/0268529 A1 | 10/2012 | Baumer et al. | |
| 2014/0333703 A1 | 11/2014 | Buskirk et al. | |
| 2016/0189494 A1 | 6/2016 | Levesque et al. | |
| 2017/0274658 A1 | 9/2017 | Terasaki | |
| 2018/0056288 A1 | 3/2018 | Abate et al. | |
| 2018/0147848 A1 | 5/2018 | Teranishi et al. | |
| 2018/0162140 A1 | 6/2018 | Buskirk et al. | |
| 2018/0361747 A1 | 12/2018 | Yaginuma et al. | |
| 2018/0370230 A1 | 12/2018 | Nakagawa et al. | |
| 2019/0086793 A1 | 3/2019 | Lyons et al. | |
| 2019/0344564 A1 | 11/2019 | Buskirk et al. | |
| 2019/0344568 A1 | 11/2019 | Buskirk et al. | |
| 2019/0346066 A1 | 11/2019 | Buskirk et al. | |
| 2019/0346067 A1 | 11/2019 | Buskirk et al. | |
| 2021/0129173 A1 | 5/2021 | Buskirk et al. | |

FOREIGN PATENT DOCUMENTS

| | | |
|---|---|---|
| DE | 3608550 A1 | 9/1987 |
| DE | 10133939 A1 | 1/2003 |
| DE | 10 2004 035 844 B3 | 10/2005 |
| DE | 10 2007 034 049 B3 | 6/2008 |
| EP | 0 170 990 A1 | 2/1986 |
| EP | 0941434 A1 | 9/1999 |
| EP | 1 104 863 A2 | 6/2001 |
| EP | 2 017 511 A1 | 1/2009 |
| EP | 3 187 337 A1 | 7/2017 |
| JP | 57-178767 A | 11/1982 |
| JP | 57-197176 A | 12/1982 |
| JP | S63-185471 A | 8/1988 |
| JP | S64-18643 A | 1/1989 |
| JP | 02033979 | 2/1990 |
| JP | 02273242 | 11/1990 |
| JP | 09-011471 A | 1/1997 |
| JP | 2819141 A | 10/1998 |
| JP | H11-105274 | 4/1999 |
| JP | 2000-296619 A | 10/2000 |
| JP | 2002532658 A | 10/2002 |
| JP | 2004-308554 A | 11/2004 |
| JP | 2009243911 A | 10/2009 |
| JP | 05116284 | 1/2013 |
| JP | 2013-533817 A | 8/2013 |
| WO | 1986005722 A1 | 10/1986 |
| WO | 2000038928 A1 | 7/2000 |
| WO | WO-02/37661 A1 | 5/2002 |
| WO | WO-2009/010117 A1 | 1/2009 |
| WO | WO-2010/144343 A3 | 12/2010 |
| WO | WO-2012/002942 A1 | 1/2012 |
| WO | 2019215671 A1 | 11/2014 |
| WO | WO-2014/182984 A1 | 11/2014 |
| WO | 2016030566 A1 | 3/2016 |
| WO | 2019215668 A1 | 11/2019 |
| WO | 2019215669 A1 | 11/2019 |
| WO | 2019215672 A1 | 11/2019 |
| WO | 2019215674 A1 | 11/2019 |
| WO | 2021087218 A1 | 5/2021 |

OTHER PUBLICATIONS

Inkjet Printing Definition, https://en.wikipedia.org/wiki/inkjet_printing, 15 pages.
International Search Report and Written Opinion for International Application No. PCT/IB2019/053844, dated Sep. 19, 2019, 15 pages.
International Search Report and Written Opinion for PCT/US2014/037422 dated Sep. 3, 2014.
Supplementary European Search Report and Written Opinion for EP14795127 dated Jun. 8, 2018.

* cited by examiner

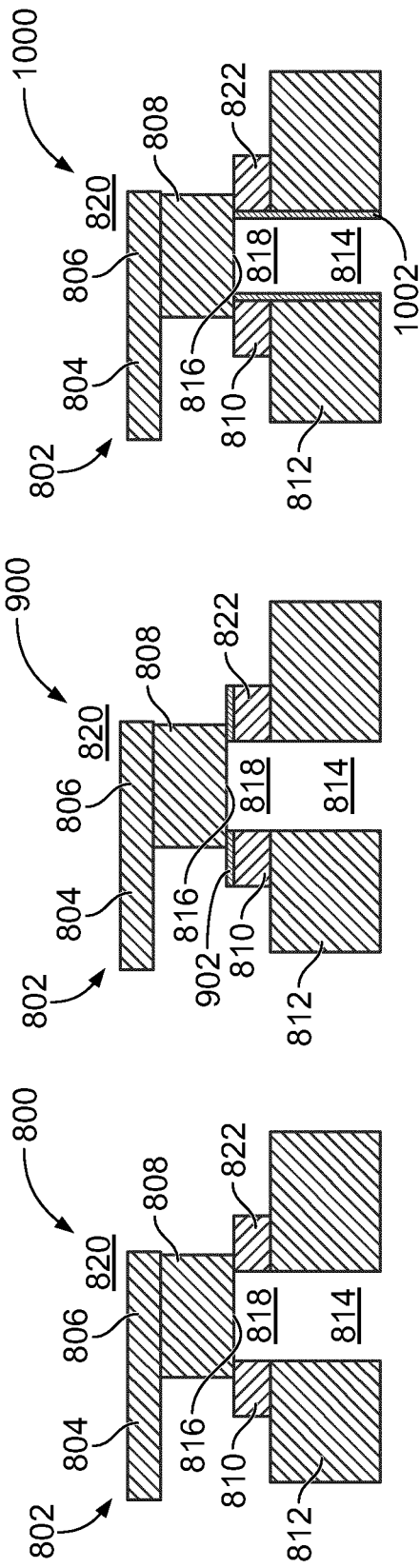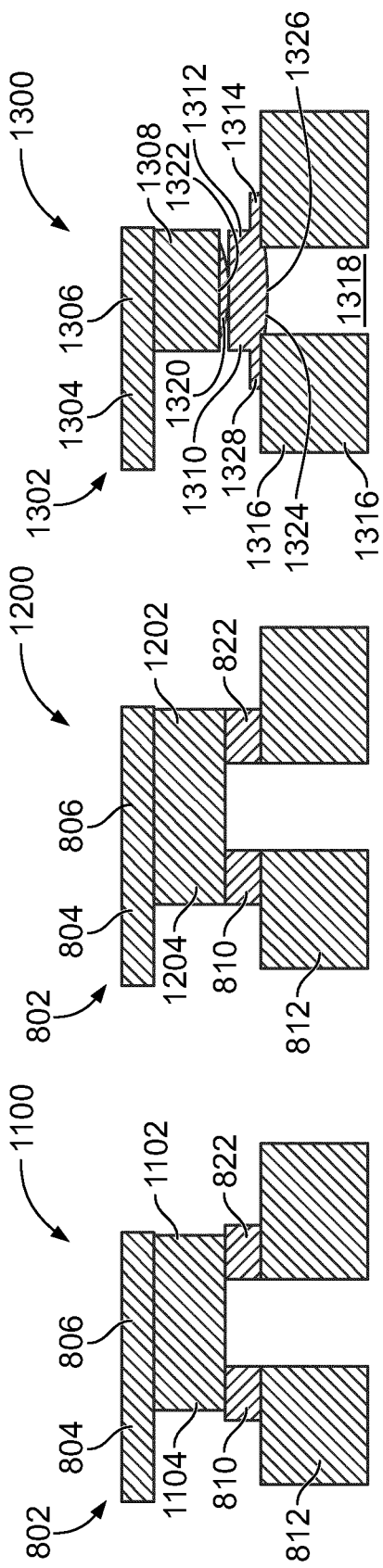

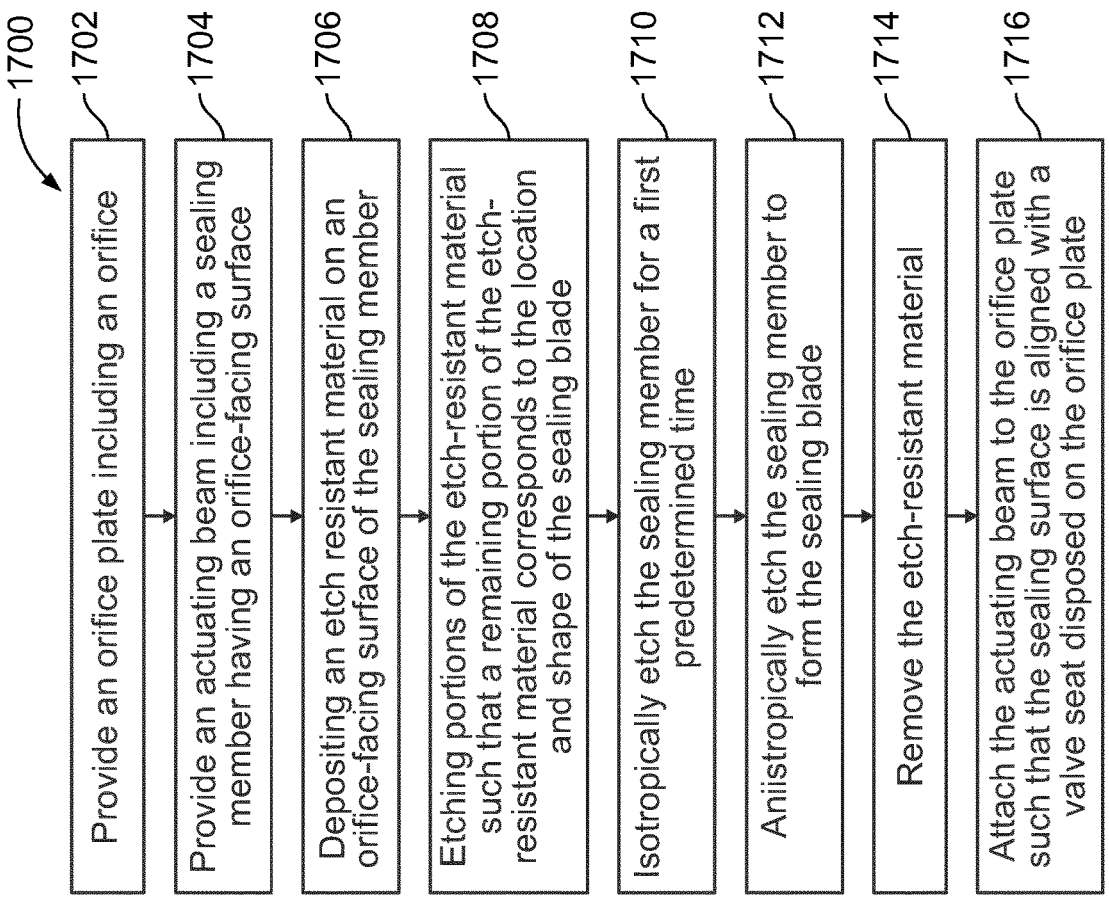
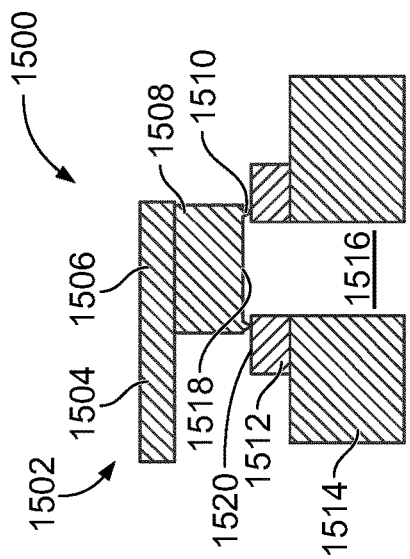
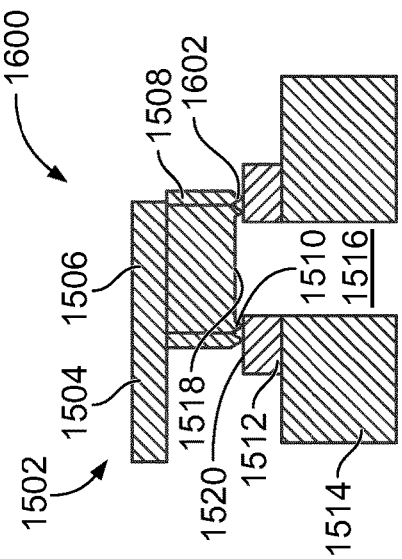

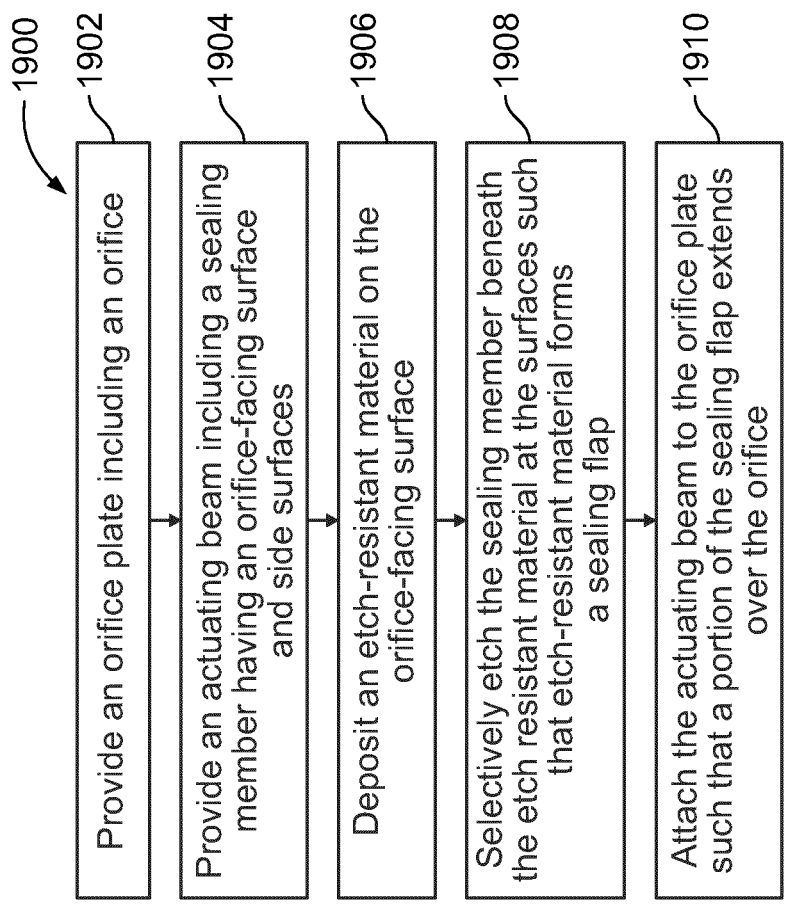
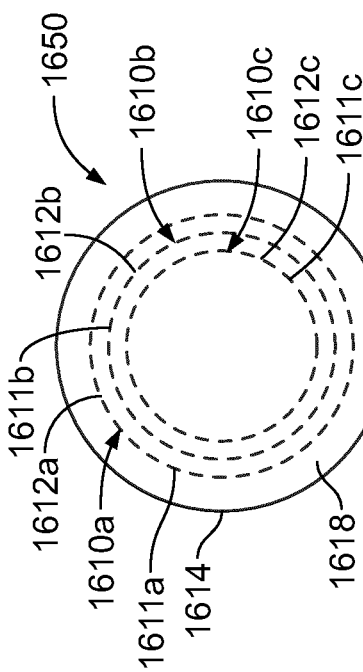
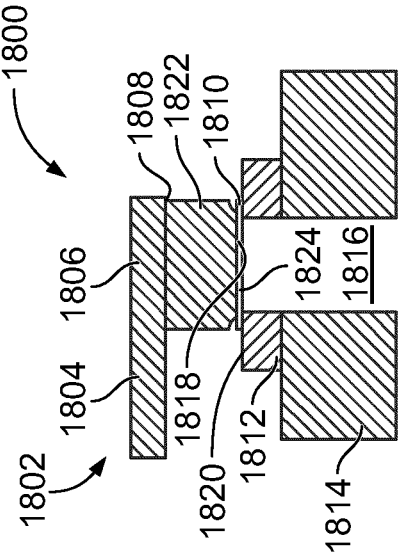

SYSTEMS AND METHODS FOR SEALING MICRO-VALVES FOR USE IN JETTING ASSEMBLIES

CROSS-REFERENCE TO RELATED APPLICATIONS

The present application claims priority to and benefit of U.S. Provisional Application No. 62/670,280 filed May 11, 2018, the disclosure of which is hereby incorporated by reference herein in its entirety.

TECHNICAL FIELD

The present disclosure relates generally to the field of micro-valves fabricated using micro-electro-mechanical systems (MEMS) techniques. More specifically, the present disclosure relates to a jetting assembly including micro-valves that are used for industrial marking and coding.

BACKGROUND

Conventional printing technologies have several shortcomings. For example, continuous inkjet printers have certain deficiencies that are difficult to eliminate. The process of generating droplets from an ink supply, for example, may lead to ink dripping in an undesired direction (e.g., away from a target), leading to maintenance requirements. Additionally, makeup fluid is lost over time as a result of evaporation, requiring continuous replenishment. Other maintenance costs, such as repairing orifice plates due to degradation, are also required.

SUMMARY

In some embodiments, a micro-valve includes an orifice plate having a first surface and a second surface. The orifice plate includes an orifice extending from the first surface to the second surface. The micro-valve also includes an actuating beam disposed in spaced relation to the orifice plate. The actuating beam includes a base portion and a cantilevered portion. The base portion is separated from the orifice plate by a predetermined distance. The cantilevered portion extends from the base portion such that an overlapping portion thereof overlaps the orifice. The actuating beam is movable between a closed position and an open position. The micro-valve also includes a sealing structure including a sealing member disposed at the overlapping portion of the cantilevered portion. When the actuating beam is in the closed position, the cantilevered portion is positioned such that the sealing structure seals the orifice so as to close the micro-valve.

Another embodiment is directed to a method of constructing a micro-electro-mechanical systems (MEMS) micro-valve. The method includes providing an orifice plate including an orifice. The method also includes providing an actuating beam having a spacing member and a sealing member attached thereto. The method also includes forming a portion of a sealing structure on either the orifice plate or the sealing member. The method also includes, after forming the portion of the sealing structure, attaching the actuating beam to the orifice plate such that the sealing member is aligned with the orifice plate and the sealing structure forms a seal between the orifice and a volume proximate to the actuating beam in a closed position of the actuating beam.

Another embodiment is directed to a jetting assembly. The jetting assembly includes a valve body including an orifice plate having a plurality of orifices extending therethrough. The jetting assembly also includes a plurality of micro-valves. Each of the plurality of micro-valves includes a spacing member disposed on the orifice plate and displaced a corresponding orifice. Each of the plurality of micro-valves also includes an actuating beam including a base portion disposed on the spacing member and a cantilevered portion extending from the base portion towards the corresponding orifice such that an overlapping portion thereof overlaps the corresponding orifice. The actuating beam is configured to move between a closed position in which the cantilevered portion bends towards the orifice and an open position in which the cantilevered portion bends away from the orifice. Each of the plurality of micro-valves also includes a sealing structure including a sealing member attached to the overlapping portion and extending towards the corresponding orifice. The jetting assembly also includes a fluid manifold coupled to each of the plurality of micro-valves to define a fluid reservoir for each micro-valve.

Some embodiments are directed towards a micro-valve comprising an orifice plate including a first surface and a second surface. The orifice plate comprises an orifice extending from the first surface to the second surface. An actuating beam is disposed in spaced relation to the orifice plate. The actuating beam includes a base portion and a cantilevered portion, the base portion separated from the orifice plate by a predetermined distance, the cantilevered portion extending from the base portion towards the orifice such that an overlapping portion thereof overlaps the orifice. The actuating beam is movable between a closed position and an open position. A sealing structure is disposed on the actuating beam. The sealing structure comprises a sealing member disposed at the overlapping portion of the cantilevered portion. A stopper is disposed on a surface of the sealing member. The stopper includes a first portion attached to a surface of the sealing member and a second portion disposed on the first portion proximate to the orifice plate. The second portion has a greater cross-sectional area than the first portion. When the actuating beam is in the closed position, the cantilevered portion is positioned such that the stopper seals the orifice so as to close the micro-valve.

Other embodiments are directed towards a micro-valve comprising an orifice plate including a first surface and a second surface. The orifice plate comprises an orifice extending from the first surface to the second surface. An actuating beam is disposed in spaced relation to the orifice plate. The actuating beam includes a base portion and a cantilevered portion. The base portion is separated from the orifice plate by a predetermined distance. The cantilevered portion extends from the base portion towards the orifice such that an overlapping portion thereof overlaps the orifice. The actuating beam is movable between a closed position and an open position. A sealing structure disposed on the actuating beam. The sealing structure comprises a valve seat surrounding the orifice. The valve seat defines an opening that surrounds the orifice to define a fluid outlet. A sealing member is disposed at the overlapping portion of the cantilevered portion. A first sealing blade extends a distance from a sealing member surface of the sealing member towards the orifice plate. The first sealing blade surrounds an entire perimeter of the orifice. The sealing blade is configured to contact the valve seat in the closed position so as to seal the fluid outlet and close the micro-valve.

Still other embodiments relate to a micro-valve comprising an orifice plate including a first surface and a second surface. The orifice plate comprises an orifice extending from the first surface to the second surface. An actuating beam is disposed in spaced relation to the orifice plate. The actuating beam includes a base portion and a cantilevered portion, the base portion separated from the orifice plate by a predetermined distance, the cantilevered portion extending from the base portion towards the orifice such that an overlapping portion thereof overlaps the orifice. The actuating beam is movable between a closed position and an open position. A sealing structure is disposed on the actuating beam. The sealing structure comprises a sealing member disposed at the overlapping portion of the cantilevered portion. A narrowed portion is disposed at an end of the sealing member. The narrowed portion defines a sealing member surface that faces the orifice. A sealing flap extends outward from the narrow portion and is configured to seal the orifice when the actuating beam is in the closed position so as to close the micro-valve.

BRIEF DESCRIPTION OF THE DRAWINGS

The disclosure will become more fully understood from the following detailed description, taken in conjunction with the accompanying figures, in which:

FIGS. 8, 9, 10, 11, 12, and 13 are cross-sectional views of sealing structures of micro-valves, according to various example embodiments.

FIGS. 14 and 15 are cross-sectional views of sealing structures of micro-valves, according to various example embodiments.

FIG. 16 is a bottom view of a sealing member including three sets of concentric sealing blades, according to an embodiment.

FIG. 17 is a flow diagram of a method of constructing a sealing structure of a micro-valve, according to an example embodiment.

FIG. 18 is a cross-sectional view of a sealing structure of a micro-valve, according to an example embodiment.

FIG. 19 is a flow diagram of a method of constructing a sealing structure of a micro-valve, according to an example embodiment.

DETAILED DESCRIPTION

Figure 1:
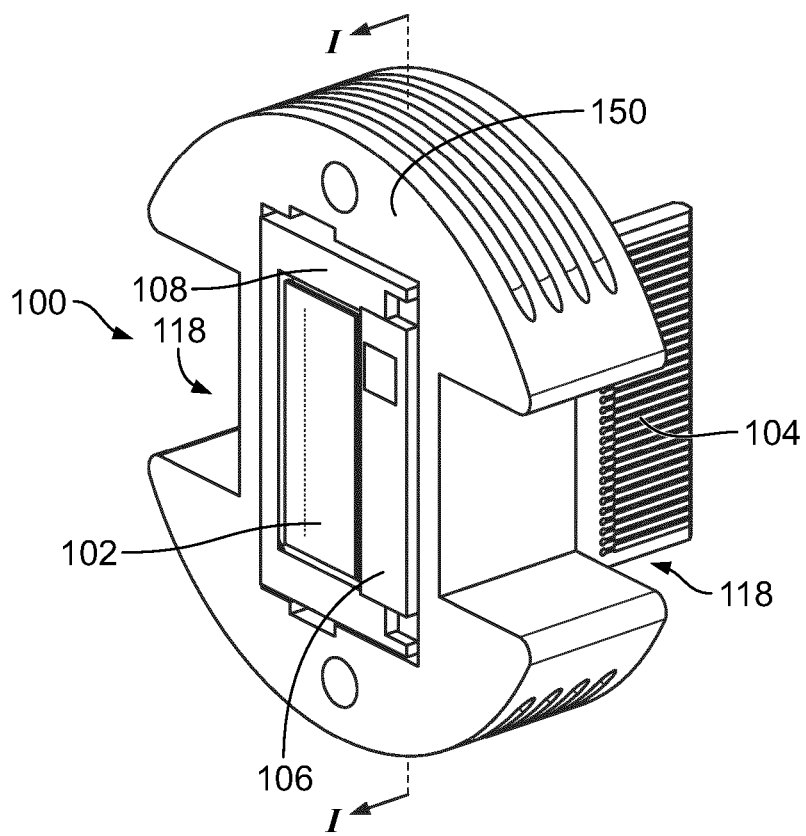
FIG. 1 is a perspective of a jetting assembly disposed in a holder, according to an example embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is a jetting assembly including multiple micro-valves. The micro-valves described herein employ an actuating beam having a sealing member disposed thereon. The utilization of such an actuating beam enables tailoring the micro-valve to eliminate or reduce various deficiencies associated with conventional technologies including continuous inkjet jetting assemblies. For example, in various embodiments, the micro-valve includes a spacing member disposed between the actuating beam and an orifice plate. The spacing member maintains a spacing of a first end of the actuating beam and an orifice within the orifice plate so as to prevent squeeze film damping of the actuating beam. The actuating beam extends over the orifice from the spacing member and a sealing member extends towards the orifice to form a seal at the orifice. Thus, without application of any electrical energy to the actuating beam, the sealing member seals off the orifice. In other words, the default position of the actuating beam (e.g., configured by careful selection of the materials contained therein) is that the micro-valve is closed. As such, fluid (e.g., ink, solvent, etc.) disposed in the micro-valve is sealed off from the external environment of the jetting assembly. This eliminates evaporation of the fluid, which reduces clogs. Additionally, the limited evaporation enables faster-drying ink to be used, which allows for printing at higher speeds than conventional systems.

To ensure superior performance of the jetting assembly, the micro-valves described herein include a sealing structure configured to form a seal that separates the orifice from a volume proximate to the actuating beam when the actuating beam is in its default position. The sealing structure may include any combination of a plurality of components designed to ensure the formation of the seal. For example, in various embodiments, the sealing structure includes a valve seat disposed on the orifice plate proximate to the orifice. The valve seat may surround the orifice and define an opening that overlaps with the orifice to define a fluid outlet. The sealing member may contact the valve seat with the actuating beam in the default position. In some embodiments, the valve seat is constructed of a compliant material to facilitate the formation of an enhanced seal resulting from pressure applied due to curvature of the actuating beam.

In another aspect, the sealing structure may include components attached to or extending from the sealing member. For example, in one embodiment, the sealing structure includes a stopper extending from an orifice-facing surface of the sealing member. The stopper may include a narrow portion and a wider portion having a cross-sectional area greater than that of the orifice. As a result, the actuating beam compresses the stopper towards the orifice plate to facilitate the formation of the seal. Alternatively, or additionally, the sealing structure may include a sealing blade extending from the orifice-facing surface to contact the valve seat or orifice plate. The sealing blade further facilitates the formation of the seal due to the pressure resulting from its relatively small cross-sectional area, which focuses downward pressure applied via the actuating beam to a point to form a tight seal. Thus, the various structures described herein enhance the seals formed when the actuating beam is in its default position.

As described herein, the term "default position," when used in describing an actuating beam of a micro-valve, describes the position of the actuating beam with respect to various other components of the micro-valve without application of any control signals (e.g., an electrical charge, current or voltage) to the actuating beam. In other words, the default position is the position of the actuating beam (and any components attached thereto) when the actuating beam is in a passive state. It should be appreciated that other embodiments are envisioned in which the default position is an open position of the actuating beam.

Referring now to FIG. 1, a perspective view of a jetting assembly 100 disposed in a holder 150 is shown, according to an example embodiment. Jetting assembly 100 includes a valve body 102 attached to a carrier 108. The holder 150 includes a substantially circular-shaped body having an opening contained therein adapted to receive jetting assembly 100. Holder 150's body may include notches 118 extending from a peripheral edge thereof to facilitate attachment of the holder 150 to a marking device. The valve body 102 may be a component of a marking device. In an exemplary embodiment, the valve body 102 is used in an industrial marking device including a pressurized ink supply. In other embodiments, the valve body 102 or any of the micro-valves described herein may be used in pneumatic applications, where the fluid includes a gas (e.g., air, nitrogen, oxygen, etc.).

As described herein, the valve body 102 includes an input fluid manifold attached to a plurality of micro-valves. The micro-valves and the input fluid manifold form a fluid plenum or reservoir configured to hold fluid received from an external fluid supply. In other embodiments, the valve body 102 may define a plurality of fluid plenums, each fluid plenum corresponding to at least a portion of the plurality of micro-valves. In such embodiments, each fluid plenum may be filled with a different colored ink (e.g., black, green, yellow, cyan, etc.) or a different fluid so as to provide multi-color capable jetting assembly or a multi fluid deposition assembly. In various embodiments, the micro-valves include an actuating beam configured to move (e.g., bend, curve, twist, etc.) in response to voltages being applied thereto to temporarily open fluid outlets at orifices in an orifice plate. As a result, droplets are emitted from the fluid outlets onto a target to produce a desired marking pattern on the target.

As shown, a circuit board 104 is attached to a side surface of the carrier 108. Circuit board 104 may include a plurality of electrical pathways and provide a point of connection between valve body 102 and an electrical controller (e.g., via a wiring harness). The electrical controller may supply control signals via the electrical pathways to control actuation of the actuating beams of multiple micro-valves included in the valve body 102. The structure and function of such micro-valves are described in greater detail herein. In some embodiments, circuit board 104 itself includes a micro-controller that generates and provides control the signals to actuate the micro-valves.

An identification tag 106 is attached to jetting assembly 100. In some embodiments, identification tag 106 includes an internal memory configured to store various forms of information (e.g., manufacturing information, serial number, valve calibration information, settings, etc.) regarding jetting assembly 100. For example, in one embodiment, identification tag 106 is a radio frequency identification (RFID) tag configured to transmit the stored information in a receivable manner in response to receiving a predetermined identifier from an external device. This way, information regarding jetting assembly 100 may be quickly and efficiently retrieved.

Figure 2:
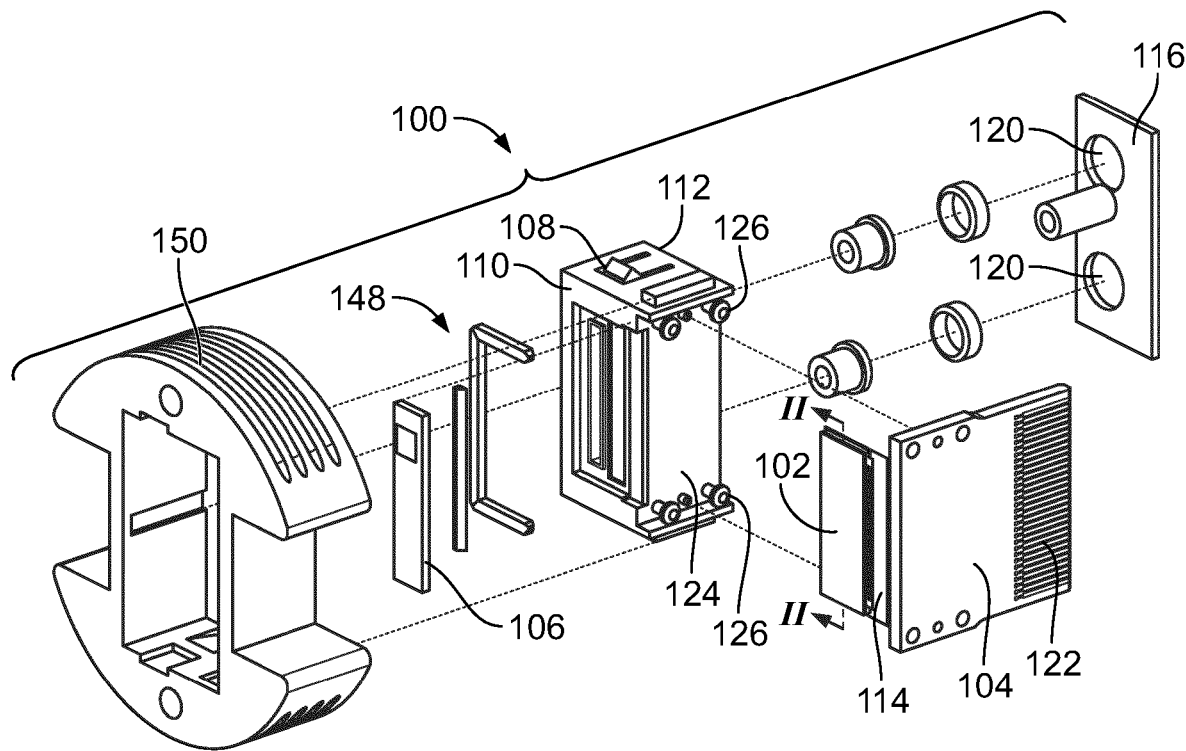
FIG. 2 is an exploded view of the jetting assembly shown in FIG. 1

Referring now to FIG. 2, an exploded view of jetting assembly 100 is shown, according to an example embodiment. Carrier 108 includes a front-side surface 110, a rear-side surface 112, and a side surface 124. In various embodiments, valve body 102 is attached to front-side surface 110 via an adhesive. The rear-side surface 112 has a cover 116 disposed thereon. Cover 116 includes apertures 120 providing supply ports for fluid (e.g., ink) for deposition onto a target via the valve body 102. For example, in some embodiments, fluid (e.g., ink) is supplied to the valve body 102 via a first one of the apertures 120 (e.g., via an input supply line or hose), circulated through valve body 102, and output from the valve body 102 via a second one of the apertures 120. In other words, the fluid is recirculated through the fluid plenum. A septum may be positioned in each of the apertures 120 and configured to allow insertion of a fluid delivery or fluid return needle therethrough so as to allow communication of the fluid into the fluid plenum while maintaining fluidic sealing of the jetting assembly 100. In particular embodiments, the septum may include a single septum sheet which extends below each of the first one and the second one of the apertures. While not shown, in some embodiments, a heating element (e.g., a resistive wire) may be positioned proximate to the valve body 102 or the carrier 108 (e.g., around or coupled to side wall thereof). The heating element may be used to selectively heat the fluid (e.g., ink) contained within the fluid plenum so as to maintain the fluid at a desired temperature. Furthermore, a temperature sensor (not shown), e.g., a thermal sense resistor, may also be provided in the carrier 108, for example, to determine a temperature of the fluid flowing through the jetting assembly 100.

The front-side surface 110 includes a cavity adapted to receive valve body 102 such that valve body 102 is mounted securely to the front-side surface 110 (e.g., via an adhesive). Circuit board 104 is attached to carrier 108 via the side surface 124. As shown, the side surface 124 includes mounting pegs 126. In various embodiments, circuit board 104 includes apertures arranged in a manner corresponding to the arrangement of the mounting pegs 126 and are adapted to receive the mounting pegs 126 to align the circuit board 104 to the carrier 108.

As shown, circuit board 104 has a flex circuit 114 attached thereto. Flex circuit 114 extends at an angle from circuit board 104 and is attached to the carrier 108 proximate to the front-side surface 110. The valve body 102 and circuit board 104 are arranged perpendicularly to one another, as the flex circuit 114 extends around a corner boundary of front-side surface 110. Circuit board 104 also includes a controller interface 122 including electrical connection members (e.g., pins) configured to receive control signals from a marking system controller.

As described herein, in various embodiments, the flex circuit 114 may be disposed between a fluid manifold and the carrier 108, or an interposer disposed between the carrier 108 and the valve body 102 to facilitate formation of electrical connections between flex circuit 114 and electrodes of the plurality of micro-valves included in valve body 102. In some embodiments, flex circuit 114 is attached to front-side surface 110 via a mounting member 148. An opening in flex circuit 114 is aligned with the septum in carrier 108 to provide a fluid inlet to a fluid plenum formed via the valve body 102.

Figure 3:
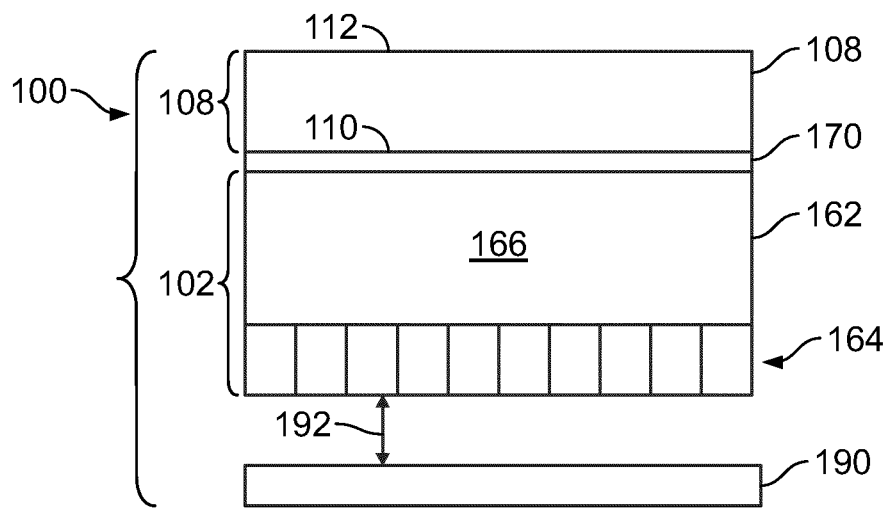
FIG. 3 is a schematic cross-sectional view of the jetting assembly shown in FIG. 1.

Referring now to FIG. 3, a schematic depiction of various components of jetting assembly 100 is shown, according to an example embodiment. For example, FIG. 3 may depict a cross sectional view of jetting assembly 100 at the line I-I shown in FIG. 1. As shown, the valve body 102 extends from front-side surface 110 of the carrier 108 via an interposer 170. The interposer 170 provides structural support to ensure maximal performance of various components in valve body 102. While not shown, in some embodiments, a compliant layer (e.g., a silicone or rubber layer) may also be disposed above or below the interposer 170 or any other location in the stack so as to provide stress relief.

The valve body 102 includes an input fluid manifold 162 and a plurality of micro-valves 164 attached to the input fluid manifold 162. The micro-valves 164 and input fluid manifold 162 form a fluid plenum or reservoir 166 for fluid (e.g., a combination of ink and makeup fluid) received from a pressurized fluid supply (e.g., via apertures 120 in a cover 116 attached to the rear-side surface 112). In various embodiments, the fluid supply includes a fluid reservoir and a pump configured to provide pressurized fluid to jetting assembly 100 via a supply line coupled to carrier 108. In various embodiments, the fluid supply supplies fluid pressurized between 7 and 15 PSI when one or more of the micro-valves 164 are open. For example, in one embodiment, the fluid has a pressure of approximately 10 PSI. Carrier 108 may include an internal cavity configured to receive the pressurized fluid and deliver the fluid to the fluid plenum 166. In various embodiments, a pressure differential may be maintained between the fluid plenum and the fluid supply so as to drive the fluid out of the valve body 102.

Input fluid manifold 162 may include a glass structure including a channel forming the fluid plenum. Generally, the micro-valves 164 include actuating beams held in spaced relation to orifices on an orifice plate at the front-side surface 110. The actuating beams may include at least one layer of piezoelectric material configured to deflect in response to receiving control signals (e.g., electrical voltage waveforms provided via controller interface 122 on the circuit board 104). As described herein, application of such electrical signals causes the micro-valves 164 to open, which causes droplets to be released at the orifice plate. The droplets advance a throw distance 192 onto a substrate 190 to produce a desired pattern on the substrate 190. In some embodiments, a weight of a single fluid droplet dispensed by a micro-valve 164 or any other micro-valve described herein may be in a range of 200 nanograms to 300 nanograms. In some embodiments, a volume of a single droplet dispensed may be in a range of 200 picoliter to 300 picoliter. The structure and function of various components of micro-valves 164 is described in greater detail herein. In other embodiments, the actuating beam may include a stainless steel actuating beam (e.g., having a length of approximately 1 mm). In still other embodiments, the actuating beam may include a bi-morph beam having two layers of a piezoelectric material disposed on either side of a base layer (e.g., a base silicon or stainless steel layer). An electrical signal (e.g., an electrical voltage) may be applied to either one of the piezoelectric layers so as to urge the actuating beams to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance towards or away from the orifice.

While embodiments described herein generally describe the actuating beam as including a piezoelectric material, in other embodiments, any other actuation mechanism may be used. For example, in some embodiments, the actuating beams may include a capacitive coupling for moving the actuating beams. In other embodiments, the actuating beams may include an electrostatic coupling. In still other embodiments, he actuating beams may include a magnetic coupling (e.g., an electromagnetic structure activated by an electromagnet) for moving the beam. In yet other embodiments, the actuating beams may comprise a temperature sensitive bimetallic strip configured to move in response to temperature change.

Interposer 170 generally adds rigidity to various portions of the valve body 102. For example, the interposer 170 may be constructed to be more rigid than components (e.g., the orifice plate, the actuating beam, etc.) of valve body 102 to counteract stressed induced by attaching such components to one another. For example, the interposer 170 may be attached to valve body 102 to counteract stresses induced by an adhesive used to attach the carrier 108 to the valve body 102. Additionally, the interposer 170 may counteract stresses at interfaces between the input fluid manifold 162 and micro-valves 164.

Figure 4A:
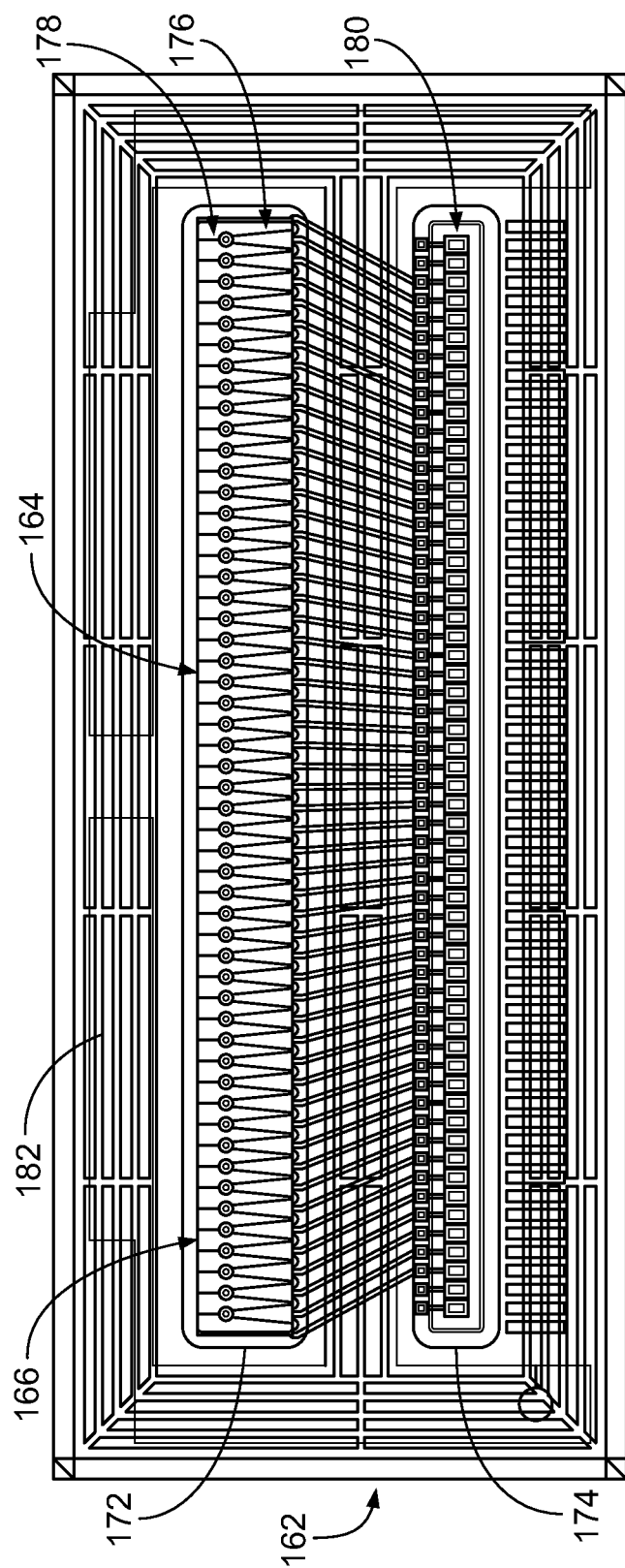
FIG. 4A is a plan view of the jetting assembly shown in FIG. 1.

Referring now to FIG. 4A, a plan view of the jetting assembly 100 is shown, according to an example embodiment. FIG. 4A shows a plan view of valve body 102 at the line II-II shown in FIG. 2. As such, FIG. 4A shows a cross-sectional view at an interface between input fluid manifold 162 and the orifice plate. Input fluid manifold 162 includes a first opening 172 and a second opening 174. The first opening 172 exposes the plurality of micro-valves 164 to form the fluid plenum 166 configured to hold fluid received from a fluid supply.

In the example shown, the plurality of micro-valves 164 include a plurality of actuating beams 176 aligned in a single row. Each of the plurality of actuating beams 176 has a sealing member 178 disposed at an end thereof. In some embodiments, the sealing members 178 are aligned with and contact valve seats disposed at orifices in the orifice plate to prevent fluid contained in the fluid plenum 166 from escaping the fluid plenum 166 in the absence of any electrical signals. The jetting assembly 100 is shown to include 52 actuating beams 176 forming 52 micro-valves 164.

In various embodiments, each of the plurality of actuating beams 176 may include an electrical connection portion exposed via the second opening 174. Electrical contact pads 180 are disposed at each of the electrical connection portions. Wire bonds electrically connect each of the electrical connection portions to the controller interface 122 via electrical contact pads 180. As such, electrical signals may be received by each of the actuating beams 176 via the electrical contact pads 180. In some embodiments tape-automated bonding (TAB) may be used to electrically connect each of the electrical connection portions to the controller interface.

The boundary between the first and second openings 172 and 174 isolates the electrical contact pads 180 from the fluid contained in a reservoir formed by the first opening 172. Also beneficially, the electrical contact pads 180 are disposed beneath input fluid manifold 162. This means that electrical connections between actuating beams 176 are disposed on the interior of carrier 108 and are protected from deterioration and external contamination.

To isolate electrical contact pads 180 from the fluid contained in the fluid plenum 166, an adhesive structure 182 is disposed on input fluid manifold 162. Adhesive structure 182 couples the input fluid manifold 162 to the orifice plate. As shown in FIG. 4A, adhesive structure 182 forms "racetracks" around each of the first and second openings 172 and 174. The racetracks provide barriers for fluid that seeps between the input fluid manifold 162 and the orifice plate as well as prevent particles from entering the input fluid manifold. The racetrack adhesive structure 182 may be present on one or both of the input fluid manifold 162 side or the orifice plate side. For example, the racetracks may be constructed of several concentric rectangular loops of an adhesive material (e.g., a negative photo resist such as a bisphenol-A novalac glycidyl ether based photoresist sold under the tradename SU-8 or polymethylmethacrylate, polydimethylsiloxane, silicone rubber, etc.) around each of the first and second openings 172 and 174. Segments of adhesive material may cut across multiple ones of the rectangular loops to form compartments for receiving seeping fluid. Such an adhesive structure 182 facilitates fluidic isolation between micro-valves 164 and electrical contact pads 180. In other embodiments, the adhesive structure 182 may be formed from silicon and used to bond the input fluid manifold 162 to the orifice plate via fusion bonding, laser bonding, adhesives, eutectic bonding, glass frit, solder, stiction, etc. The adhesive structure 182 may be disposed on the input fluid manifold 162 and the valve body 102 coupled thereto, disposed on the valve body 102 and the input fluid manifold 162 coupled thereto, or disposed on each of the input fluid manifold 162 and the valve body 102 before coupling the two.

Figure 4B:
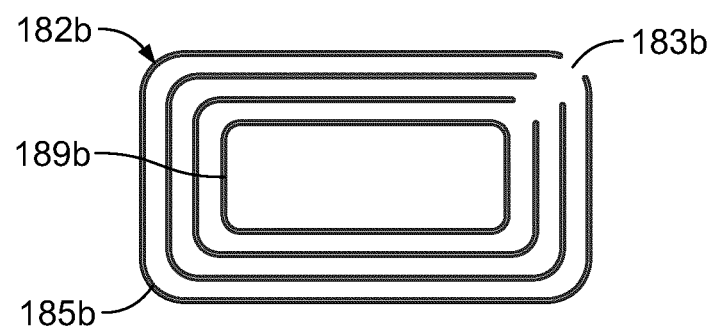
FIG. 4B is a schematic illustration of an adhesive structure that may be used in the jetting assembly of FIG. 1, according to an example embodiment.

In some embodiments, the adhesive structure 182 may be vented. For example, FIG. 4B shows a schematic illustration of an adhesive structure 182b. The adhesive structure 182b may be formed from SU-8, silicon or any other suitable material and includes a plurality of loops 189b such that the adhesive structure has a race track shape. An inner most loop of the plurality of loops 189b of the adhesive structure 182b that surrounds the input fluid manifold 162 forms a closed loop. In contrast, the remaining of the plurality of loops 189b positioned radially outwards of the inner most loop include vents 183b, for example, slots or openings defined therein. The vents 183b may facilitate bonding of input fluid manifold 162 to the orifice plate by allowing air that may get trapped in between the plurality of loops 189b of the adhesive structure 182b to escape via the vents 183b. While FIG. 4B shows the vents 183b being radially aligned with each other and located at corners of each loop, in other embodiments, one or more vents 183b of one loop may be radially offset from a vent defined in an adjacent loop.

As shown in FIG. 4B, corners of the each loop of the adhesive structure 182b may be rounded. Furthermore, corners of the input fluid manifold 162, the interposer 170, the flex circuit 114 or any other layers or components included in the jetting assembly 100 may be rounded, for example, to reduce stress concentration that can occur at sharp corners.

Figure 5A:
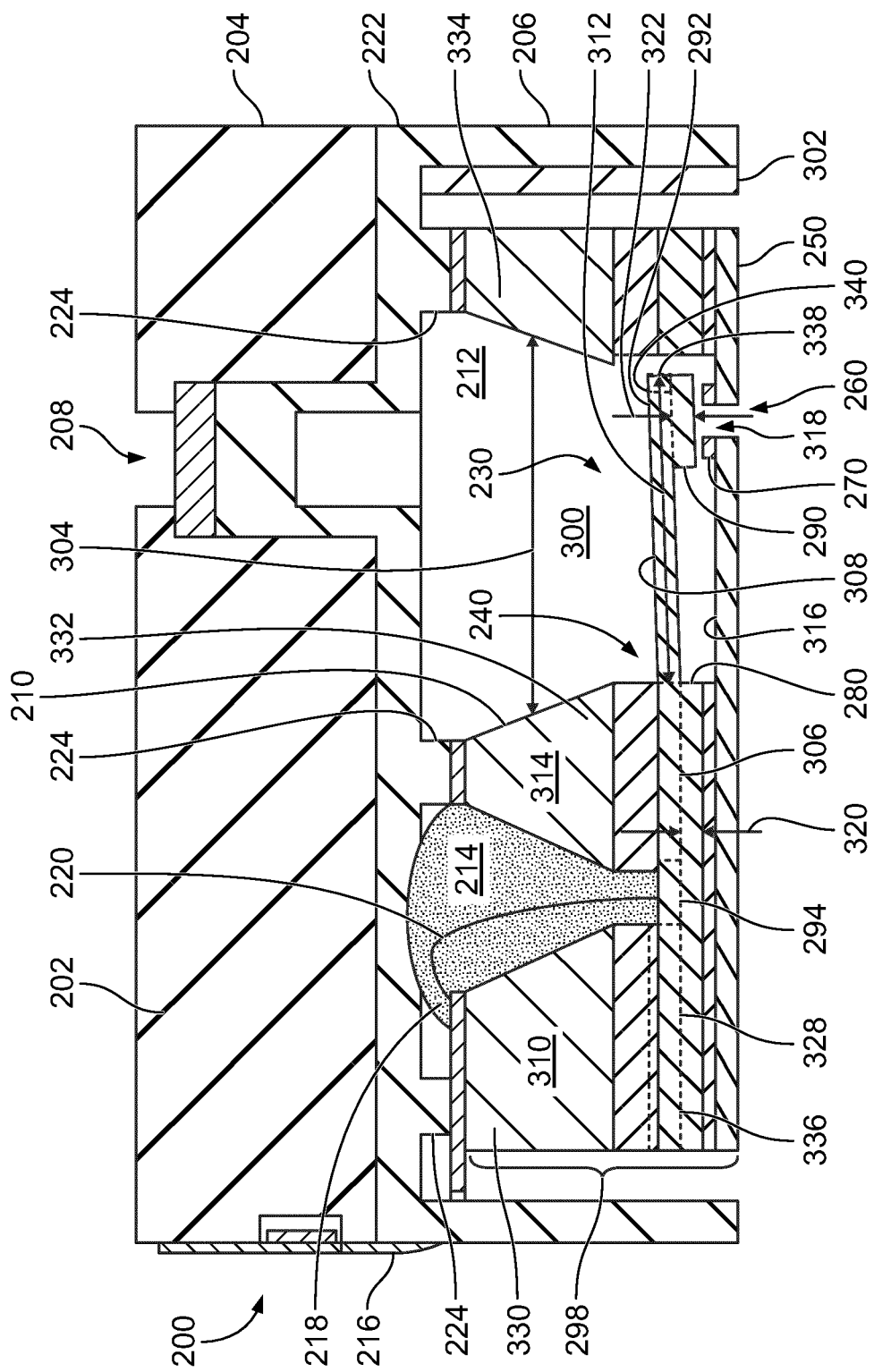
FIG. 5A is a-cross sectional view of a jetting assembly including a micro-valve, according to an example embodiment.

Referring now to FIG. 5A, a cross sectional view of a jetting assembly 200 including a micro-valve 230 is shown, according to an example embodiment. In some embodiments, jetting assembly 200 is an example embodiment of the jetting assembly 100 described with respect to FIGS. 1, 2, 3, and 4A-4B. As shown, jetting assembly 200 includes a carrier 202 attached to a valve body 298 via a structural layer 222. In some embodiments, the carrier 202 may include the structural layer 222.

Carrier 202 includes an upper portion 204 and a housing portion 206 extending from an edge of upper portion 204. Upper portion 204 includes a septum 208 by which pressurized ink is provided. Housing portion 206 defines a cavity into which the valve body 298 is disposed. Valve body 298 includes an input fluid manifold 210 and the micro-valve 230. As shown, input fluid manifold 210 and micro-valve 230 define a reservoir 300 configured to hold a volume of pressured fluid received from an external fluid supply via septum 208. In various embodiments, the pressurized fluid held within the reservoir 300 is a combination of an ink and additional fluids in a liquid state.

Carrier 202 may be formed of plastic, ceramic, or any other suitable material. Carrier 202 facilitates operation of the jetting assembly 200 by providing structural support to valve body 298. For example, in some embodiments, peripheral edges of valve body 298 are attached to housing portion 206 via layers of adhesive 302 disposed at the inner surface of housing portion 206. Such adhesive facilitates maintenance of a desired relative positioning between micro-valve 230 and input fluid manifold 210.

In various embodiments, input fluid manifold 210 is pre-formed prior to its attachment to the additional components of the jetting assembly 200. Input fluid manifold 210 is formed by a body 310 (e.g., formed from glass, silicon, silica, etc.) having any suitable thickness (e.g., 500 microns). As shown, input fluid manifold 210 is pre-formed to include a first arm 330, a second arm 332, and a third arm 334. As used herein, the term "arm," when used to describe the input fluid manifold 210, is used to describe a structure separating openings contained in the input fluid manifold 210. As such, the arms 330, 332, and 334 may have any suitable shape. For example, in some embodiments, the arms 330, 332, and 334 are substantially rectangular-shaped, having substantially planar side surfaces. In other embodiments, the side surfaces may be angled such that the arms 330, 332, and 334 are substantially trapezoidal-shaped. The arms 330, 332, and 334 may be formed by creating openings in a structure (e.g., a silicon or glass structure) using any suitable method (e.g., wet etching or dry etching such as deep reactive ion etching).

As shown, a first channel 212 separates the arms 330 and 332 from one another and a second channel 214 separates the arms 332 and 334 from one another. The first and second channels 214 are substantially linear and parallel to one another in the shown embodiment, but input fluid manifold 210 may be arranged as needed for the arrangement of micro-valves to be disposed thereon. First channel 212 is formed to have a width 304 bearing a predetermined relationship to a length 312 of a cantilevered portion 308 of an actuating beam 240 of the micro-valve 230, for example, in a range of about 500-1,000 micron. For example, first channel 212 may be formed to have a width 304 greater than a desired length 312 of cantilevered portion 308 by a threshold amount. Second channel 214 provides an avenue for an electrical connection to be formed between the actuating beam 240 and a flex circuit 216 via wire bonds 220 extending in between. Beneficially, using such an arrangement internalizes electrical connections between actuating beam 240 and flex circuit 216. In other words, electrical connections between such components are not external to carrier 202, and are thus less vulnerable to degradation. In various embodiments, the first channel 212 and/or the second channel 214 may have inclined sidewalls.

As shown, second channel 214 is substantially filled with an encapsulant 218. Encapsulant 218 may include an epoxy-type or any other suitable material. Encapsulant 218 envelopes electrical connections formed between wire bonds 220, the flex circuit 216, and actuating beam 240 and is configured to protect the wire bonds 220 from physical damage, moisture and corrosion. Thus, encapsulant 218 ensures the maintenance of an adequate electrical connection between flex circuit 216 and actuating beams 240 to facilitate providing electrical control signals to actuating beams 240 to cause movement thereof to open and close micro-valve 230.

The second arm 332 serves as a barrier preventing fluid contained in the reservoir 300 from reaching the electrical connections. The portion 314 of input fluid manifold 210 separating the first and second channels 212 and 214 serves as a barrier preventing fluid contained in the reservoir 300 from reaching the electrical connections. As such, input fluid manifold 210 serves as both part of the reservoir 300 for pressured fluid received from an external fluid supply and an insulating barrier between the pressured fluids and any electrical connections contained within jetting assembly 200. First and second channels 212 and 214 may be formed using any suitable process (e.g., via sandblasting, physical or chemical etching, drilling). In some embodiments, rather than being constructed of glass, input fluid manifold 210 is constructed of silicon, silica, ceramics or any other suitable material. In some embodiments, the input fluid manifold 210 may be bonded to the micro-valve 230 via glass frit, solder or any other suitable adhesive.

With continued reference to FIG. 5A, micro-valve 230 includes an orifice plate 250 attached to actuating beam 240. The orifice plate 250 may be formed from any suitable material, for example, glass, stainless steel, nickel, nickel with another layer of electroplated metal (e.g., stainless steel), polyimide (e.g., kapton) or a negative photoresist (e.g., SU-8, polymethylmethacrylate, etc.). In some embodiments, the orifice plate 250 may be substantially flat, for example, have a flatness with a coefficient of variance of less than 3 microns over a length and width of the orifice plate 250 of at least 15 mm, such that the orifice plate 250 is substantially free of bow or twist. Furthermore, the orifice plate 250 may have any suitable thickness. In some embodiments, the orifice plate 250 may have a thickness in a range of 30 microns to 60 microns (30, 40, 50, or 60 microns). In other embodiments, the orifice plate 250 may have a thickness in a range of 100 microns to 400 microns (e.g., 100, 150, 200, 250, 300, 350, or 400 microns). Thicker orifice plates 250 may facilitate realization of a flatter orifice plate.

Orifice plate 250 is substantially planar and includes an orifice 260 extending between surfaces thereof. In various embodiments, the orifice 260 is substantially cylindrical-shaped and has a central axis that is perpendicular or substantially perpendicular to surfaces of orifice plate 250. A valve seat 270 is disposed on an internal surface 316 of orifice plate 250 proximate to orifice 260. In various embodiments, valve seat 270 comprises a compliant material that surrounds or substantially surrounds orifice 260. In some embodiments, valve seat 270 is constructed from an epoxy-based adhesive such as an SU-8 photoresist. In other embodiments, the valve seat 270 may be formed from a moldable polymer, for example, polydimethylsiloxane or silicone rubber. In still other embodiments, the valve seat 270 may be formed from a non-compliant material such as silicon. In some embodiments, a compliant layer, for example, a gold layer may be disposed on a surface of the valve seat 270 which is contacted by the actuating beam 240. Valve seat 270 defies an interior opening 318 substantially aligned with orifice 260 to create an outlet for pressured fluid contained in the reservoir 300. In particular embodiments, the valve seat 270 might be excluded.

As shown, the actuating beam 240 includes a base portion 306 and a cantilevered portion 308. Base portion 306 extends underneath the portion 314 of input fluid manifold 210 separating the first and second channels 212 and 214. As shown, the base portion 306 includes an electrical connection portion 294 in a region that overlaps with the second channel 214. Electrical connection portion 294 includes an electrode through which an electrical connection is formed with flex circuit 216 via wire bonds 220. The cantilevered portion 308 extends into the reservoir 300 from the portion 314 of input fluid manifold 210. As shown, cantilevered portion 308 is disposed on a spacing member 280 and, as a result, is spatially separated from orifice plate 250. Thus, there is space on either side of cantilevered portion 308 such that the actuating beam 240 may bend towards and/or away from the orifice plate 250 as a result of application of electrical signals thereto via electrical connection portion 294. The spacing member 280 is configured to prevent squeeze film damping of the actuating beam.

Cantilevered portion 308 has a length 312 such that the cantilevered portion extends from a boundary of the reservoir 300 by a predetermined distance. In various embodiments, the predetermined distance is specifically selected such that a portion 292 of cantilevered portion 308 overlaps the valve seat 270 and orifice 260. A sealing member 290 extends from the portion 292 of the actuating beam 240 overlapping orifice 260. In some embodiments, the sealing member 290 is constructed to have a shape that substantially corresponds to a shape of orifice 260. For example, in one embodiment, both orifice 260 and sealing member 290 are substantially cylindrical-shaped, with sealing member 290 having a larger outer diameter. Such a configuration facilitates sealing member 290 covering orifice 260 in its entirety to enable a seal to be formed between sealing member 290 and valve seat 270. In other embodiments, the orifice 260 may have any other shape, e.g., star shape, square, rectangular, polygonal, elliptical or an asymmetric shape. In particular embodiments, the valve seat 270 may define a recess size and shaped to receive the sealing member 290. In various embodiments, the orifice plate 250 and therefore, the orifice 260 may be formed from a non-wetting (e.g., hydrophobic) material such as silicon or Teflon. In other embodiments, a non-wetting (e.g., hydrophobic) coating may be disposed on an inner wall or surface of the orifice 260 or the fluid outlet formed by the valve seat 270 and orifice 260.

Such coatings may include, for example, Teflon, nanoparticles, an oleophilic coating or any other suitable coating.

In various embodiments, spacing member 280 and sealing member 290 are constructed of the same materials and have equivalent or substantially equivalent thicknesses 320 and 322 (e.g., silicon, SU-8, silicon rubber, polymethylmethacrylate, etc.). In such embodiments, when actuating beam 240 extends parallel to orifice plate 250, lower surfaces of spacing member 280 and sealing member 290 are aligned with one another. When actuating beam 240 is placed into a closed position (as described herein), a surface of sealing member 290 contacts valve seat 270 to close the fluid outlet formed at orifice 260 (e.g., a sealing member surface of the sealing member 290 may be configured to extend approximately 2 microns beneath a lower surface of spacing member 280 if the valve seat 270 was not present). Valve seat 270 and sealing member 290 are dimensioned such that sufficient surface area of the sealing member 290 contacts valve seat 270 when actuating beam 240 is placed in the closed position (e.g., when an electrical signal is removed from or applied to the actuating beam 240 via wire bonds 220) to prevent fluid from traveling from reservoir 300 to orifice 260. For example, the sealing member 290 may have a larger diameter or otherwise cross-section than the valve seat 270. In other embodiments, the sealing member 290 may have a smaller diameter or otherwise cross-section than the valve seat 270. In some embodiments, a compliant material (e.g., a gold layer) maybe disposed on a surface of the sealing member 290 that is configured to contact the valve seat 270.

Various aspects of jetting assembly 200 are designed to ensure formation of an adequate seal between valve seat 270 and sealing member 290. For example, structural layer 222 disposed on input fluid manifold 210 prevents bowing of orifice plate 250 resulting from stressed induced thereon via adhesives coupling components of micro-valve 230 to one another and the micro-valve 230 to housing portion 206. In various embodiments, structural layer 222 is constructed to have a greater rigidity than orifice plate 250 to perform this function. Structural layer 222 may be constructed of silicon or any other suitable material. As shown, structural layer 222 includes protruding portions 224 extending from a main portion thereof. Protruding portions 224 are attached to an upper surface of input fluid manifold 210 (e.g., at boundaries of first and second channels 212 and 214). In certain embodiments, protruding portions 224 are omitted. A seal is formed at protruding portions 224 via, for example, an adhesive disposed between structural layer 222 and flex circuit 216. Protruding portions 224 provide clearance above the input fluid manifold 210. Such clearance facilitates disposal of encapsulant 218 that completely covers all points of contact between wire bond 220 and flex circuit 216. In some embodiments, the carrier 202 may include the structural layer 222 such that the stiffness is provided by the carrier 202.

In another aspect, actuating beam 240 is constructed such that a tight seal is formed at the interface between the valve seat 270 and the sealing member 290 when in the closed position. Actuating beam 240 may include at least one layer of piezoelectric material. The layer of piezoelectric material may include lead zirconate titanate (PZT) or any suitable material. The layer of piezoelectric material has electrodes electrically connected thereto. In various embodiments, wire bonds 220 are attached to said electrodes such that electrical signals from flex circuit 216 are provided to the layer of piezoelectric material via the electrodes. The electrical signals cause the actuating beam 240 to move (e.g., bend, turn, etc.) with respect to its default position. In other embodiments, the actuating beam 240 may include a stainless steel actuating beam (e.g., having a length of approximately 1 mm). In still other embodiments, the actuating beam 240 may include a bimorph beam having a two layers of a piezoelectric material disposed on either side of a base layer (e.g., a base silicon layer). An electrical signal (e.g., an electrical voltage) may be applied to either one of the piezoelectric layers so as to urge the actuating beam to bend towards the corresponding piezoelectric layer. The two piezoelectric layers may include the same piezoelectric material or different piezoelectric materials. In particular embodiments, a different electrical signal may be applied to each of the piezoelectric layer so as to bend or curve the actuating beam a predetermined distance.

As shown, wire bonds 220 are attached to actuating beam 240 at an electrical connection portion 294 thereof. Electrical connection portion 294 includes a wire-bonding pad (e.g., constructed of gold, platinum, rubidium, etc.) conductively connected to at least one electrode within actuating beam 240. Beneficially, electrical connection portion 294 is separated from the cantilevered portion of actuating beam 240. In other words, electrical connection portion 294 is separated from the fluid contained in jetting assembly 200 via seals formed at the points of connection between input fluid manifold 210 and actuating beam 240. In some embodiments, the wire bonds 220 and/or the encapsulant 218 may be routed out through an opening provided in the orifice plate 250.

In various embodiments, actuating beam 240 is constructed such that the closed position is its default position. In other words, various layers in the actuating beam 240 are constructed such that the actuating beam curves towards orifice 260 as a result of force supplied via pressured fluid contained in the reservoir. A tuning layer within actuating beam 240 may be constructed to be in a state of compressive stress to cause a curvature in actuating beam towards the orifice. As a result of such curvature, sealing member 290 contacts valve seat 270, for example, in the absence of any electrical signals applied to the actuating beam 240 to close the fluid outlet. The degree of curvature may be specifically selected to form a tight seal at the interface between sealing member 290 and valve seat 270 with the actuating beam 240 in the default position. Beneficially, such a default seal prevents evaporation of the fluid contained in jetting assembly 200, which prevents clogging and other defects.

The actuating beam 240, as shown in FIG. 5A, is bent away from orifice plate 250. Accomplishment of such a bend results from application of an electrical signal to actuating beam 240 via flex circuit 216. For example, flex circuit 216 may be electrically connected to an external controller supplying electrical signals relayed to actuating beam 240.

As illustrated by FIG. 5A, application of the electrical signal causes the actuating beam 240 to temporarily depart from its default position. For example, in various embodiments, the actuating beam 240 moves upward away from orifice 260 such that a portion of a sealing member surface of sealing member 290 is at least 10 microns from an upper surface of valve seat 270. In one embodiment, a central portion of the sealing member surface is approximately 15 microns from the valve seat 270 at a peak of its oscillatory pattern. As a result, an opening is temporarily formed between valve seat 270 and sealing member 290. The opening provides a pathway for a volume of fluid to enter orifice 260 to form a droplet at an exterior surface of the orifice plate 250. The droplets are deposited onto a substrate to form a pattern determined via the control signals supplied to each of the actuating beams 240 of each of the micro-valves 230 of jetting assembly 200. As will be appreciated, the frequency with which the actuating beam 240 departs from its default position to a position such as the one shown in FIG. 5 may vary depending on the implementation. For example, in one embodiment, the actuating beam 240 oscillates at a frequency of approximately 12 kHz. However, the actuating beam 240 may oscillate at a smaller (e.g., 10 kHz) or larger frequency (e.g., 20 kHz) in other implementations.

Figure 5B:
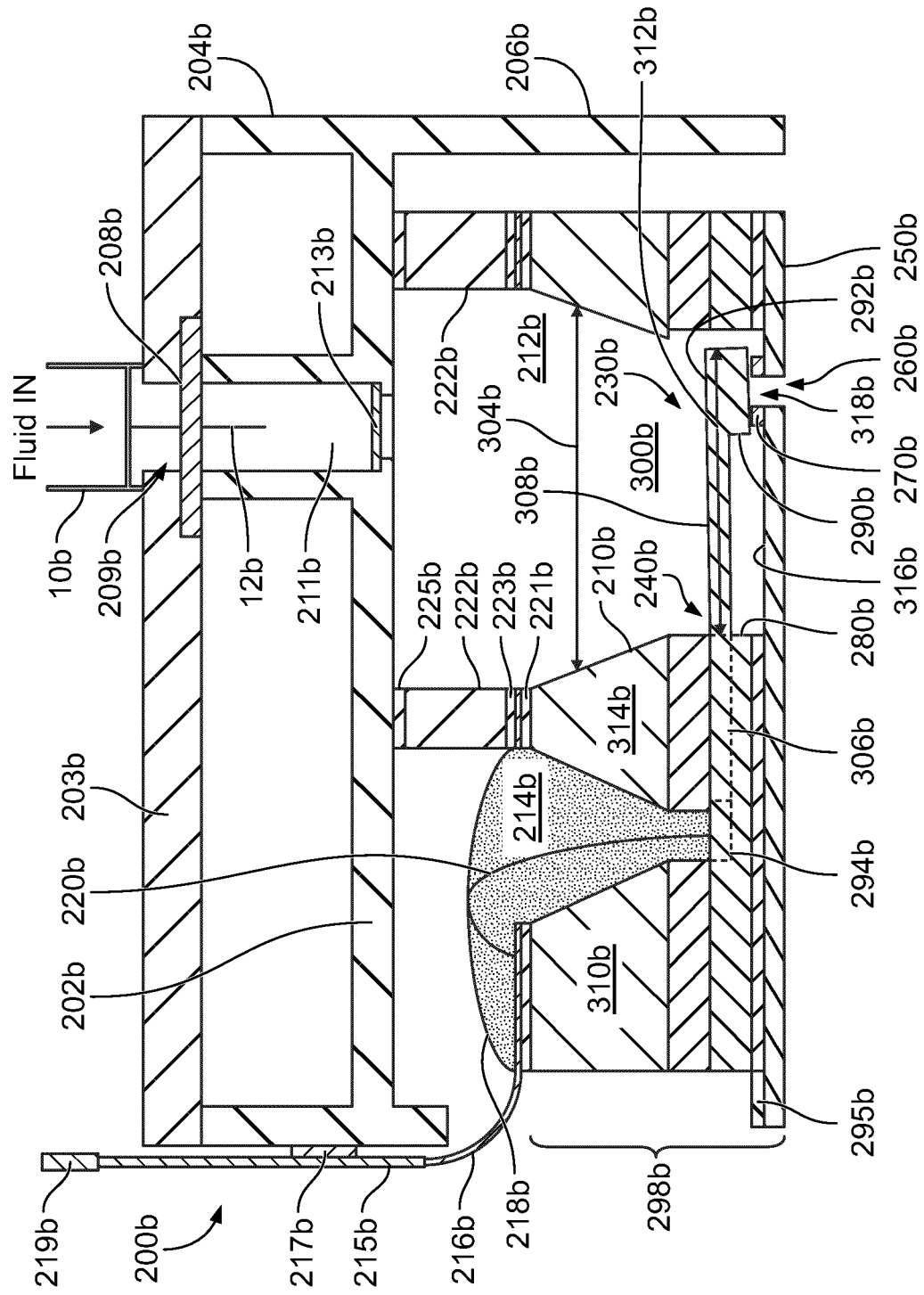
FIG. 5B is a-cross sectional view of a jetting assembly including a micro-valve, according to another example embodiment.

Referring now to FIG. 5B, a cross sectional view of a jetting assembly 200b including a micro-valve 230b is shown, according to an example embodiment. In some embodiments, jetting assembly 200b is an example embodiment of the jetting assembly 100 described with respect to FIGS. 1, 2, 3, and 4A-4B. As shown, jetting assembly 200b includes a carrier 202b attached to a valve body 298b via an interposer 222b.

Carrier 202b includes an upper portion 204b and a housing portion 206b extending from an edge of upper portion 204b. A fluid channel 211b is provided in the upper portion 204b. A septum 208b (e.g., a rubber or foam septum) is positioned at an inlet of the fluid channel 211b and a filter 213b is positioned at an outlet of the fluid channel 211b. A cover 203b (e.g., a plastic or glass cover) is positioned on the carrier 202b such that the septum 208b is positioned between the carrier 202b and the cover 203b, and secured therebetween. An opening 209b may be defined in the cover 203b and corresponds to the inlet of the fluid channel 211b. A fluid connector 10b is coupled to the cover 203b or the inlet of the fluid channel 211b. The fluid connector 10b includes an insertion needle 12b configured to pierce the septum 208b and be disposed therethrough in the fluid channel 211b. The fluid connector 10b is configured to pump pressurized fluid (e.g., ink) into an input fluid manifold 210b of the jetting assembly 200b via the insertion needle 12b. Furthermore, the filter 213b is configured to filter particles from the fluid before the fluid is communicated into a reservoir 300b. In some embodiments, the insertion needle 12b may be formed from or coated with a non-wetting (e.g., a hydrophobic material such as Teflon). In other embodiment, the insertion needle 12b may include heating elements, or an electric current may be provided to the insertion needle 12b so as to heat the insertion needle 12b and thereby, the fluid flowing therethrough into the reservoir 300b. In still other embodiments, metallic needles or any other heating element may be provided in the input fluid manifold 210b for heating the fluid contained therein. While shown as only including the fluid channel 211b, in some embodiments, the carrier 202b may also define a second fluid channel for allowing the fluid to be drawn out of the carrier 202b, i.e., cause the fluid to be circulated through the carrier 202b.

The housing portion 206b defines a cavity or a boundary within which the valve body 298b is disposed. Valve body 298 includes the input fluid manifold 210b and the micro-valve 230b. As shown, input fluid manifold 210b and micro-valve 230b define the reservoir 300b configured to hold a volume of pressured fluid received from an external fluid supply via the septum 208b. In various embodiments, the pressurized fluid held within the reservoir 300b is a combination of an ink and additional fluids in a liquid state.

In various embodiments, input fluid manifold 210b is pre-formed prior to its attachment to the additional components of the jetting assembly 200b. Fluid manifold 210b may be formed by a glass body 310b having any suitable thickness (e.g., 500 microns). As shown, input fluid manifold 210b is pre-formed to include a first channel 212b and a second channel 214b. First channel 212b is formed to have a width 304b bearing a predetermined relationship to a length 312b of a cantilevered portion 308b of an actuating beam 240b of the micro-valve 230b. Second channel 214b provides an avenue for an electrical connection to be formed between the actuating beam 240b and a flex circuit 216b via wire bonds 220b extending in between.

As shown, second channel 214b is substantially filled with an encapsulant 218b. The encapsulant 218b ensures the maintenance of an adequate electrical connection between flex circuit 216b and actuating beams 240b to facilitate providing electrical control signals to actuating beams 240b to cause movement thereof to open and close micro-valve 230b, and protects a wire bond 220b from physical damage or moisture, as previously described herein.

The portion 314b of input fluid manifold 210b separating the first and second channels 212b and 214b serves as a barrier preventing fluid contained in the reservoir 300b from reaching the electrical connections. As such, input fluid manifold 210b serves as both part of the reservoir 300b for pressured fluid received from an external fluid supply and an insulating barrier between the pressured fluids and any electrical connections contained within jetting assembly 200b.

The micro-valve 230b includes an orifice plate 250b attached to actuating beam 240b. Orifice plate 250b is substantially planar and includes an orifice 260b extending between surfaces thereof. A valve seat 270b is disposed on an internal surface 316b of orifice plate 250b proximate to orifice 260b. Valve seat 270b defies an interior opening 318b substantially aligned with orifice 260b to create an outlet for pressured fluid contained in the reservoir 300b. In particular embodiments, the valve seat 270b might be excluded. In some embodiments, the orifice plate 250b or any other orifice plate described herein may also be grounded. For example, an electrical ground connector 295b (e.g., a bonding pad such as a gold bond pad) may be provided on the orifice plate 250b and configured to allow the orifice plate 250b to be electrically ground (e.g., via electrical coupling to a system ground).

The actuating beam 240b includes a base portion 306b and a cantilevered portion 308b. Base portion 306b extends underneath the portion 314b of input fluid manifold 210b separating the first and second channels 212b and 214b. As shown, the base portion 306b includes an electrical connection portion 294b in a region that overlaps with the second channel 214b. Electrical connection portion 294b includes an electrode through which an electrical connection is formed with flex circuit 216b via wire bonds 220b. The cantilevered portion 308b extends into the reservoir 300b from the portion 314b of input fluid manifold 210b. As shown, cantilevered portion 308b is disposed on a spacing member 280b and, as a result, is spatially separated from orifice plate 250b.

Cantilevered portion 308b has a length 312b such that the cantilevered portion extends from a boundary of the reservoir 300b by a predetermined distance. In various embodiments, the predetermined distance is specifically selected such that a portion 292b of cantilevered portion 308b overlaps the valve seat 270b and orifice 260b. A sealing member 290b extends from the portion 292b of the actuating beam 240b overlapping the orifice 260b. In some embodiments, sealing member 290b is constructed to have a shape that substantially corresponds to a shape of orifice 260b.

The flex circuit 216b is positioned on the glass body 310b and the portion 314b of the input fluid manifold 210b, and coupled thereto via a first adhesive layer 221b (e.g., SU-8, silicone rubber, glue, epoxy, etc.). An interposer 222b is positioned between the upper portion 204b of the carrier 202*b* and the input fluid manifold 210*b* so as to create gap between the upper portion 204*b* and the input fluid manifold 210*b* via the first adhesive layer 221*b*. This allows sufficient space for disposing the encapsulant 218 and increases a volume of the input fluid manifold 210*b*. As shown in FIG. 5B, the interposer 222*b* is positioned on and coupled to a portion of the flex circuit 216*b* via a second adhesive layer 223*b* (e.g., SU-8, silicone, or any other adhesive). Furthermore, the interposer 222*b* is coupled to a side wall of the upper portion 204*b* of the carrier 202*b* proximate to the micro-valve 230*b* via a third adhesive layer 225*b* (e.g., SU-8, silicone, or any other adhesive).

The interposer 222*b* may be formed from a strong and rigid material (e.g., plastic, silicon, glass, ceramics, etc.) and disposed on input fluid manifold 210*b* so as to prevent bowing of the orifice plate 250*b* resulting from stressed induced thereon via adhesives coupling components of micro-valve 230*b* to one another and the micro-valve 230*b* to housing portion 206*b*. In various embodiments, interposer 222*b* is constructed to have a greater rigidity than orifice plate 250*b* to perform this function.

In another aspect, actuating beam 240*b* is constructed such that a tight seal is formed at the interface between valve seat 270*b* and sealing member 290*b* when in the closed position. Actuating beam 240*b* may include at least one layer of piezoelectric material (e.g., lead zirconate titanate (PZT) or any suitable material). The layer of piezoelectric material has electrodes electrically connected thereto and wire bonds 220*b* are attached to said electrodes such that electrical signals from flex circuit 216*b* are provided to the layer of piezoelectric material via the electrodes. The electrical signals cause the actuating beam 240*b* to move (e.g., bend, turn, etc.) with respect to its default position.

As shown, wire bonds 220*b* are attached to actuating beam 240*b* at an electrical connection portion 294*b* thereof, substantially similar to the wire bonds 220 described with respect to the jetting assembly 200 of FIG. 5A. In various embodiments, actuating beam 240*b* is constructed such that the closed position is its default position, as described in detail with respect to the actuating beam 240 of FIG. 5A.

The actuating beam 240*b*, as shown in FIG. 5B, is bent away from orifice plate 250*b*. Accomplishment of such a bend results from application of an electrical signal to actuating beam 240*b* via flex circuit 216*b*. For example, flex circuit 216*b* may be electrically connected to a circuit board 215*b* (e.g., a printed circuit board) extending perpendicular to a longitudinal axis of the actuating beam 240*b* along a sidewall of the carrier 202*b*. An identification tag 217*b* (e.g., the identification tag 106) may be positioned between the circuit board 215*b* and the sidewall of the carrier 202*b*. An electrical connector 219*b* is electrically coupled to the circuit board 215*b* and configured to electrically connect the flex circuit 216*b* to an external controller supplying electrical signals relayed to actuating beam 240*b* via the circuit board 215*b*.

As illustrated by FIG. 5B, application of the electrical signal causes the actuating beam 240*b* to temporarily depart from its default position. For example, in various embodiments, the actuating beam 240*b* moves upward away from orifice 260*b* such that a portion of a sealing member surface of sealing member 290*b* is at least 10 microns from an upper surface of valve seat 270*b*, as described in detail with respect to the actuating beam 240 of FIG. 5A.

Figure 6:
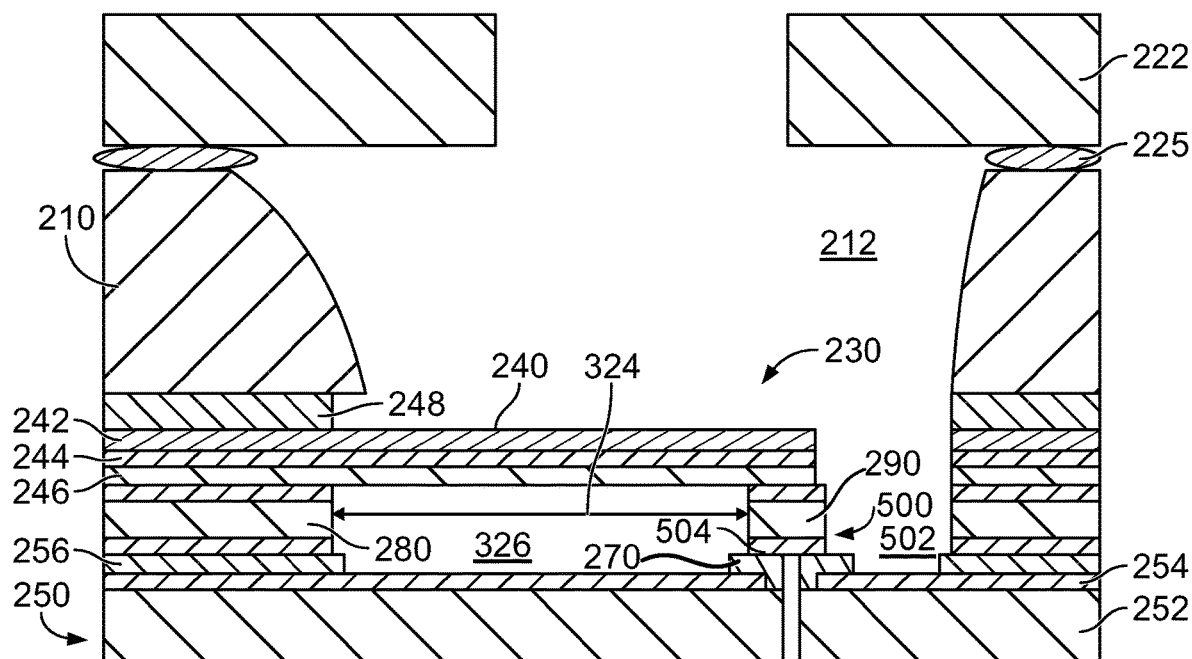
FIG. 6 is cross-sectional view providing a more detailed view of the jetting assembly shown in FIG. 5A.

Referring now to FIG. 6, a more detailed view showing various components of jetting assembly 200 described with respect to FIG. 5A is shown, according to an exemplary embodiment. As shown, actuating beam 240 includes an actuating portion 242, a tuning layer 244, and a non-active layer 246. Non-active layer 246 serves as a base for the tuning layer 244 and the actuating portion 242. The structure of actuating portion 242 and the tuning layer 244 are described in greater detail with respect to FIG. 7. In some embodiments, non-active layer 246 is constructed from silicon or other suitable material. In some embodiments, non-active layer 246, the spacing member 280, and sealing member 290 are all constructed from the same material (e.g., monolithically formed from a silicon wafer). In an example embodiment, non-active layer 246, the spacing member 280, and sealing member 290 are formed from a double silicon-on-insulator (SOI) wafer.

Spacing member 280 is shown to include an intermediate layer interposed between two peripheral layers. In an example embodiment, the intermediate layer and non-active layer 246 comprise two silicon layers of a double SOI wafer, with the peripheral layers disposed on either side of the intermediate layer including silicon oxide layers. In this example, the sealing member 290 and spacing member 280 are formed through etching the surface of the double SOI wafer opposite the actuating portion 242. Oxide layers serve to control or stop the etching process once, for example, the entirety of the intermediate layer forming the spacing member 280 is removed in a region separating the spacing member 280 and sealing member 290. Such a process provides precise control over both the width and thickness of the spacing and sealing members 280 and 290.

As will be appreciated, the size of sealing member 290 may contribute to the resonance frequency of actuating beam 240. Larger amounts of material disposed at or near an end of actuating beam 240 generally results in a lower resonance frequency of actuating beam. Additionally, such larger amounts of material will impact the actuating beam 240's default curvature induced from pressurized fluid contacting actuating beam 240. Accordingly, the desired size of sealing member 290 impacts various other design choices of actuating beam 240. Such design choices are described in greater detail with respect to FIG. 7A. In some embodiments, the sealing member 290 is sized based on the dimensions of orifice 260. In some embodiments, the sealing member 290 is substantially cylindrical and has a diameter approximately 1.5 times that of the orifice 260. For example, in one embodiment, sealing member 290 has a diameter of approximately 90 microns when the orifice 260 has a diameter of approximately 60 microns. Such a configuration facilitates alignment between sealing member 290 and orifice 260 such that sealing member 290 completely covers orifice 260 upon contacting valve seat 270. In another embodiment, the sealing member 290 is sized such that it has a surface area that approximately doubles that of the orifice 260 (e.g., the spacing member 280 may have a diameter of approximately 150 microns, with the orifice 260 being approximately 75 microns in diameter). Such an embodiment provides greater tolerance for aligning sealing member 290 and orifice 260 to facilitate creating the seal between valve seat 270 and sealing member 290. In other embodiments, the diameter of the sealing member 290 may be 2 times, 2.5 times, 3 times, 3.5 times or 4 times to the diameter of the orifice 260. In various embodiments, a ratio of a length to diameter of the orifice 260 may be in range of 1:1 to 15:1. The ratio may influence shape, size and/or volume of a fluid droplet ejected through the orifice and may be varies based on a particular application.

Beneficially, the gap 324 between spacing member 280 and sealing member 290 creates a volume of separation 326 between actuating beam 240 and orifice plate 250. The volume of separation 326 prevents squeeze film damping of oscillations of actuating beam 240. In other words, insufficient separation between orifice plate 250 and actuating beam 240 would lead to drag resulting from fluid having to enter and/or exit the volume of separation 326 as the actuating beam 240 opens and closes the orifice 260. Having the greater volume of separation produced via spacing member 280 reduces such drag and therefore facilitates actuating beam 240 oscillating at faster frequencies.

With continued reference to FIG. 6, orifice plate 250 includes a base layer 252 and intermediate layer 254. For example, in one embodiment, base layer 252 comprises a silicon layer and intermediate layer 254 includes a silicon oxide layer. In the embodiment shown, a portion of the intermediate layer 254 proximate to orifice 260 is removed and a first portion of the valve seat 270 is disposed directly on base layer 252 and a second portion of the valve seat 270 is disposed on the intermediate layer 254. It should be understood that, in alternative embodiments, intermediate layer 254 extends all the way to boundaries of orifice 260 and valve seat 270 is disposed on intermediate layer 254. In still other embodiments, the removed portion of the intermediate layer 254 may have a cross-section equal to or greater than a cross-section of the valve seat 270 such that the valve seat 270 is disposed entirely on the base layer 252.

Due to the criticality of the spatial relationship between spacing member 280 and valve seat 270, attachment of spacing member 280 to orifice plate 250 may be performed in a manner allowing precise control over the resulting distance between actuating beam 240 and orifice plate 250. As shown, an adhesive layer 256 is used to attach spacing member 280 to orifice plate 250. In various embodiments, a precise amount of epoxy-based adhesive (e.g., SU-8, polymethylmethacrylate, silicone, etc.) is applied to intermediate layer 254 prior placement of the combination of spacing member 280 and actuating beam 240 thereon. The adhesive is then cured to form an adhesive layer 256 having a precisely controlled thickness. For example, in some embodiments, a lower-most surface of spacing member 280 is substantially aligned with an upper surface of valve seat 270. Any desired relationship between such surfaces may be obtained to create a relationship between sealing member 290 and valve seat 270 that creates an adequate seal when actuating beam 240 is in the default position. In various embodiments, the adhesive layer 256 and the valve seat 270 may be formed from the same material (e.g., SU-8) in a single photolithographic process.

In various embodiments, once the actuating beam 240 and orifice plate 250 are attached to one another via adhesive layer 256 (e.g., to form micro-valve 230), an additional adhesive layer 248 is applied to the periphery of the actuating beam 240. The additional adhesive layer 248 is used to attach input fluid manifold 210 to actuating beam 240. The structural layer 222 (or the interposer 222b) may be positioned on the input fluid manifold 210 and coupled thereto via a second adhesive layer 225. In some embodiments, the additional adhesive layer 248 and the second adhesive layer 225 may include the same material as the adhesive layer 256.

In the example shown with respect to FIG. 6, the micro-valve 230 includes a sealing structure 500 including various components through which a seal is formed to separate the orifice 260 from a volume 502 proximate the actuating beam 240. In the example shown, the sealing structure 500 includes the sealing member 290 and the valve seat 270. As described herein, the actuating beam 240 is configured such that an orifice-facing surface 504 of the sealing member 290 contacts an upper surface of the valve seat 270 to form a seal at the interface between the valve seat 270 and the sealing member 290. The seal isolates the orifice 260 from the volume 502 such that minimal fluid escapes the jetting assembly 200 when no electrical signals are applied to the actuating beam 240. Several alternatives to the sealing structure 500 are described in more detail herein. In other embodiments, the valve seat 270 may be excluded such that the orifice facing surface of the sealing structure 500 contacts the orifice plate 250 so as to fluidly seal the orifice 260.

Figure 7A:
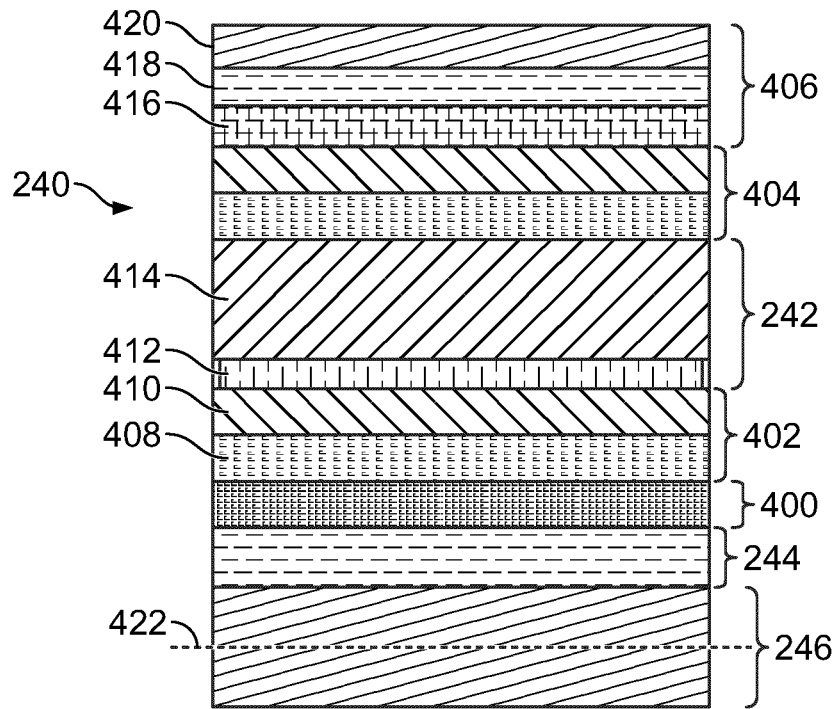
FIG. 7A is a cross-sectional view of an actuating beam of a micro-valve, according to an example embodiment.

Referring now to FIG. 7A, a more detailed view of actuating beam 240 is shown, according to an example embodiment and not to scale. As shown, actuating beam 240 includes the non-active layer 246, the tuning layer 244, a barrier layer 400, a first electrode portion 402, the actuating portion 242, a second electrode portion 404, and a passivation structure 406. As will be appreciated, actuating beam 240 may include more or fewer layers in various alternative embodiments.

In some embodiments, tuning layer 244 is disposed directly on non-active layer 246. Tuning layer 244 generally serves as an adhesion layer for facilitating deposition of the additional layers described herein. Additionally, as described herein a thickness of tuning layer 244 may play a critical role of determining an overall curvature in actuating beam 240 when in its default position. Speaking generally, tuning layer 244 is configured to have a predetermined tuning stress such that in the closed position, the sealing member 290 of the actuating beam 240 contacts and exerts a force on the valve seat 270 so as to fluidly seal the orifice 260. In some embodiments, in the absence of an electrical signal, the predetermined tuning stress is configured to cause the actuating beam 240 to curve towards the orifice 260 such that in the absence of the valve seat 270, the sealing member surface of the sealing member 290 would be positioned a predetermined distance (e.g., 2 microns) beneath a lower surface of the spacing member 280. For example, the tuning layer 244 may be placed into a state of compressive stress as a result of the deposition of the additional layers described herein. As such, the thicker tuning layer 244 is, the greater curvature of actuating beam 240 towards orifice 260 when in its default position. In one example embodiment, the tuning layer 244 is constructed of silicon dioxide.

Barrier layer 400 acts as a barrier against diffusion of materials contained in the piezoelectric layer 414 to the tuning layer 244. If left unchecked, such migration will lead to harmful mixing effects between constituent materials in the layers, adversely impacting performance. In various embodiments, barrier layer 400 is constructed of, for example, zirconium dioxide. As shown, first electrode portion 402 includes an adhesion layer 408 and a first electrode 410. The adhesion layer 408 facilitates deposition of the first electrode 410 on barrier layer 400 and prevents diffusion of matter in the first electrode 410 to other layers. In various embodiments, adhesion layer 408 is constructed of titanium dioxide. First electrode 410 may be constructed of platinum, gold, rubidium or any other suitable material to provide a conductive pathway for electrical signals to be provided to actuating portion 242. In some embodiments, first electrode portion 402 is only included in select portions of actuating beam 240. For example, first electrode portion 402 may only be included proximate to and/or within the electrical connection portion 294.

Actuating portion 242 may be formed from a single or multiple layers of any suitable piezoelectric material. In the example shown, active portion includes a growth template layer 412 and a piezoelectric layer 414. Growth template layer 412 serves as a seed layer facilitating growth of the piezoelectric layer 414 having a desired texture (e.g., the {001}crystal structure and corresponding texture) to ensure maximal piezoelectric response. In some embodiments, growth template layer 412 is constructed of lead titanate. Piezoelectric layer 414 may be constructed of any suitable material, such as lead zirconate titanate (PZT).

Piezoelectric layer 414 may be deposited using any method, such as, utilizing vacuum deposition or sol-gel deposition techniques. In some embodiments, piezoelectric layer 414 may have a thickness in a range of approximately 1-6 microns (e.g., 1, 2, 3, 4, 5, or 6 microns, inclusive) and is adapted to produce a deflection at an end of actuating beam 240 of approximately 10 microns when an electrical signal is applied thereto. A deflection of 10 microns (e.g., such that a surface of sealing member 290 departs from valve seat 270 by slightly less than that amount) may be sufficient to produce droplets at orifice 260 having a desired size. In some embodiments, piezoelectric layer 414 has a piezoelectric transverse coefficient (d31 value) magnitude of approximately 140 to 160 pm/V. This value may enable adequate deflection of actuating beam 240 to be generated via electrical signals supplied to first and second electrode portions 402 and 404.

As shown, second electrode portion 404 is disposed on actuating portion 242. In various embodiments, second electrode portion 404 is structured similarly to first electrode portion 402 described herein. Application of a voltage to the first electrode portion 402 and/or second electrode portion 404 thus induces a strain in piezoelectric layer 414, causing the entirety of actuating beam 240 to bend away from the orifice plate 250. Through application of periodic control signals to first and second electrodes, periodic cycling of actuating beam 240 generates droplets output from orifice 260 at a desired frequency. While FIG. 7A shows the first and second electrode portions 402 and 404 overlapping each other, in other locations, the first and second electrode portions 402 and 404 may not overlap. This may limit or prevent electron leakage between the first and second electrode portions 402 and 404 which can damage the piezoelectric layer 414 or cause electrical shorts.

In various embodiments, the electrodes contained in first and second electrode portions 402 and 404 are deposited in a non-annealed state. As a result, the electrodes are deposited in a substantially compressive state, which impacts the overall curvature of actuating beam 240 when in a default position. The mode of deposition of piezoelectric layer 414 may impact the compressive state of the electrodes. For example, in some circumstances, where the piezoelectric layer 414 is deposited (e.g., via a vapor deposition technique) and later cured at a predetermined temperature (e.g., of approximately 700 degrees C.), the curing may cause the electrode 410 to anneal and become removed from the compressive state. Such a removal impacts the overall balancing of stresses in actuating beam 240, which changes its default curvature. Accordingly, it may be beneficial to use a low-temperature deposition process for piezoelectric layer 414 (e.g., a low-temperature sol-gel deposition process or plasma-enhanced chemical vapor deposition process) to prevent the reversal of stresses in the electrodes. In various embodiments, second electrode portion 404 may be annealed at a higher temperature than the first electrode portion 402, for example, to create a predetermined tuning stress in the tuning layer 244.

The materials shown in FIG. 7A may extend substantially entirely through the length of actuating beam 240. As such, there is an overlap between electrode portions 402 and 404 and the reservoir formed via micro-valve 230. In various embodiments, the fluid contained in the reservoir is electrically conductive and/or corrosive to the materials forming the first and second electrode portions 402 and 404. Thus, it is preferable to isolate electrode portions 402 and 404 from the reservoir to prevent the fluid contained in the reservoir from contacting electrode portions 402 and 404.

In this regard, the passivation structure 406 is configured to perform such isolation. In the example shown, passivation structure 406 includes a dielectric layer 416, an insulator layer 418, and a barrier layer 420. Barrier layer 420 may be constructed of silicon nitride, which acts as a diffusion barrier against water molecules and ions contained in the fluid to prevent corrosion of electrode portions 402 and 404. In some embodiments, insulator layer 418 includes a silicon dioxide layer having a compressive stress that roughly counterbalances the tensile stress in the barrier layer 420. Dielectric layer 416 may be constructed of aluminum oxide to prevent oxidation of the additional layers contained in actuating beam 240. In some embodiments, an additional metal layer is disposed on barrier layer 420. For example, the metal layer may be constructed of Talinum oxide or any other suitable, chemically-resistant metal to further enhanced the protective properties of passivation structure 406. In particular embodiments, the barrier layer 420 may be formed from Teflon or parylene. In other embodiments, at least a portion of the actuating beam 240, i.e., the structure formed by the layers shown in FIG. 7A may be covered or over coated by a Teflon or parylene layer. Such an overcoat may prevent micro-cracks from forming in the layers of the actuating beam 240. In still other embodiments, the over coat may include a metallic layer, for example, a tantalum or palladium layer.

The addition of passivation structure 406 may significantly impact the default positioning of actuating beam 240. This is so because passivation structure 406 is offset from a neutral axis 422 of compression of the actuating beam 240. As shown, the neutral axis 422 is within the non-active layer 246, which means that the electrode portion 404 and passivation structure 406 are the most distant therefrom in actuating beam 240. Given this, the tensile or compressive stresses induced in such layers will greatly influence the default curvature of actuating beam 240. As such, the thickness of tuning layer 244 is selected based on the structure of various constituent layers of passivation structure 406.

Figure 7B:
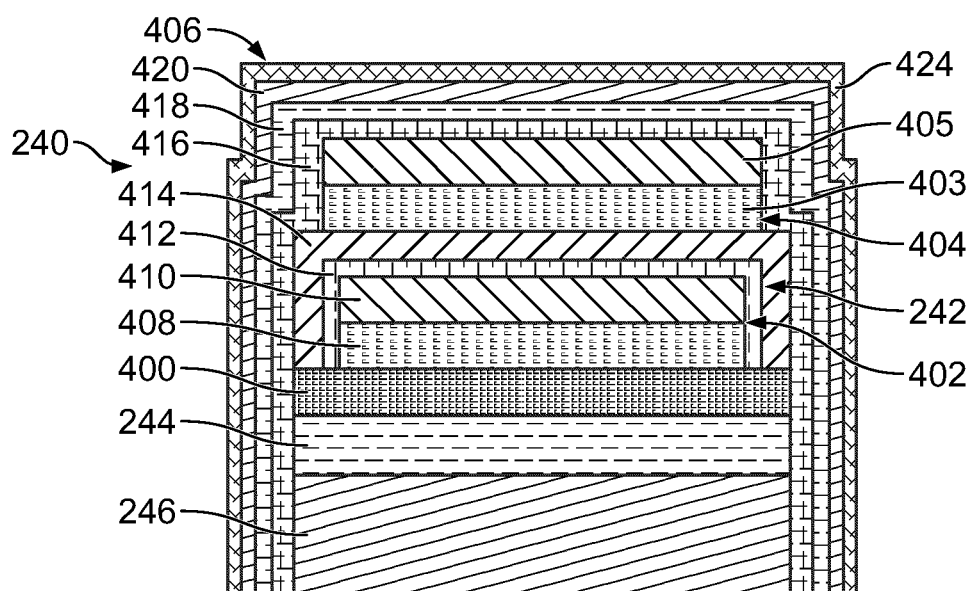
FIG. 7B is a front cross-sectional view of the actuating beam of FIG. 7A, according to another example embodiment.

FIG. 7B is front cross-sectional view of the actuating beam 240 showing an arrangement of each of the layers included in the actuating beam 240, according to an example embodiment and not to scale. As shown, actuating beam 240 includes the non-active layer 246, the tuning layer 244 and a barrier layer 400, as described with respect to FIG. 7A. The first electrode portion 402 includes the adhesion layer 408 (e.g., titanium dioxide) positioned on the barrier layer 400, and a conductive layer or electrode 410 (e.g., platinum, gold, rubidium, etc.) positioned thereon. The first electrode portion 402 is configured to have a width which is less than a width of the barrier layer 400 such that ends of the electrode portion 402 in a direction perpendicular to a longitudinal axis of the actuating beam 240 are located inwards of the ends of the barrier layer 400 in the same direction.

The actuating portion 242 including the seed layer 412 and the piezoelectric layer 414 is conformally disposed on the first electrode portion 402 so as to extend beyond the lateral ends of the first electrode portion 402 and contact the barrier layer 400. In this manner the piezoelectric layer completely surrounds or encapsulates at least the portion of the first electrode portion 402 which overlaps or is proximate to the second electrode portion 404. The second electrode portion 404 includes an adhesion layer 403 (e.g., titanium) and a conductive layer 405 (e.g., platinum, gold, rubidium, etc.). In some embodiments, the second electrode portion 404 may include only the conductive layer 405 disposed directly on the piezoelectric layer 414 (i.e., the adhesion layer 403 is omitted). Since the actuating portion 242 overlaps and extends beyond the ends of the first electrode portion 402, the actuating portion effectively electrically isolates the first electrode portion 402 from the second electrode portion 404, so as to prevent electron leakage and current migration which may be detrimental to the performance of the actuating beam 240.

The passivation structure 406 conformally coats exposed portions of each of the other layers 246, 244, 400, 402, 242 and 404. However, a bottom surface of the non-active layer 246 may not be coated with the passivation structure 406. The passivation structure 406 may include a dielectric layer 416, an insulator layer 418, a barrier layer 420, and a top passivation layer 424. Barrier layer 420 may be constructed of silicon nitride, which acts as a diffusion barrier against water molecules and ions contained in the fluid to prevent corrosion of electrode portions 402 and 404. Silicon nitride, however, is generally in a state of tensile stress once deposited on the remaining layer. Insulator layer 418 is configured to counterbalance such tensile stress. For example, in some embodiments, insulator layer 418 includes a silicon dioxide layer having a compressive stress that roughly counterbalances the tensile stress in barrier layer 420. In various embodiments, the barrier layer 420 may be positioned beneath the insulator layer 418. Dielectric layer 416 may be constructed of aluminum oxide, titanium oxide, zirconium oxide or zinc oxide to prevent oxidation of the additional layers contained in actuating beam 240. Thus, passivation structure 406 serves to prevent both corrosion and oxidation—two major sources of defects caused by the presence of fluids—in actuating beam 240, and thus ensures long-term performance of micro-valve 230. Furthermore, the top passivation layer 424 is disposed on the barrier layer 420 and may include a Teflon or parylene layer. Such an overcoat may prevent micro-cracks from forming in the layers of the actuating beam 240, and may also prevent the underlying layer from a plasma discharge (e.g., which the buried layers may be exposed to in subsequent fabrication operations). In particular embodiments, the top passivation layer 424 may include a metallic layer, for example, a tantalum or palladium layer. In some embodiments, an additional metal layer is disposed on barrier layer 420. For example, the metal layer may be constructed of Talinum oxide or any other suitable, chemically-resistant metal to further enhanced the protective properties of passivation structure 406.

The jetting assemblies, micro-valves, and related components described with respect to FIGS. 8-12 may be implemented according to any of the embodiments described previously. Referring now to FIG. 8, a cross-sectional view of a sealing structure 800 of a micro-valve is shown, according to an example embodiment. For example, sealing structure 800 may be an example of the sealing structure 500 described with respect to FIG. 6. As shown, an actuating beam 802 includes a cantilevered portion 804. The cantilevered portion 804 may extend from a base portion disposed on a spacing member. The spacing member may be disposed on an orifice plate 812 that includes an orifice 814. The cantilevered portion 804 extends from the base portion towards the orifice 814 such that an overlapping portion 806 thereof overlaps the orifice 814.

Sealing structure 800 includes a sealing member 808 disposed at the overlapping portion 806 and a valve seat 810 disposed on the orifice plate 812. The sealing member 808 extends towards the orifice 814 such that an orifice-facing surface 816 contacts an upper surface 822 of the valve seat 810. The valve seat 810 surrounds the orifice 814 and defines an opening 818. In the example shown, the opening 818 is aligned with the orifice 814. In other words, the opening 818 and the orifice 814 define a fluid outlet having a substantially smooth delimiting surface. In various embodiments, the valve seat 810 is formed of a compliant material such as SU-8. In other embodiments, the valve seat 810 may be formed from silicon. As described herein, actuating beam 802 may be constructed such that it possesses a slight curvature or bias toward the orifice 814 in a default position such that the orifice-facing surface 816 presses into the valve seat 810 to form a seal that isolates the orifice 814 from a volume 820 disposed proximate the actuating beam 802.

In the example shown, the orifice 814 is cylindrical-shaped. In other embodiments, the orifice 814 may have any other suitable shape (e.g., star shape, square, rectangular, polygonal, elliptical, etc.). The valve seat 810 is substantially annular-shaped and has an inner diameter equivalent or substantially equivalent to the diameter of the orifice 814. The valve seat 810 has an outer diameter greater than the inner diameter. The sealing member 808 is formed as a substantially cylindrical-shaped pillar or post having a diameter between the inner and outer diameter of the valve seat 810. In the example shown, the diameter of the sealing member 808 is closer to the inner diameter of the valve seat 810 than the outer diameter. The size of sealing member 808 contributes to the resonance frequency of actuating beam 802 (e.g., by impacting its overall weight and therefore the overall piezoelectric response of the actuating beam 802). Thus, in some implementations, the diameter of the sealing member 808 is closer to the inner diameter to produce a desired resonance frequency when holding the size of the valve seat 810 fixed. However, it should be appreciated that the thickness (i.e., a difference between the inner and outer diameters of the valve seat 810) of the valve seat 810 may change in a radial direction in various alternative embodiments such that the overall positioning of an outer edge of the sealing member 808 with respect to the valve seat 810 may change.

Referring now to FIG. 9, a cross-sectional view of a sealing structure 900 is shown, according to an exemplary embodiment. The sealing structure 900 shares features with the sealing structure 800 described with respect to FIG. 8. As such, FIG. 9 incorporates common reference numerals to indicate the inclusion of such like components.

As shown, in the sealing structure 900, a coating 902 is disposed on the upper surface 822 of the valve seat 810. In various embodiments, the coating 902 is a hydrophobic elastic material such as CYTOP®, Teflon, polydimethylsiloxane (PDMS) or any other suitable hydrophobic or oleophilic material. The hydrophobicity of the coating 902 facilitates the dispersion of water droplets on the valve seat 810 to prevent the amalgamation of particulate matter on the upper surface 822. As such, the coating 902 promotes the long term durability of the sealing structure 900. Additionally, the coating 902 may add to the valve seat 810's elasticity or complicity to facilitate the formation of the seal at the interface between the orifice-facing surface 816 and the upper surface 822. In some embodiments, the coating 902 may be formed from a compliant material, for example, gold.

Referring now to FIG. 10, a cross-sectional view of a sealing structure 1000 is shown, according to an example embodiment. The sealing structure 1000 shares features with the sealing structure 800 described with respect to FIG. 8. As such, FIG. 10 incorporates common reference numerals to indicate the inclusion of such like components. As shown in FIG. 10, in the sealing structure 1000, a coating 1002 is disposed around the internal surface of the fluid outlet defined by the orifice 814 and the opening 818. In some embodiments, the coating 1002 may be constructed from a hydrophobic material such as CYTOP®, Teflon, PDMS or any other suitable hydrophobic or oleophilic material. The hydrophobicity of the coating 1002 facilitates the formation and travel of droplets within the orifice 814 upon actuation of the actuating beam 802 (e.g., as a result of an electrical signal being applied thereto).

In some embodiments, a sealing structure may include a combination of the coatings 902 and 1002 described with respect to FIGS. 9 and 10. In other words, a sealing structure may include both a coating lining the inner surface of the fluid outlet as well as a coating on the upper surface 822. Beneficially, such an implementation provides hydrophobicity both within the fluid outlet and the upper surface 822.

Referring now to FIGS. 11 and 12, cross-sectional views of sealing structures 1100 and 1200 are shown, according to example embodiments. Sealing structures 1100 and 1200 share components with the sealing structure 800 described with respect to FIG. 8, and include like reference numerals to indicate the incorporation of such like components.

As shown in FIG. 11, the sealing structure 1100 differs from the sealing structure 800 in that it includes a sealing member 1102 having a larger diameter than the sealing member 808 described with respect to FIG. 8. As such, a side surface 1104 of the sealing member 1102 lies closer to the outer diameter of the valve seat 810 than the inner diameter. Such an arrangement provides greater surface area for contacting the upper surface 822 of the valve seat 810 to form the isolating seal described herein. However, as will be appreciated, the larger-sized sealing member 1102 may contribute to the resonance frequency of the actuating beam 802 and other operational aspects (e.g., drop size, operating frequency, etc.) of any incorporating jetting assembly.

As shown in FIG. 12, the sealing structure 1200 differs from the sealing structure 1100 in that it includes a sealing member 1202 having a yet still larger diameter than the sealing member 1102. An outer surface 1204 of the sealing structure 1200 is substantially aligned with the outer diameter of the valve seat 810. In other words, the diameter of the sealing member 1202 is substantially equivalent to the outer diameter of the valve seat 810 (e.g., within ±10% of the outer diameter). Such an arrangement provides even more surface area for formation of the isolating seal, with the understanding that such a modification may impact aspects of any incorporating jetting assembly's performance in other ways (e.g., operating frequency). In still other embodiments, the diameter of the sealing member 1202 may be larger than the outer diameter of the valve seat 810. In some embodiments, silicon black may be formed on an orifice-facing surface of the sealing member 1102 or 1202, which may enhance fluidic sealing of the sealing member to the valve seat 810.

Referring now to FIG. 13, a cross-sectional view of a sealing structure 1300 for a micro-valve is shown, according to an example embodiment. As shown, a cantilevered portion 1304 of an actuating beam 1302 extends towards an orifice 1318 in an orifice plate 1316. An overlapping portion 1306 of the cantilevered portion 1304 overlaps the orifice 1318. Sealing structure 1300 includes a sealing member 1308 disposed at the overlapping portion 1306 and extending towards the orifice 1318. In various embodiments, sealing member 1308 is shaped in a manner that corresponds to the orifice 1318. For example, in various embodiments, both the sealing member 1308 and the orifice 1318 are substantially cylindrical, and the orifice 1318 has a smaller diameter than that of the sealing member 1308.

The sealing structure 1300 further includes a stopper 1310 disposed on an orifice-facing surface 1322 of the sealing member 1308. The stopper 1310 may be constructed of a compliant material such as SU-8, PDMS or any other suitable material. As shown, the stopper 1310 includes a narrow portion 1312 attached to the orifice-facing surface 1322 and a wide portion 1314 extending from the narrow portion 1312. The narrow portion 1312 and the wide portion 1314 may be substantially cylindrical-shaped such that the stopper 1310 forms a substantially top hat-shaped structure. In various embodiments, the wide portion 1314 has a cross-sectional area that is greater than that of the narrow portion 1312.

An orifice-facing surface 1324 of the stopper 1310 includes a protrusion 1326 shaped in a manner that corresponds to the orifice 1318. The protrusion 1326 is aligned with the orifice 1318 such that it fits into the orifice 1318 to ensure that a seal is formed when the orifice facing surface 1324 contacts the orifice plate 1316. In FIG. 13, the stopper 1310 is shown to include a portion 1320 disposed on the orifice-facing surface 1322 and a remaining portion 1328 disposed on the orifice plate 1316. The stopper 1310 includes the portion 1320 and the remaining portion 1328 at an intermediate stage of its construction. In various embodiments, after completion of the stopper 1310's construction, the stopper 1310 is a unitary body extending continuously between orifice-facing surfaces 1322 and 1324.

Similar to the actuating beam 240 described with respect to FIG. 5A-B, the actuating beam 1302 may be constructed to have a default curvature or bias such that the orifice-facing surface 1324 contacts the orifice plate 1316 and the protrusion 1326 fits into the orifice 1318 to form a seal at the interface between the stopper 1310 and the orifice plate 1316. In other words, the actuating beam 1302 may apply a downward force to create a tight seal as a result of direct contact between the stopper 1310 and the orifice plate 1316. The protrusion 1326 ensures minimal gaps at the interface to form a tight seal.

Referring now to FIG. 14, a cross-sectional view of a sealing structure 1500 for a micro-valve is shown, according to an example embodiment. As shown, a cantilevered portion 1504 of an actuating beam 1502 extends towards an orifice 1516 of an orifice plate 1514. An overlapping portion 1506 of the cantilevered portion 1504 overlaps the orifice 1516. Sealing structure 1500 includes a sealing member 1508 disposed at the overlapping portion 1506 and extending toward the orifice 1516. In various embodiments, sealing member 1508 is shaped in a manner that corresponds to the orifice 1516. For example, in various embodiments, both the sealing member 1508 and the orifice 1516 are substantially cylindrical, and the orifice 1516 has a smaller diameter than that of the sealing member 1508.

Sealing structure 1500 also includes a valve seat 1512. The valve seat 1512 surrounds the orifice 1516 and defines an opening that is aligned with the orifice 1516 to define a fluid outlet. In various embodiments, the valve seat 810 is formed of a compliant material such as SU-8. In other embodiments, the valve seat 810 is formed from a non-compliant material, for example, glass or silicon. As shown, a sealing blade or protrusion 1510 extends from an orifice-facing surface 1518 of the sealing member 1508. The sealing blade 1510 may be shaped in a manner that corresponds to a perimeter of the sealing member 1508. In some embodiments, the sealing blade 1510 is substantially annular and has inner and outer diameters that fall between the inner diameter and the outer diameter of the valve seat 1512. The sealing blade 1510 extends towards an upper surface 1520 of the valve seat 1512 and contacts the valve seat 1512 when the actuating beam 1502 is placed in a default position. The sealing blade 1510 provides a focal point for the downward force supplied by the actuating beam 1502 such that a tight seal is formed at the interface between a tip of the sealing blade 1510 and the valve seat 1512. As shown in FIG. 14, the sealing blade 1510 may have a knife edge tip having a suitable tip radius (e.g., in a range of 0.1-1.0 microns). In other embodiments, the sealing blade 1510 or any other sealing blade defined herein, may have a flat or rounded tip.

Referring now to FIG. 15, a cross sectional view of a sealing structure 1600 is shown, according to an example embodiment. The sealing structure 1600 includes similar components to the sealing structure 1500 described with respect to FIG. 14 and includes like reference numerals to indicate the incorporation of such like components. Sealing structure 1600 differs from the sealing structure 1500 described with respect to FIG. 14 in that the sealing structure 1600 includes an additional sealing blade 1602. The additional sealing blade 1602 may be concentric with and surround the sealing blade 1510 such that the sealing blades 1510 and 1602 form concentric rings that contact the upper surface 1520. In other embodiments, the sealing blades 1510 and 1602 may be non-concentric with the orifice or have non-circular cross-sections (e.g., oval, elliptical, polygonal, asymmetric, etc.)

The additional sealing blade 1602 increases the contact area between the sealing member 1508 and the valve seat 1512. Not only does the increased contact area improve the quality of the seal formed at the interface between the valve seat 1512 and the sealing blades 1510 and 1602, but it also renders the sealing structure 1600 more effective at dealing with particulate matter that may become lodged between the sealing member 1508 and the valve seat 1512. Additionally, the additional sealing blade 1602 improves the ruggedness of the sealing structure 1600, as the additional sealing blade 1602 serves as a backup point of contact with the valve seat 1512. In other words, if the sealing blade 1510 is destroyed at a particular circumferential point, the additional sealing blade 1602 still forms a seal at that point to render the sealing structure 1600 operable.

FIG. 16 is a bottom view of a sealing member 1614 of an actuating beam (e.g., any of the actuating beams defined herein) that includes a sealing structure 1650, according to an example embodiment. The sealing member 1614 has a substantially cylindrical cross-section as shown in FIG. 16. In other embodiments, the sealing member 1614 may have any other suitable cross-section, for example, square, rectangular, star shaped elliptical, etc. The sealing structure 1650 includes a first set of sealing blades 1610a extending axially from an orifice-facing surface 1618 of the sealing member 1614 and positioned concentrically on the orifice-facing surface. A first gap 1612a may be provided between each adjacent first sealing blade 1611a of the first set of sealing blades 1610a such that each of the first set of sealing blades 1610a resembles a segment (e.g., an arc segment) of a first circle. A second set of sealing blades 1610b may be positioned concentrically inwards of the first set of sealing blades 1610a, with a second gap 1612b provided between each adjacent second sealing blade 1611b of the second set of sealing blades 1610b, as described with respect to the first set of sealing blades 1610a. Similarly, a third set of sealing blades 1610c may be positioned concentrically inwards of the second set of sealing blades 1610b, with a third gap 1612c provided between each adjacent third sealing blade 1611c of the third set of sealing blades 1610b, as described with respect to the first and second set of sealing blades 1610a/b. In other embodiments, even more sets of sealing blades may be positioned concentrically on the orifice-sealing member surface 1618. The gaps 1612a/b/c of the set of sealing blades 1610a/b/c may be staggered relative to each other, i.e., do not concentrically overlap. Such an arrangement may provide better sealing as well as trap any particles (e.g., contaminants, photoresist particles) etc. between the set of sealing blades 1610a/b/c.

Referring now to FIG. 17, a flow diagram of a method 1700 of constructing a sealing structure for a micro-valve is shown, according to an example embodiment. Method 1700 may be performed to construct the sealing structures 1500 and 1600 described with respect to FIGS. 14, 15 and 16. Method 1700 may include fewer or additional operations depending on the implementation.

In an operation 1702, an orifice plate including an orifice is provided. For example, in some embodiments, an orifice plate is formed out of an SOI wafer (e.g., a portion of the wafer may be removed to form the orifice). In some embodiments, after the formation of the orifice, a valve seat is disposed at the orifice. The valve seat may surround the orifice and define an opening that is aligned with the orifice to form a fluid outlet. In an operation 1704, an actuating beam including a sealing member having an orifice-facing surface is provided. For example, as described herein, an actuating beam may be formed by etching a portion of a double SOI wafer such that a spacing member and a sealing member are formed in a single manufacturing step. A surface of the sealing member may form the orifice-facing surface.

In an operation 1706, an etch-resistant material is deposited on the orifice-facing surface. The etch-resistant material (e.g., silicon dioxide or silicon nitride) differs from the sealing member of the actuating beam in chemical composition such that the etch-resistant material slows a chemical process (e.g., etching) that removes portions of the sealing member. In an operation 1708, portions of the etch-resistant material are etched such that a remaining portion of the etch-resistant material on the orifice-facing surface corresponds to a location and shape of a sealing blade (e.g., one or more sealing blades). For example, the remaining portion of the etch-resistant material only covers a portion of the sealing member surface. In some embodiments, the etch-resistant material may be substantially ring-shaped to produce an annular sealing blade. In various embodiments, the etch-resistant material comprises silicon dioxide. As such, the layer of etch-resistant material may be deposited via chemical vapor deposition or any other suitable method. The layer of etch-resistant material may then be patterned using any suitable method (e.g., using an etching mask, photolithographic methods, etc.). In some embodiments, multiple sections of etch-resistant material are formed to facilitate the formation of multiple sealing blades. In other embodiments, a release layer (e.g., a photoresist) may be deposited on the orifice-facing surface and photolithographically patterned to generate shape or shapes therein corresponding to the size and location of the sealing blade. The etch-resistant material may be deposited on the release layer such that the etch-resistant material contacts the orifice-sealing member surface at the patterned portions but is disposed on the release layer in all other locations. The release layer may then be removed such that any portion of the etch-resistant material disposed on the release layer is removed therewith, leaving patterned etch-resistant material corresponding to the location and shape of the sealing blade disposed on the orifice facing surface.

In an operation 1710, the sealing member is isotropically etched for a first predetermined time. The isotropic etch (e.g., a wet etch) may be configured to etch a portion of the sealing member underneath the etch-resistant material, for example, to define a tip of the sealing blade. In an operation 1712, the sealing member is anisotropically etched (e.g., a deep-reaction ion etching process such as the Bosch process) for a second predetermined time to remove portions of the sealing member such that a remaining unetched portion forms the sealing blade prior to attaching the actuating beam to the orifice plate. The second predetermined time may be varied to define a height of the sealing blade. For example, the etch-resistant material may retard or completely prevent the etching of the portion of the sealing member covered by the section of etch-resistant material. As such, uncovered portions of the sealing member will be removed at a faster rate than those covered by the section of etch-resistant material. Thus, protrusions are formed beneath the etch-resistant material to construct the sealing blade(s). The etching may occur for a length of time selected based on a desired length of the sealing blades. For example, the desired length may be selected based on an estimated durability of the resulting sealing blade. The estimated durability may depend at least in part in other dimensions (e.g., radial thickness) of the sealing blade. In alternative embodiments, rather than providing the etch-resistant material and applying the etchant to the sealing member surface, the sealing blade(s) may be formed using alternative means. For example, the sealing blade(s) may be formed using any suitable shaping method.

In an operation 1714, the etch-resistant material may be removed, in some implementations. For example, the etch-resistant material (e.g., silicon dioxide) may be removed via a wet etch (e.g., a buffered hydrofluoric acid etch) or dry etching process. In some embodiments, the method 1700 may also include anisotropically etching a portion of the actuating beam to form the sealing member, releasing the actuating beam from a substrate so as to form a cantilevered portion of the actuating beam. In an operation 1716, after the sealing blades are formed at the sealing member surface, the actuating beam is attached to the orifice plate such that the sealing member surface is aligned with a valve seat disposed on the orifice plate. For example, the spacing member attached to the actuating beam may be positioned and attached to the orifice plate in a manner such that the sealing member surface aligns with the orifice. The sealing member surface is aligned with the orifice such that the sealing blade is positioned to contact an upper surface of the valve seat when the actuating beam is placed in a default position.

Referring now to FIG. 18, a cross-sectional view of a sealing structure 1800 for a micro-valve is shown, according to an example embodiment. As shown, a cantilevered portion 1804 of an actuating beam 1802 extends towards an orifice 1816 of an orifice plate 1814. An overlapping portion 1806 of the cantilevered portion 1804 overlaps the orifice 1816. Sealing structure 1800 includes a sealing member 1808 disposed at the overlapping portion 1806 and extending toward the orifice 1816. In various embodiments, sealing member 1808 is shaped in a manner that corresponds to the orifice 1816. For example, in various embodiments, both the sealing member 1808 and the orifice 1816 are substantially cylindrical, and the orifice 1816 has a smaller diameter than that of the sealing member 1808.

As shown, the sealing member 1808 includes an orifice-facing surface 1818 and a side surface 1822. Portions of the sealing member 1808 are removed at the corner between the orifice-facing surface 1818 and the side surface 1822. In various embodiments, the removed portions of the sealing member 1808 extend circumferentially around the entirety of the sealing member 1808. As such, the sealing member includes a narrow portion 1824 at an end thereof. The narrow portion may have a diameter approximately equal to that of the orifice 1816. A sealing flap 1810 extends radially outward from the narrow portion 1824 at the orifice-facing surface 1818. As shown, the sealing flap 1810 contacts an upper surface 1820 of the valve seat 1812 when the actuating beam 1802 is in a default position to form a seal at the interface between the sealing member 1808 and the valve seat 1812. The sealing flap 1810 provides a compressible medium through which a tight seal may be formed. In other embodiments, a sealing flap may be provided on an inner rim of the valve seat 1812. In such embodiments, the narrow portion 1824 of the sealing member 1808 may be configured to at least partially enter an opening defined in the valve seat 1812 and engage the sealing flap positioned on the inner rim of the valve seat 1812 so as to form the fluid tight seal.

Referring now to FIG. 19, a flow diagram of a method 1900 of constructing a sealing structure for a micro-valve is shown, according to an example embodiment. Method 1900 may be performed to construct the sealing structure 1800 described with respect to FIG. 18. Method 1900 may include fewer or additional operations depending on the implementation.

In an operation 1902, an orifice plate including an orifice is provided. For example, in some embodiments, an orifice plate is formed out of a SOI wafer (e.g., a portion of the wafer may be removed to form the orifice). In some embodiments, after the formation of the orifice, a valve seat is disposed at the orifice. The valve seat may surround the orifice and define an opening that is aligned with the orifice to form a fluid outlet. In an operation 1904, an actuating beam including a sealing member having an orifice-facing surface and side surfaces is provided. For example, as described herein, an actuating beam may be formed by etching a portion of a double SOI wafer such that a spacing member and a sealing member are formed in a single manufacturing step. The sealing member may be substantially cylindrical. The orifice-facing surface may include an end surface of the sealing member and the side surfaces may include a round surface of the sealing member.

In an operation 1906, an etch-resistant material is deposited to the entirety of the orifice-facing surface. The etch-resistant material (e.g., silicon dioxide or silicon nitride) differs from the sealing member of the actuating beam in chemical composition such that the etch-resistant material slows a chemical process (e.g., etching) that removes the sealing member. In various embodiments, the etch-resistant material comprises silicon dioxide. As such, the layer of etch-resistant material may be deposited via chemical vapor deposition or any other suitable method.

In an operation 1908, the sealing member is selectively etched (e.g., an etchant such as TMAH or KOH) so as to remove portions of the sealing member at the side surfaces of the sealing member beneath the etch-resistant material such that the etch-resistant material extends over the removed portions of the sealing member to form a sealing flap. For example, an etchant may be applied to an end of the sealing member proximate the sealing member surface such that portions of the sealing member that are uncovered by the etch-resistant material (e.g., at corners separating the sealing member surface from the side surface) are selectively etched and removed. Remaining sections of the etch-resistant material may then form the sealing flap. As such, the sealing flap may have little-to-no material disposed on either side thereof and form a compliant layer that can be forced against various surfaces to form a seal. In other embodiments, the etch-resistant material may be removed after operation 1908 and a separately manufactured sealing flap formed from a compliant material (e.g., PDMS) may be positioned on the orifice-facing surface.

In an operation 1910, the actuating beam is attached to the orifice plate such that a portion of the sealing flap extends over the orifice. For example, the spacing member attached to the actuating beam may be positioned and attached to the orifice plate in a manner such that the sealing member surface aligns with the orifice. In some embodiments, the sealing member is substantially centered with respect to the orifice. As a result, the sealing flap may radially extend over an inner diameter of the valve seat such that a seal may be formed between the valve seat and the sealing flap when the actuating beam is placed in a default position.

Figure 20:
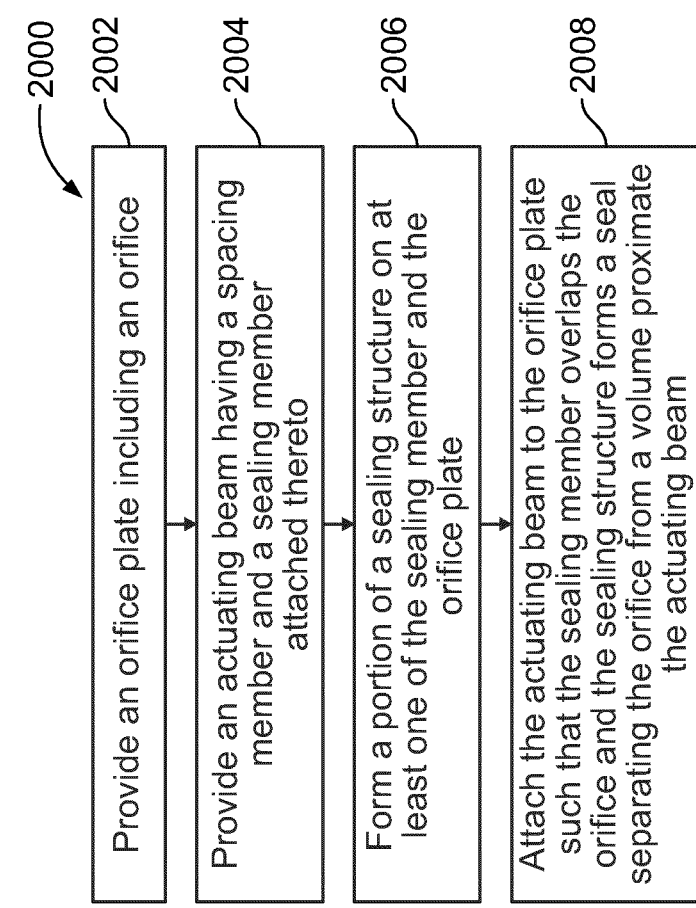
FIG. 20 is a flow diagram of a method of constructing a micro-valve, according to an example embodiment.

Referring now to FIG. 20, a flow diagram of a method 2000 of constructing a micro-valve is shown, according to an example embodiment. Method 2000 may be performed to construct any of the micro-valves described herein. The method 2000 may include fewer or additional operations depending on the implementation.

In an operation 2002, an orifice plate including an orifice is provided. For example, in some embodiments, an orifice plate is formed out of a SOI wafer (e.g., a portion of the wafer may be removed to form the orifice). In some embodiments, after the formation of the orifice, a valve seat is disposed at the orifice. The valve seat may surround the orifice and define an opening that is aligned with the orifice to form a fluid outlet. In an operation 2004, an actuating beam including a sealing member having an orifice-facing surface and a side surface is provided. For example, as described herein, an actuating beam may be formed by etching a portion of a double SOI wafer such that a spacing member and a sealing member are formed in a single manufacturing step. The sealing member may be substantially cylindrical. The orifice-facing surface may include an end surface of the sealing member.

In an operation 2006, a portion of a sealing structure is formed on at least one of the sealing member and the orifice plate. For example, in some embodiments, the portion of the sealing structure member includes formation of a valve seat on a surface of the orifice plate. The valve seat may surround the orifice plate and define an opening that is aligned with the orifice to form a fluid outlet. The valve seat may be constructed of a compliant material such as SU-8 and be deposited using any suitable method (e.g., spin or spray coating).

In some embodiments, the portion of the sealing structure is formed at the orifice-facing surface of the sealing member. This may involve the operations described with respect to FIGS. 14, 17, and 18 to construct a stopper, at least one sealing blade, or a sealing flap. As will be appreciated, any combination of these structures may be used in construction of the portion of the sealing member. In certain implementations, multiple portions of a sealing structure may be formed. For example, a valve seat may be formed on the orifice plate, in addition to the formation of a component (e.g., a compliant structure, a sealing blade, and/or a sealing flap) at a sealing member surface of the sealing member or the valve seat. In certain embodiments, portions of the sealing structure may be formed on a side surface (e.g., such as the side surface 1822 described with respect to FIG. 18) of the sealing structure. For example, in one embodiment, the sealing member is adapted to fit within the fluid outlet constructed from the valve seat and the orifice plate, and a component of the sealing structure extends radially outward from the side surface. The component may contact an upper surface of the valve seat to form a seal that isolates the orifice from the volume proximate the actuating beam.

In an operation 2008, the actuating beam is attached to the orifice plate such that the sealing member overlaps the orifice and the sealing structure forms a seal separating the orifice from a volume proximate to the actuating beam. For example, the spacing member attached to the actuating beam may be positioned and attached to the orifice plate in a manner such that the orifice-facing surface aligns with the orifice. In some embodiments, the sealing member is substantially centered with respect to the orifice. As a result, the portion of the sealing member formed at operation 2006 may contact either the orifice plate or a valve seat thereon when the actuating beam is placed in a default position.

Figure 21:
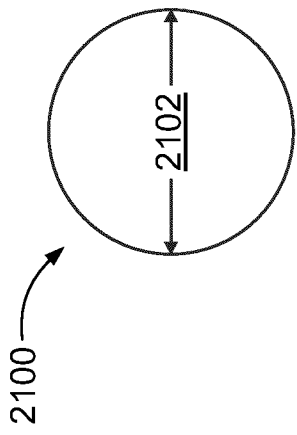
FIG. 21 shows a cross-sectional view of a sealing member of a micro-valve, according to an example embodiment.

Referring now to FIG. 21, a cross-sectional view of a sealing member 2100 of a micro-valve is shown, according to an exemplary embodiment. Sealing member 2100 may be an example embodiment of the sealing member 808 contained in the sealing structure 800 described with respect to FIG. 8 or any of the sealing structures described herein. As shown, sealing member 2100 is substantially cylindrical-shaped and has a diameter 2102. The diameter 2102 may be selected based on a size of an orifice in an orifice plate. For example, in some embodiments, the diameter 2102 is approximately 150% of a diameter of the orifice (e.g., the orifice may have a 60 micron diameter and the diameter 2102 may be 90 microns).

Figure 22:
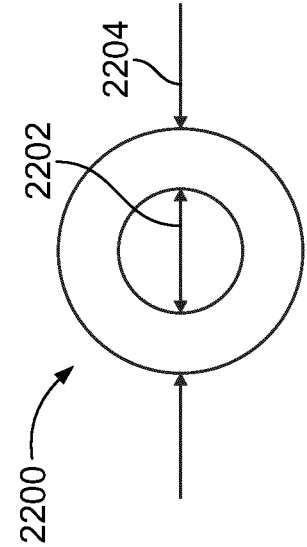
FIG. 22 shows a cross-sectional view of a valve seat of a micro-valve, according to an example embodiment.

Referring now to FIG. 22, a cross-sectional view of a valve seat 2200 of a micro-valve is shown, according to an exemplary embodiment. Valve seat 2200 may be an example embodiment of the valve seat 810 contained in the sealing structure 800 described with respect to FIG. 8 or any of the sealing structures described herein. As shown, the valve seat 2200 is annular-shaped and includes an inner diameter 2202 and an outer diameter 2204. The inner and outer diameters 2202 and 2204 may define a range within which a diameter of a sealing member is contained. For example, in an embodiment where the sealing member 2100 described with respect to FIG. 21 is used in conjunction with the valve seat 2200, the diameter 2102 may be selected such that is greater than the inner diameter 2202. In some embodiments, the diameter 2102 is between the inner and outer diameters 2202 and 2204. In some embodiments, the diameter 2102 is equal to the outer diameter 2204, and the micro-valve is constructed such that the sealing member 2100 is substantially aligned with the valve seat 2200 such that an outer surface of the sealing member is substantially flush with the valve seat 2200. In some embodiments, the diameter 2102 is greater than the outer diameter 2204 such that an outer edge of the sealing member 2100 overhangs the valve seat in the assembled micro-valve.

Figure 23:
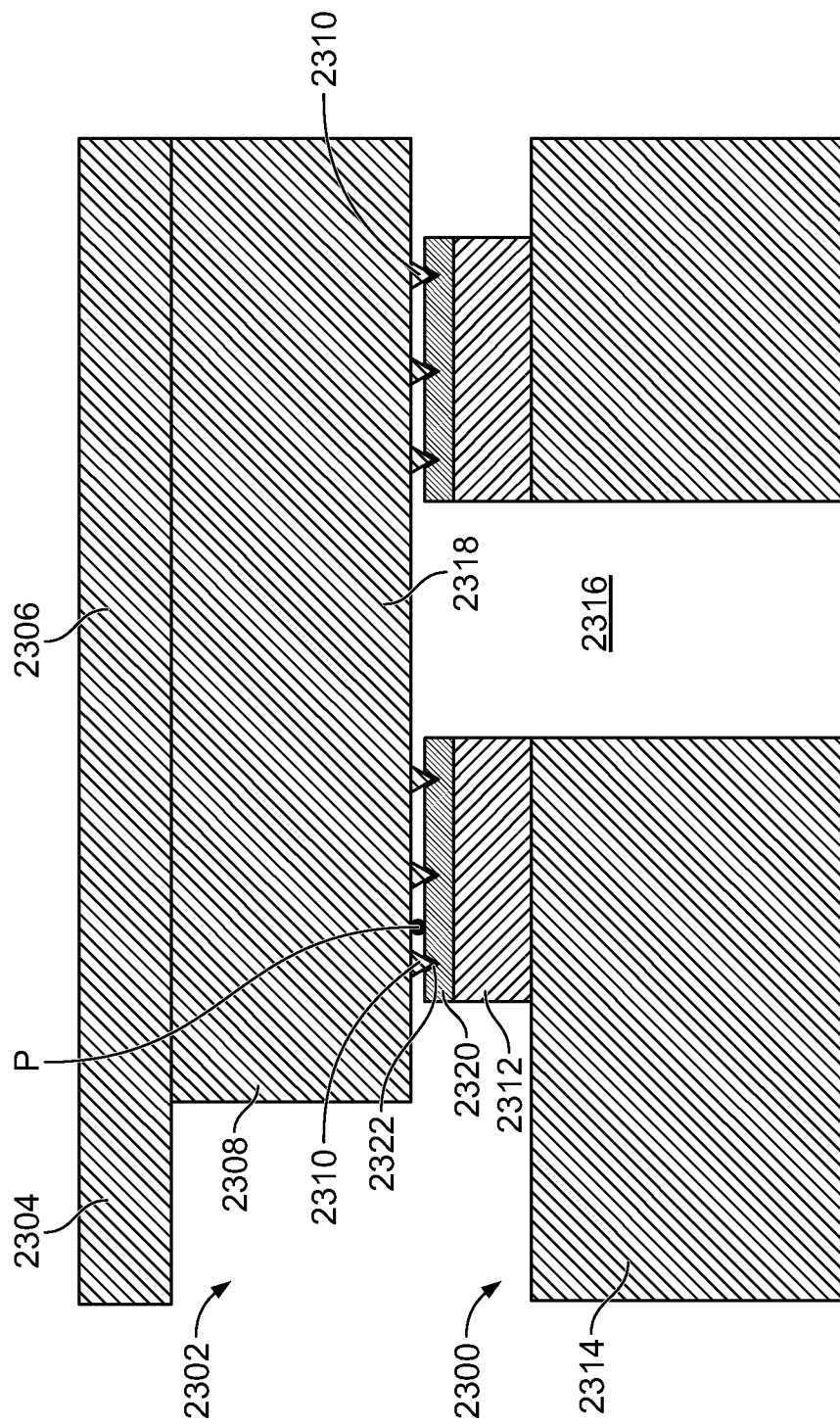
FIG. 23 is a cross-sectional view of a sealing structure of a micro-valve, according to another example embodiment.

Referring now to FIG. 23, a cross-sectional view of a sealing structure 2300 for a micro-valve is shown, according to an example embodiment. As shown, a cantilevered portion 2304 of an actuating beam 2302 extends towards an orifice 2316 of an orifice plate 2314. An overlapping portion 2306 of the cantilevered portion 2304 overlaps the orifice 2316. Sealing structure 2300 includes a sealing member 2308 disposed at the overlapping portion 2306 and extending toward the orifice 2316. In various embodiments, sealing member 2308 is shaped in a manner that corresponds to the orifice 2316. For example, in various embodiments, both the sealing member 2308 and the orifice 2316 are substantially cylindrical, and the orifice 2316 has a smaller diameter than that of the sealing member 2308.

Sealing structure 2300 also includes a valve seat 2312. The valve seat 2312 surrounds the orifice 2316 and defines an opening that is aligned with the orifice 2316 to define a fluid outlet. In various embodiments, the valve seat 2312 is formed of a compliant material such as a negative photoresist (e.g., SU-8). As shown, a plurality of sealing blades or protrusions 2310 extends from an orifice-facing surface 2318 of the sealing member 2308. The sealing blades 2310 may be shaped in a manner that corresponds to a perimeter of the sealing member 2308 (e.g., concentrically disposed on the orifice-facing surface 2318). In some embodiments, the sealing blades 2310 are substantially annular and have inner and outer diameters that fall between the inner diameter and the outer diameter of the valve seat 2312.

As shown in FIG. 23, a sealing layer 2320 may be disposed on valve seat 2312. The sealing layer 2320 may include, for example, a metal (e.g., gold or platinum) layer or any other suitable layer. In various embodiments, a plurality of indents 2322 may be formed on the sealing layer 2320. The plurality of indents 2322 may be formed, for example, via an etching process and are located corresponding to a location of the plurality of sealing blades 2310. In particular embodiments, the plurality of indents 2322 are formed by cold forging by repeatedly striking the plurality of sealing blades 2310 on the sealing layer 2320 (e.g., periodic application of electric signal to the actuating beam 2302). The sealing blades 2310 extend towards the sealing layer 2320 and contact a base of the corresponding indent 2322 when the actuating beam 2302 is placed in a default position. A spacing between adjacent sealing blades 2310 and a distance between the orifice-facing surface 2318 and the orifice plate 2314 may be configured to push small particles P (e.g., dust, photoresist debris, etc.) away from the seal formed between the sealing blades 2310 and the valve seat 2312, for example, towards and outside the orifice 2316. Furthermore, mating of the plurality of sealing blades 2310 with the corresponding indents 2322 may facilitate formation of a better fluid tight seal between the sealing member 2308 and the valve seat 2312. In particular embodiments, a filter (e.g., a 5, 10, 15 or 20 micron) filter may be positioned in a fluid manifold upstream of a septum provide in a jetting assembly which includes micro-valve including the sealing structure 2300, so as to filter dust or other particulate matter from the fluid.

Figure 24:
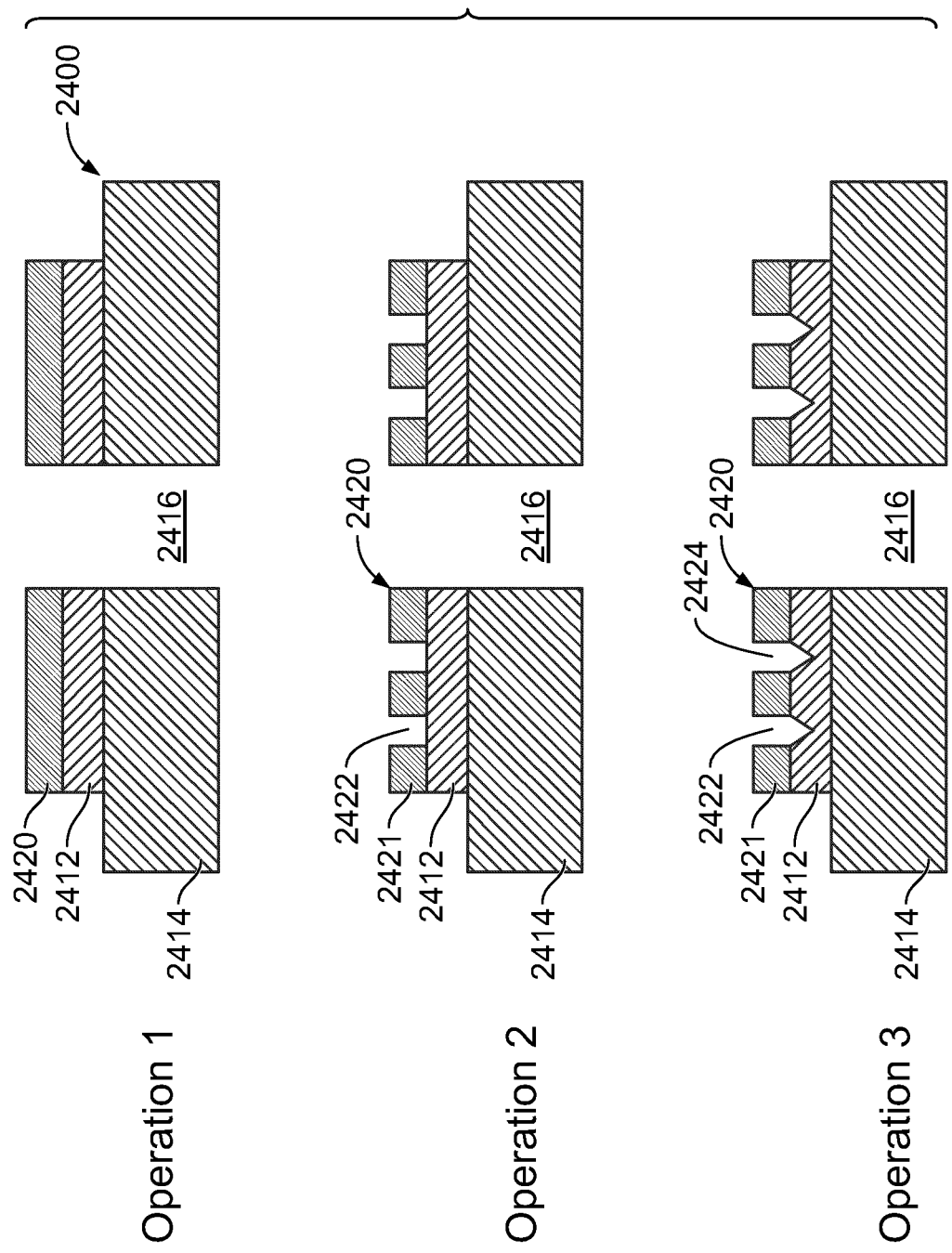
FIG. 24 is schematic process flow for forming a sealing structure on a valve seat, according to another example embodiment.

In particular embodiments, a valve seat disposed on an orifice plate may be formed from silicon and the sealing layer may be formed from silicon oxide or silicon nitride. For example, FIG. 24 illustrates a process 2400 which may be used to provide a sealing layer 2420 on a valve seat 2412. At operation 1, a silicon valve seat 2412 is provided on an orifice plate 2414 having an orifice 2416 defined therein. The orifice plate 2414 may include any of the orifice plates defined herein. The valve seat 2412 is formed from silicon and may be deposited thereon via, for example, a silicon epitaxial growth process followed by photolithographic pattern and etching, or comprise a piece of silicon (e.g., a silicon ring) positioned around the orifice 2416. A sealing layer 2420 (e.g., a silicon oxide or silicon nitride sealing layer) is disposed on the valve seat 2412. The sealing layer 2420 may be deposited using a physical deposition process (e.g., a chemical vapor deposition or plasma enhanced vapor deposition process).

At operation 2, a plurality of openings 2422 are defined at predetermined locations in the silicon oxide sealing layer 2420 such that the sealing layer 2420 forms a plurality of silicon oxide or silicon nitride rings 2421. The plurality of openings 2422 may be formed via a photolithography and an etching (e.g., using buffered hydrofluoric acid, or a dry plasma etching process) process so as to expose the surface of the silicon valve seat 2412 at predetermined locations. At operation 3, the silicon valve seat 2412 may be selective etched at the plurality of openings 2422 using an etchant which selectively etches silicon (e.g., using a potassium hydroxide or tetramethylammonium oxide etchant, a dry plasma etching process) so as to form a plurality of indents 2424 in the silicon valve seat 2412. In some embodiment, the plurality of indents 2424 may correspond to a plurality of sealing blades (e.g., the sealing blades 2310) positioned on an orifice-facing surface of an actuating beam (e.g., the actuating beam 2302). In other embodiments, the plurality of rings 2421 may serve as sealing blades such that the plurality of sealing blades may be excluded from the actuating beam. It should be understood that while process 2400 describes a silicon valve seat 2412 having a silicon oxide or silicon nitride sealing layer 2420 positioned thereon, in other embodiments, the valve seat 2412 and/or the sealing layer 2420 may be formed from any other suitable material such as, for example, a negative photoresist (e.g., SU-8, polymethylmethacrylate, etc.), PDMS, silicone rubber, etc. and may be formed using a photolithography and etching process (e.g., a combination of any of the processes described herein) or mechanically positioned thereon. Furthermore, in other embodiments, the operations of the process 2400 may be used to form a sealing member having a plurality of rings on a tip of an actuating beam.

Figure 25:
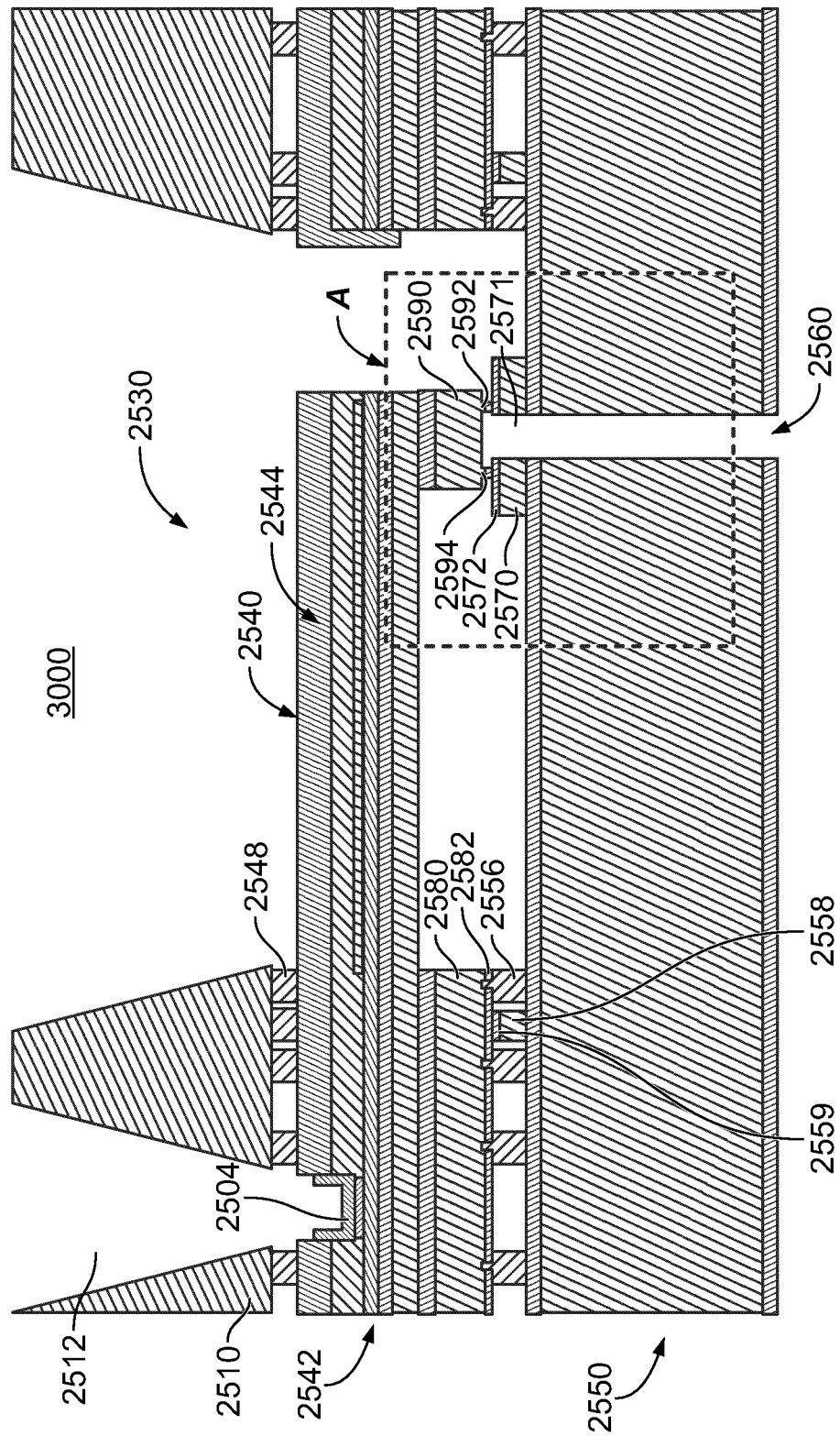
FIG. 25 is a-cross sectional view of a micro-valve that may be included in a jetting assembly, according to an example embodiment.

Referring now to FIG. 25, a cross sectional view of a micro-valve 2530 that may be included in a jetting assembly (e.g., the jetting assembly 100, 200, 200b) is shown, according to an example embodiment. An input fluid manifold 2510 is coupled to the micro-valve 2530. As shown, input fluid manifold 2510 and micro-valve 2530 may define a reservoir 3000 configured to hold a volume of pressured fluid received from an external fluid supply (e.g., via the carrier 202, 202b). In various embodiments, the pressurized fluid held within the reservoir 3000 is a combination of an ink and additional fluids in a liquid state.

In various embodiments, input fluid manifold 2510 may be pre-formed prior to its attachment to the micro-valve. In some embodiments, the input fluid manifold 2510 may be formed by a glass body having any suitable thickness (e.g., about 500 microns). In other embodiments, the input fluid manifold 2510 may be formed from silicon. In some embodiments, the input fluid manifold 2510 is coupled to top surface of an actuating beam 2540 (e.g., any of the actuating beam 240, 240b previously described herein) via a first adhesive structure 2548, at a base portion 2542 of the actuating beam 2540 that is located on a spacing member 2580 and is immobile. The first adhesive structure 2548 may include a plurality of adhesive rings similar to those described with reference to FIG. 4A or 4B. The adhesive may include SU-8 or any other suitable adhesive and may be applied to a bottom surface of the input fluid manifold 2510 and/or the top surface of the actuating beam 2540. In other embodiments, the first adhesive structure 2548 may be formed from silicon or glass and coupled to the actuating beam 2540 via glass frit, solder, adhesive, fusion bonding, eutectic bonding, or stiction. An electrode 2504 is disposed in a via defined in the base portion of the actuating beam 2540 and is electrically coupled to a piezoelectric layer defined in the actuating beam 2540. The via may correspond to a channel or opening 2512 defined in the input fluid manifold 2510, and may be filled with an encapsulant, as previously described herein.

The micro-valve 2530 also includes an orifice plate 2550 attached to actuating beam 2540 via the spacing member 2580. As shown in FIG. 25, a second adhesive structure 2556 which may be similar to first adhesive structure 2548 and include a plurality of rings or loops of an adhesive material (e.g., SU-8). In some embodiments, a plurality of slots or keys 2582 may be defined in a bottom surface of the spacing member 2580 facing the orifice plate 2550. The adhesive included in the adhesive structure 2556 may penetrate the slots 2582 so as to provide a substantially higher bond strength with the spacing member 2580 relative to embodiments in which the slots 2582 are not defined.

In some embodiments, a support beam 2558 may extend from the orifice plate 2550 towards the spacing member 2580 and is structured to define a separation distance between the orifice plate 2550 and the spacing member 2580 and thereby, the actuating beam 2540, and may also serve as a guard ring to prevent a solvent solution (e.g., included in the fluid used in the micro-valve 2530) from penetrating beneath the spacing member 2580 during the use of the micro-valve 2530. In particular embodiments, a support beam compliance layer 2559 may be disposed on a tip of the support beam 2558 proximate to the spacing member 2580. The support beam compliance layer 2559 may include a gold layer or any other suitable compliance layer. In some embodiments, the second adhesive structure 2556 may also be formed from silicon or glass and coupled to the actuating beam spacing member via glass frit, solder, adhesive, fusion bonding, eutectic bonding, or stiction.

The orifice plate 2550 is substantially planar and includes an orifice 2560 extending between surfaces thereof. A valve seat 2570 may be disposed on a surface of the orifice plate 2550 facing the actuating beam 2540 around a rim of the orifice 2560. Valve seat 2570 defines an interior opening 2571 substantially aligned with orifice 2560 to create an outlet for pressurized fluid provided to the micro-valve 2530. In some embodiments, valve seat compliance layer 2572 (e.g., a gold layer) may be disposed on a surface of the valve seat 2570 facing the actuating beam 2540.

In some embodiments, the orifice plate 2550 may be substantially flat, for example, have a flatness with a coefficient of variance of less than 3 microns over a length and width of the orifice plate 2550 of at least 15 mm, such that the orifice plate 2550 is substantially free of bow or twist. Furthermore, the orifice plate 2550 may have any suitable thickness. In some embodiments, the orifice plate 2550 may have a thickness in a range of 30 microns to 90 microns (30, 40, 50, 60, 70, 80, 90, or 100 microns). In other embodiments, the orifice plate 2550 may have a thickness in a range of 100 microns to 900 microns (e.g., 100, 150, 200, 250, 300, 350, 400, 500, 600, 700, 800, or 900 microns). Thicker orifice plates 2550 may facilitate realization of a flatter orifice plate.

The actuating beam 2540 includes the base portion 2542 disposed on the spacing member 2580, and a cantilevered portion 2544 extending from the base portion towards the orifice 2560. The actuating beam 2540 is substantially similar to the actuating beam 240, 240b except for differences described below herein. A sealing member 2590 extends from a portion of the actuating beam 2540 overlapping the orifice 2560. In some embodiments, sealing member 2590 is constructed to have a shape that substantially corresponds to a shape of the orifice 2560 (e.g., a cylindrical shape).

A sealing blade 2592 extends from an orifice-facing surface of the sealing member 2590 towards the valve seat 2570. The sealing blade 2592 may be shaped in a manner that corresponds to a perimeter of the sealing member 2590. In some embodiments, the sealing blade 2592 is substantially annular and has inner and outer diameters that fall between the inner diameter and the outer diameter of the valve seat 2570. The sealing blade 2592 extends towards an upper surface of the valve seat 2570 and contacts the valve seat 2570 when the actuating beam 2540 is placed in a closed position. The sealing blade 2592 provides a focal point for the downward force supplied by the actuating beam 2540 such that a tight seal is formed at the interface between a tip of the sealing blade 2592 and the valve seat 2570.

Figure 26:
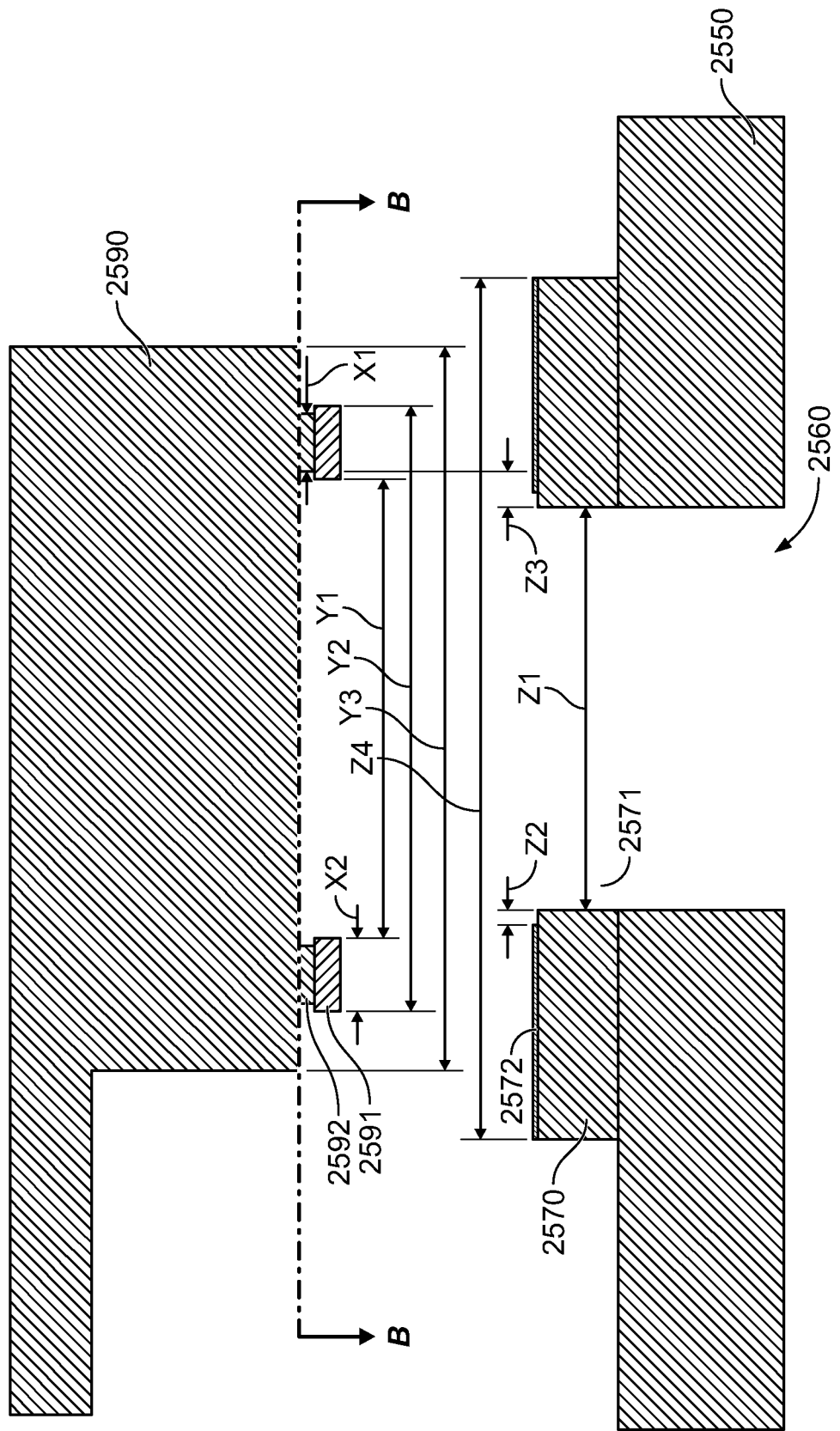
FIG. 26 is an enlarged view of a portion of the jetting assembly of FIG. 25 indicated by the arrow A in FIG. 25.

Expanding further, FIG. 26 is an enlarged view of a portion of the micro-valve 2530 by the arrow A in FIG. 25. As shown in FIG. 25, a tip of the sealing blade 2592 is substantially flat and in some embodiments, may be coated with a sealing blade compliance layer (e.g., a gold layer). FIG. 26 shows the tip of the sealing blade coated with a resist 2591, which serves as an etch mask to allow selective etching of the sealing member 2590 to form the sealing blade 2592 and is later removed. In some embodiments, a resist width $X2$ of the resist 2591 is in a range of 1-15 microns (e.g., 1, 2, 3, 4, 5, 6, 7, 8, 9, 10, 11, 12, 13, 14, or 15 microns, inclusive) such that a sealing blade width $X1$ of the sealing blade 2592 is in a range of 8-12 microns (e.g., 8, 9, 10, 11, or 12 microns, inclusive). A resist inner cross-sectional dimension $Y1$ (e.g., inner diameter) may be in a range of 20-100 microns (e.g., 20, 30, 40, 50, 60, 70, 80, 85, 90, 95, or 100 microns, inclusive), and a resist outer cross-sectional dimension $Y2$ (e.g., outer diameter) may be in a range of 30-120 microns (e.g., 30, 40, 50, 60, 70, 80, 90, 100, 105, 110, 115, or 120 microns, inclusive). A sealing member outer cross-sectional dimension $Y3$ (e.g., outer diameter) of the sealing member 2590 may be in a range of 80-140 microns (e.g., 80, 90, 100, 110, 120, 125, 130, 135, or 140 microns, inclusive).

An inner cross-sectional dimension $Z1$ of the valve seat 2570 (e.g., a diameter of the opening 2571 defined in the valve seat 2570) may be in a range of 20-80 microns (e.g., 20, 30, 40, 50, 55, 60, 65, 70, 75, or 80 microns, inclusive), and outer cross-sectional dimension $Z4$ of the valve seat 2570 (e.g., an outer diameter) may be in a range of 100-160 microns (e.g., 100, 110, 120, 130, 140, 145, 150, 155, or 160 microns, inclusive). A first radial distance $Z2$ from a rim of the opening 2571 defined in the valve seat 2570 to an edge of the valve seat compliance layer 2572 may be in a range of 1-4 microns (e.g., 1, 2, 3, or 4 microns, inclusive), and a second radial distance $Z3$ from an inner radial edge of the sealing blade 2592 to the rim of the opening 2571 defined in the valve seat 2570 may be in a range of 7-15 microns (e.g., 7, 8, 9, 10, 11, 12, 13, 14, or 15 microns, inclusive).

Figure 27:
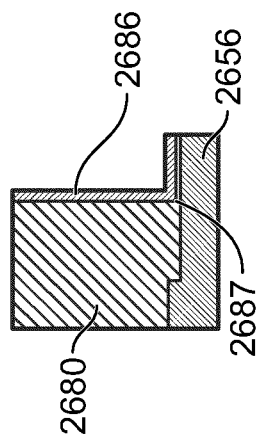
FIG. 27 is a top cross-section view of a sealing blade of the included in the micro-valve of FIGS. 25-26 taken along the line B-B in FIG. 26.

A cross-sectional of the sealing blade 2592 being larger than the inner cross-sectional dimension $Z1$ allows for axial misalignment between the opening 2571 and the inner radial edge of the sealing blade 2592 while still enabling the sealing of the opening 2571 defined in the valve seat 2570. For example, FIG. 27 shows a cross-sectional view of the sealing blade 2592 taken along the line B-B in FIG. 26. As shown in FIG. 27, the sealing blade 2592 is axially misaligned with the opening 2571 but is still able to surround and fluidly seal an area on the valve seat 2570 surrounding the opening 2571, thereby preventing leakage of the fluid through the opening 2571 when the actuating beam 2540 is in its closed position (e.g., the default position).

In some embodiments, a portion of the adhesive structure used to bond a spacing member of the actuating beam to the orifice plate may extend beyond a radially inner edge of the spacing member. For example, FIG. 28A is side cross-sectional view of a portion of a micro-valve 2630, according to an embodiment. The micro-valve 2630 includes an orifice plate 2650. An actuating beam 2640 is disposed on the orifice plate 2650. A base portion 2642 of the actuating beam 2640 is disposed on a spacing member 2680 that is coupled to the orifice plate 2650 via a support beam 2658 (e.g., the support beam 2558) and a second adhesive structure 2656 (e.g., an SU-8 structure). The second adhesive structure 2656 may have a thickness in a range of 2-20 microns (e.g., 2, 3, 4, 5, 10, 12, 14, 16, 18, or 20 microns, inclusive). A plurality of slots or keys 2682 may be defined in a surface of the spacing member 2680 that faces the orifice plate 2650. The second adhesive structure 2656 penetrates the plurality of slots 2682 to form a strong bond with the spacing member 2680, as previously described herein. In various embodiments, the plurality of slots 2682 may have a cross-sectional dimension (e.g., width) of about 5-10 microns, inclusive and be spaced apart at a pitch of 5-10 microns, inclusive. In other embodiments, the plurality of slots 2682 may be excluded.

An input fluid manifold 2610 is bonded to the actuating beam 2640 as previously described herein on the base portion 2642 of the actuating beam 2640 via a first adhesive structure 2661. The first adhesive structure 2661 may include a plurality of rings of an adhesive (e.g., SU-8) or a structural material such as glass or silicon. At least one rings of the first adhesive structure 2661 is located opposite the second adhesive structure 2656, for example, to balance a torsional stress exerted by the motion of a cantilevered portion 2644 of the actuating beam 2640 away from the orifice plate 2650. In some embodiments, the first adhesive structure 2661 and the second adhesive structure 2656 may be formed from the same material (e.g., SU-8, silicon, glass, etc.). In some embodiments, a plurality of slots may also be defined on surface of the spacing member 2680 on which the first adhesive structure 2661 to promote adhesion, or defined on any other surface on which an adhesive is disposed.

The second adhesive structure 2656 may also extend in a radial direction beyond a radially inner edge of the spacing member 2680 such that a portion of the second adhesive structure 2656 having a predetermined length X (e.g., in a range of 5-10 microns, inclusive) that is located below the cantilevered portion 2644 of the actuating beam 2640. The extending portion of the second adhesive structure 2656 may be axially separated from a bottom surface of the cantilevered portion 2644 that faces the orifice plate 2650 by an axial distance Y, which may be equal to a thickness of the spacing member 2680.

In some embodiments, the fluid being used with the micro-valve 2630 or any other micro-valve described herein may include a solvent capable of dissolving or swelling the adhesive used to form the first adhesive structure 2661 and the second adhesive structure 2656. In some embodiments, the first adhesive structure 2661 and/or the second adhesive structure 2656 may be formed using an inorganic material, for example, silicon or glass that does not react with the solvent. In other embodiments, a thin coating of an organic, inorganic or a hybrid/inorganic material that is resistant to solvents may be disposed on exposed surfaces of the micro-valve 2630 to protect the first adhesive structure 2661 and the second adhesive structure 2656.

Figure 28B:
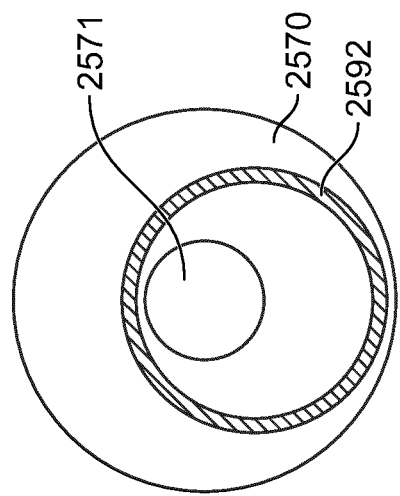
FIG. 28B is an enlarged view of a portion of the jetting assembly of FIG. 28A indicated by the arrow B in FIG. 28A.
Figure 28A:
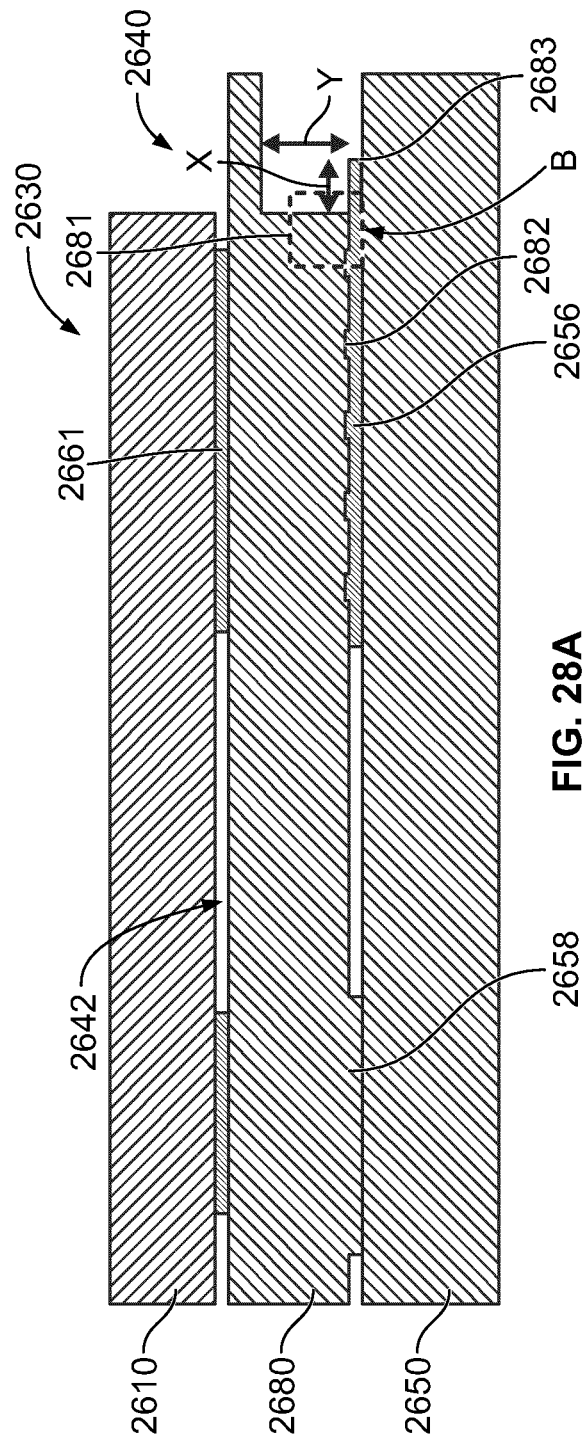
FIG. 28A is a cross-sectional view of a portion of a jetting assembly, according to an embodiment.

For example, FIG. 28B shows an enlarged view of a portion of the micro-valve 2630 indicated by the arrow B in FIG. 28A. A coating 2686 having a thickness, for example, in a range of 5-100 nm (5, 10, 20, 30, 40, 50, or 100 nm, inclusive) may be coated on the micro-valve 2630. In some embodiments, the coating may be deposited using an atomic layer deposition (ALD) process. The coating 2686 may be formed from any suitable material, for example, aluminum oxide, titanium oxide, zinc oxide, or any other suitable material or a combination thereof.

Figure 29:
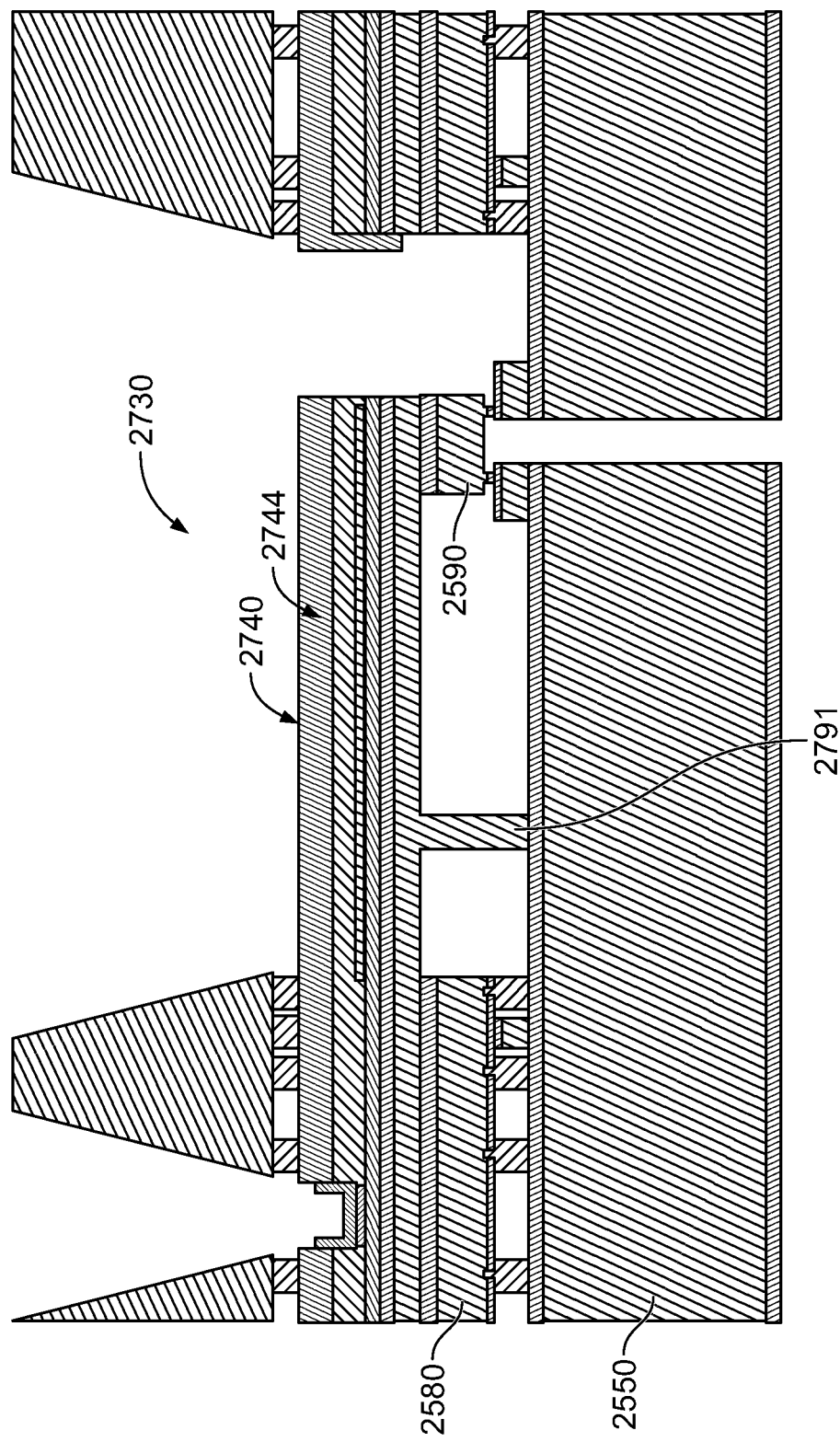
FIG. 29 is a side cross-section view of a jetting assembly, according to another embodiment.

In some embodiments, any of the micro-valves described herein may also include a bumper to prevent overshoot of the actuating beam included in the micro-valve. For example, FIG. 29 is a side cross-section view of a micro-valve 2730, according to another embodiment. The micro-valve 2730 includes similar components as those described with respect to the micro-valve 2530. The micro-valve 2730 includes an actuating beam 2740 which is substantially similar to the actuating beam 2540, but also includes a bumper 2791 extending from a cantilevered portion 2744 of the actuating beam 2740 towards the orifice plate 2550. In other embodiments, the bumper 2791 may be disposed on the orifice plate 2550 and extend therefrom towards the cantilevered portion 2744 of the actuating beam 2740. The bumper 2791 may be positioned at any suitable location, for example, midway between the spacing member 2580 and the sealing member 2590. The bumper 2791 may be formed from the same material as the orifice plate 2550 or the actuating beam 2740 (e.g., silicon). The bumper 2791 may be configured to prevent overshoot of the cantilevered portion of the actuating beam 2740 by limiting a motion of the actuating beam 2740.

Figure 30:
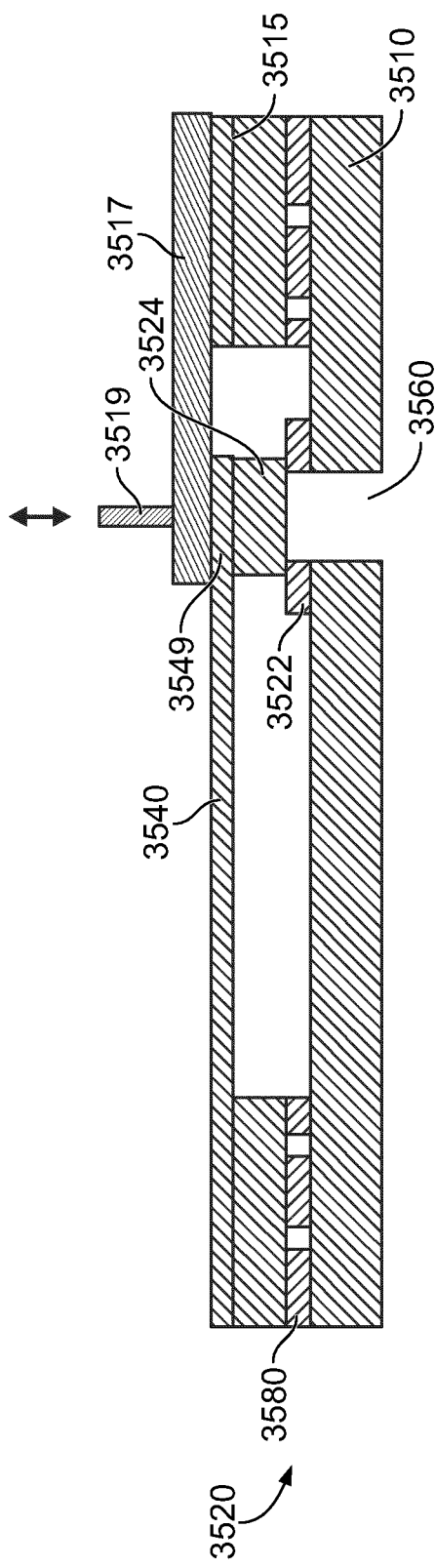
FIG. 30 is a cross-sectional view of an actuating beams of a jetting assembly, according to an example embodiment.

In some embodiments, a micro-valve may include features for limiting motion of an actuating beam by urging an actuating beam back into the default positon. For example, FIG. 30 is a side cross-sectional view of a micro-valve 3520, according to another embodiment. The micro-valve 3520 comprises an orifice plate 3510 defining an orifice 3560 therein. An actuating beam 3540 is positioned on the orifice plate 3510 and spaced apart therefrom via a spacer 3580. A sealing member 3524 is positioned at an overlapping portion 3549 of the actuating beam 3540 is configured to contact a valve seat 3522 positioned on the orifice plate 3510 around or overlapping the orifice 3560 and configured to seal the orifice 3560 in a default position of the actuating beam 3540. The overlapping portion 3549 is located at a tip of the actuating beam 3540 and overlaps the orifice 3560. A finger 3517 may be positioned on a post 3515 disposed on the orifice plate 3510, and extends towards the actuating beam 3540 so as to overlap at least the overlapping portion 3549 of the actuating beam 3540. The finger 3517 may be configured to urge the overlapping portion 3549 of the actuating beam 3540 towards the valve seat 3522 so as ensure a fluid tight seal is formed between the sealing member 3524 and the valve seat 3522 in the default position of the actuating beam 3540.

The finger 3517 may be configured to have a stiffness so as to be overcome by the bending or curving of the cantilevered portion of the actuating beam 3540 away from the orifice 3560 in response to an electrical charge being applied to actuating beam 3540. Once the electrical charge is removed, the finger 3517 may urge the cantilevered portion back towards the orifice 3560. In other embodiments, a biasing member 3519 (e.g., a helical spring, a Belleville spring, a beryllium-copper spring, a compliance member, etc.) may be operably coupled to the finger 3517 and configured to be biased when an electrical charge is applied to the actuating beam 3540. Once the electrical charge is removed, the biasing member 3519 may urge the overlapping portion 3549 back towards the orifice 3560. In particular embodiments, the biasing member 3519 may be operably coupled to the overlapping portion 3549 such that the finger 3517 may be excluded.

Figure 31:
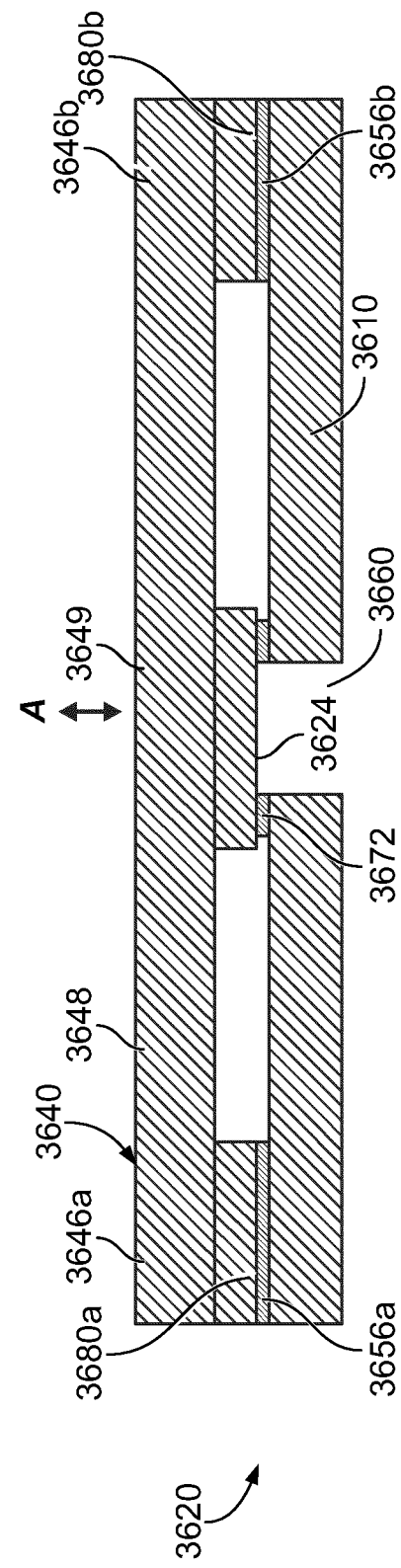
FIG. 31 is a cross-sectional view of an actuating beams of a jetting assembly, according to an example embodiment.

While the previously described embodiments refer to cantilevered actuating beams, in other embodiments, a micro-valve may include a simply supported actuating beam. For example, FIG. 31 is a side cross-sectional view of a micro-valve 3620, according to another embodiment. The micro-valve 3620 comprises an orifice plate 3610 defining an orifice 3660 therein. An actuating beam 3640 is positioned on the orifice plate 3610 such that a first axial end 3646*a* of the actuating beam 3640 is positioned on and spaced apart from the orifice plate 3610 via a first spacing member 3680*a*, and a second axial end 3646*b* of the actuating beam 3640 is positioned on and spaced apart from the orifice plate 3610 via a second spacing member 3680. The spacing members 3680*a/b* are coupled to the orifice plate 3610 via corresponding adhesive layers 3656*a/b*. The actuating beam 3640 includes a bending portion 3648 configured to bend towards or away from the orifice plate 3610. The bending portion 3648 includes an overlapping portion 3649 (e.g., located midway between the axial ends 3646*a/b*) which overlaps the orifice 3660. A sealing member 3624 is positioned at the overlapping portion 3649 of the actuating beam 3640 and is configured to contact a valve seat 3672 positioned on the orifice plate around or overlapping the orifice 3660 so as to seal the orifice 3660 in a default position of the actuating beam 3640. In various embodiments, the valve seat 3672 may be formed from the same material as the adhesive layers 3656*a/b* (e.g., formed in the same fabrication operation). Since the overlapping portion 3649 may be located at center of the actuating beam 3640, bending of the bending portion 3648 about the axial ends 3646*a/b* may cause the sealing member 3624 to move towards and away from the valve seat 3672 without any angle imparted thereto (i.e., a sealing surface of the sealing member 3624 may remain substantially parallel to the valve seat 3672). Furthermore, any bowing of the orifice plate 3610 will also cause the actuating beam 3640 to bow correspondingly, such that the sealing member 3624 may remain in the same position and orientation relative to the valve seat 3672. This may allow a better seal to form between a sealing surface of the sealing member 3624 and the valve seat 3672 regardless of any bowing or curvature of the orifice plate 3610.

In some embodiments, a micro-valve comprises: an orifice plate including a first surface and a second surface, the orifice plate comprising an orifice extending from the first surface to the second surface; an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and a sealing structure comprising a sealing member disposed at the overlapping portion of the cantilevered portion; and wherein, when the actuating beam is in the closed position, the cantilevered portion is positioned such that the sealing structure seals the orifice so as to close the micro-valve.

In some embodiments, the actuating beam comprises a layer of a piezoelectric material, the actuating beam movable between the closed position and the open position in response to an electrical signal being applied to the piezoelectric material. In some embodiments, when no electrical signal is applied to the piezoelectric material, the micro-valve is in the closed position. In some embodiments, when a reverse polarity electrical signal is applied to the piezoelectric material, the micro-valve moves closer to the closed position or the force holding the micro-valve in the closed position is increased.

In some embodiments, the sealing structure comprises a stopper disposed on a surface of the sealing member, the stopper including a first portion attached to a surface of the sealing member and a second portion disposed on the first portion proximate to the orifice plate, wherein the second portion has a greater cross-sectional area than the first portion. In some embodiments, the stopper directly contacts the orifice plate in the absence of the electrical signal. In some embodiments, the stopper is constructed of a bisphenol-A novalac glycidyl ether based photoresist. [In some embodiments, each of the sealing member, the first portion, and the second portion are substantially cylindrical-shaped.

In some embodiments, the sealing structure further comprises a valve seat surrounding the orifice, the valve seat defining an opening that overlaps the orifice to define a fluid outlet. In some embodiments, the sealing member comprises: a sealing member surface facing the orifice, the sealing member surface being substantially parallel to an upper surface of the orifice plate, wherein the sealing member surface is displaced from the valve seat by a distance when the actuating beam is in the closed position; and a first sealing blade extending the distance from the sealing member surface towards the orifice plate, wherein the first sealing blade surrounds an entire perimeter of the orifice.

In some embodiments, the sealing member and the orifice plate are substantially cylindrical-shaped, wherein the orifice is of a first diameter and the sealing member is of a second diameter that is greater than the first diameter. In some embodiments, the first sealing blade is annular-shaped and includes a first outer diameter that is greater than the first diameter and less than the second diameter. In some embodiments, the first outer diameter is closer to the first diameter than the second diameter.

In some embodiments, the sealing member further comprises a second sealing blade surrounding the first sealing blade, the second sealing blade having an second outer diameter that is greater than the first outer diameter but less than the second diameter such that an annular gap is formed between the first sealing blade and the second sealing blade. In some embodiments, the first sealing blade and the second sealing blades are formed of the same material as a remainder of the sealing member.

In some embodiments, the orifice and the sealing member are substantially-cylindrical shaped and the valve seat is annular-shaped and surrounds the orifice. In some embodiments, the orifice has a first diameter and the sealing member has a second diameter greater than the first diameter. In some embodiments, the valve seat has an outer diameter that is between the first diameter and the second diameter. In some embodiments, the valve seat has an outer diameter that is approximately equal to or larger than the second diameter.

In some embodiments, the sealing member further comprises: a narrowed portion disposed at an end thereof, the narrowed portion defining a sealing member surface that faces the orifice; and a sealing flap extending outward from the narrow portion to overlap an upper surface of the valve seat when the actuating beam is in the closed position.

In some embodiments, inner surfaces of the valve seat and the orifice are substantially aligned with one another to form a fluid outlet, wherein the micro-valve further comprises a coating disposed on an inner surface of the fluid outlet. In some embodiments, a coating covers at least one of an upper surface of the valve seat that faces the sealing member, or a sealing member surface of the sealing member facing the valve seat. In some embodiments, the coating comprises polydimethylsiloxane.

In some embodiments, a method of constructing a micro-electro-mechanical systems (MEMS) micro-valve comprises: providing an orifice plate including an orifice; providing an actuating beam having a spacing member and a sealing member attached thereto; forming a portion of a sealing structure on either the orifice plate or the sealing member; and after forming the portion of the sealing structure, attaching the actuating beam to the orifice plate such that the sealing member is aligned with the orifice and the sealing structure forms a seal that separates the orifice from a volume proximate to the actuating beam in a closed position of the actuating beam.

In some embodiments, forming the portion of the sealing structure includes disposing a valve seat on the orifice plate that surrounds the orifice, wherein the method further comprises forming an additional portion of the sealing structure at an orifice-facing surface of the sealing member.

In some embodiments, the additional portion of the sealing structure comprises one or more sealing blades, wherein forming the additional portion of the sealing structure comprises: depositing an etch-resistant material on the orifice-facing surface; etching portions of the etch-resistant material such that a remaining portion of the etch-resistant material on the orifice-facing surface corresponds to the location and shape of the one or more sealing blades; isotropically etching the sealing member for a first predetermined time, the isotropically etching configured to etch a portion of the sealing member underneath the etch-resistant material so as to form the one or more sealing blades; and removing remaining portions of the etch resistant material from the orifice-facing surface.

In some embodiments, the method also includes: before removing the etch resistant material anisotropically etching the sealing member for a second predetermined time to remove portions of the sealing member such that a remaining portion forms taller sealing blades and then removing the etch resistant material. In some embodiments, the etch-resistant material comprises silicon dioxide.

In some embodiments, the additional portion of the sealing structure comprises a sealing flap extending outward from the orifice-facing surface substantially parallel to the orifice plate, and wherein forming the additional portion of the sealing structure comprises: depositing etch-resistant material on the orifice-facing surface; and selectively etching the sealing member to remove portions of the sealing member at circumferential surfaces of the sealing member beneath the etch-resistant material such that the etch-resistant material extends over the removed portions of the sealing member to form the sealing flap.

In some embodiments, method of claim 27, further comprising: anisotropically etching a portion of the actuating beam to form the sealing member; and releasing the actuating beam from a substrate so as to form a cantilevered portion of the actuating beam.

In some embodiments, a jetting assembly comprises: a valve body comprising an orifice plate including a plurality of orifices extending therethrough; a plurality of micro-valves, wherein each of the plurality of micro-valves comprises: a spacing member disposed on the orifice plate and displaced from a corresponding orifice; an actuating beam, the actuating beam including a base portion disposed on the spacing member and a cantilevered portion extending from the base portion towards the corresponding orifice such that an overlapping portion thereof overlaps the corresponding orifice, the actuating beam configured to move between a closed position in which the cantilevered portion bends towards the orifice and an open position in which the cantilevered portion bends away from the orifice; and a sealing structure comprising a sealing member attached to the overlapping portion and extending towards the corresponding orifice; and a fluid manifold coupled to each of the plurality of micro-valves to define a fluid reservoir for each micro-valves.

In some embodiments, the actuating beam comprises a layer of a piezoelectric material, the actuating beam movable between the closed position and the open position in response to an electrical signal being applied to the piezoelectric material, and wherein the micro-valve is in the closed position when no electrical signal is applied to the layer of piezoelectric material.

In some embodiments, the sealing structure comprises a stopper disposed on a sealing member surface, the stopper including a first portion attached to the sealing member surface and a second portion disposed on the first portion more proximate to the orifice plate, wherein the second portion has a greater cross-sectional area than the first portion.

In some embodiments, the sealing structure further comprises a valve seat disposed on the orifice plate proximate to that orifice, the valve seat defining an opening that overlaps the orifice to define a fluid outlet.

In some embodiments, the sealing member comprises: a sealing member surface facing the orifice, the sealing member surface being substantially parallel to an upper surface of the orifice plate, wherein the sealing member surface is displaced from the valve seat by a distance; and a first sealing blade extending the distance from the sealing member surface towards the orifice plate, wherein the first sealing blade surrounds at least a portion of the orifice such that portions of the first sealing blade are disposed around a perimeter of the orifice at a distance therefrom. In some embodiments, the sealing member further comprises a second sealing blade surrounding the first sealing blade.

In some embodiments, the first sealing blade, the second sealing blade, and the valve seat are substantially annular-shaped, wherein the valve seat includes an inner diameter and an outer diameter, wherein the entirety of the first and second sealing blades are disposed between the inner diameter and the outer diameter on an upper surface of the valve seat when the cantilevered portion is in the closed position.

In some embodiments, the sealing member further comprises: a narrowed portion disposed at an end thereof, the narrowed portion defining a sealing member surface that faces the orifice; and a sealing flap extending outward from an edge of the narrow portion at the sealing member surface, wherein the sealing flap extends substantially parallel to the orifice plate and overlaps an upper surface of the valve seat.

In some embodiments, a micro-valve comprises: an orifice plate including a first surface and a second surface, the orifice plate comprising an orifice extending from the first surface to the second surface; an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and a sealing structure disposed on the actuating beam, the sealing structure comprising: a sealing member disposed at the overlapping portion of the cantilevered portion, and a stopper disposed on a surface of the sealing member, the stopper including a first portion attached to a surface of the sealing member and a second portion disposed on the first portion proximate to the orifice plate, wherein the second portion has a greater cross-sectional area than the first portion; and wherein, when the actuating beam is in the closed position, the cantilevered portion is positioned such that the stopper seals the orifice so as to close the micro-valve.

In some embodiments, a micro-valve comprises: an orifice plate including a first surface and a second surface, the orifice plate comprising an orifice extending from the first surface to the second surface; an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and a sealing structure disposed on the actuating beam, the sealing structure comprising: a valve seat surrounding the orifice, the valve seat defining an opening that surrounds the orifice to define a fluid outlet, a sealing member disposed at the overlapping portion of the cantilevered portion, and a first sealing blade extending a distance from a sealing member surface of the sealing member towards the orifice plate, the first sealing blade surrounding an entire perimeter of the orifice, the sealing blade configured to contact the valve seat in the closed position so as to seal the orifice and close the micro-valve. In some embodiments, the sealing member further comprises a second sealing blade surrounding the first sealing blade, the second sealing blade having a second outer diameter that is greater than the first outer diameter but less than the second diameter such that an annular gap is formed between the first sealing blade and the second sealing blade.

In some embodiments, a micro-valve comprises: an orifice plate including a first surface and a second surface, the orifice plate comprising an orifice extending from the first surface to the second surface; an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and a sealing structure disposed on the actuating beam, the sealing structure comprising: a sealing member disposed at the overlapping portion of the cantilevered portion, a narrowed portion disposed at an end of the sealing member, the narrowed portion defining a sealing member surface that faces the orifice, and a sealing flap extending outward from the narrow portion and configured to seal the orifice when the actuating beam is in the closed position so as to close the micro-valve.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" or as an "example" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A micro-valve comprising:
an orifice plate including a first surface and a second surface, the orifice plate comprising an orifice extending from the first surface to the second surface;
an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and
a sealing structure disposed on the actuating beam, the sealing structure comprising:
a valve seat surrounding the orifice, the valve seat defining an opening that surrounds the orifice to define a fluid outlet,
a sealing member disposed at the overlapping portion of the cantilevered portion, and
a first sealing blade extending a distance from a sealing member surface of the sealing member towards the orifice plate, the first sealing blade surrounding an entire perimeter of the orifice, the sealing blade configured to contact the valve seat in the closed position so as to seal the orifice and close the micro-valve.

2. The micro-valve of claim 1, wherein the actuating beam comprises a layer of a piezoelectric material, the actuating beam movable between the closed position and the open position in response to an electrical signal being applied to the piezoelectric material.

3. The micro-valve of claim 1, wherein the sealing structure comprises a stopper disposed on a surface of the sealing member, the stopper including a first portion attached to a surface of the sealing member and a second portion disposed on the first portion proximate to the orifice plate, wherein the second portion has a greater cross-sectional area than the first portion.

4. The micro-valve of claim 3, wherein the stopper is constructed of a bisphenol-A novalac glycidyl ether based photoresist.

5. The micro-valve of claim 3, wherein each of the sealing member, the first portion, and the second portion are substantially cylindrical-shaped.

6. The micro-valve of claim 1, wherein the sealing member comprises:
a sealing member surface facing the orifice, the sealing member surface being substantially parallel to an upper surface of the orifice plate, wherein the sealing member surface is displaced from the valve seat by a distance when the actuating beam is in the closed position.

7. The micro-valve of claim 1, wherein the sealing member and the orifice plate are substantially cylindrical-shaped, wherein the orifice is of a first diameter and the sealing member is of a second diameter that is greater than the first diameter.

8. The micro-valve of claim 7, wherein the first sealing blade is annular-shaped and includes a first outer diameter that is greater than the first diameter and less than the second diameter.

9. The micro-valve of claim 1, wherein inner surfaces of the valve seat and the orifice are substantially aligned with one another to form a fluid outlet, wherein the micro-valve further comprises a coating disposed on an inner surface of the fluid outlet.

10. The micro-valve of claim 1, further comprising a compliance layer covering at least one of an upper surface of the valve seat that faces the sealing member, or a sealing member surface of the sealing member facing the valve seat.

11. The micro-valve of claim 10, wherein the compliance layer comprises gold.

12. The micro-valve of claim 1, wherein the sealing member further comprises a second sealing blade surrounding the first sealing blade, the second sealing blade having a second outer diameter that is greater than the first outer diameter but less than the second diameter such that an annular gap is formed between the first sealing blade and the second sealing blade.

13. A micro-valve comprising:
an orifice plate including a first surface and a second surface, the orifice plate comprising an orifice extending from the first surface to the second surface;
an actuating beam disposed in spaced relation to the orifice plate, the actuating beam including a base portion and a cantilevered portion, the base portion separated from the orifice plate by a predetermined distance, the cantilevered portion extending from the base portion towards the orifice such that an overlapping portion thereof overlaps the orifice wherein the actuating beam is movable between a closed position and an open position; and
a sealing structure comprising a sealing member disposed at the overlapping portion of the cantilevered portion, wherein the sealing structure comprises:
a valve seat surrounding the orifice, the valve seat defining an opening that overlaps the orifice to define a fluid outlet,
a sealing member surface facing the orifice, the sealing member surface being substantially parallel to an upper surface of the orifice plate, wherein the sealing member surface is displaced from the valve seat by a distance when the actuating beam is in the closed position, and
a first sealing blade extending the distance from the sealing member surface towards the orifice plate, wherein the first sealing blade surrounds an entire perimeter of the orifice; and
wherein, when the actuating beam is in the closed position, the cantilevered portion is positioned such that the sealing structure seals the orifice so as to close the micro-valve.

* * * * *